(12) United States Patent
Chen et al.

(10) Patent No.: US 12,205,206 B2
(45) Date of Patent: Jan. 21, 2025

(54) IMAGE PROCESSING METHOD AND ELECTRONIC DEVICE

(71) Applicant: Honor Device Co., Ltd., Shenzhen (CN)

(72) Inventors: Tankun Chen, Shenzhen (CN); Tao Lu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 175 days.

(21) Appl. No.: 17/796,126

(22) PCT Filed: Mar. 17, 2021

(86) PCT No.: PCT/CN2021/081367
§ 371 (c)(1),
(2) Date: Jul. 28, 2022

(87) PCT Pub. No.: WO2022/021895
PCT Pub. Date: Feb. 3, 2022

(65) Prior Publication Data
US 2023/0116975 A1    Apr. 20, 2023

(30) Foreign Application Priority Data
Jul. 31, 2020 (CN) .......................... 202010762068.9

(51) Int. Cl.
*G06T 11/60* (2006.01)
*G06F 3/0488* (2022.01)
(Continued)

(52) U.S. Cl.
CPC .............. *G06T 11/60* (2013.01); *G06F 9/451* (2018.02); *G06F 9/544* (2013.01); *G06T 1/60* (2013.01);
(Continued)

(58) Field of Classification Search
None
See application file for complete search history.

(56) References Cited

U.S. PATENT DOCUMENTS 9,728,166 B2 * 8/2017 Law .......................... G06T 1/20
10,354,363 B2   7/2019 Kaldor
(Continued)

FOREIGN PATENT DOCUMENTS

CN    103517051 A    1/2014
CN    104301795 A    1/2015
(Continued)

*Primary Examiner* — James A Thompson
*Assistant Examiner* — Kim Thanh T Tran
(74) *Attorney, Agent, or Firm* — Leydig, Voit & Mayer, Ltd.

(57) ABSTRACT

Disclosed are an image processing method and an electronic device, which relate to the field of image processing technologies. An electronic device draws a first layer, renders the first layer, and buffers the rendered first layer in a buffer queue. The electronic device finishes drawing the first layer before a first time, and the electronic device draws a second layer, renders the second layer, and buffers the rendered second layer in the buffer queue before the first time, where the first time is a time of arrival of a first vertical synchronization signal for triggering the electronic device to draw the second layer.

20 Claims, 32 Drawing Sheets

(51) Int. Cl.
*G06F 9/451* (2018.01)
*G06F 9/54* (2006.01)
*G06T 1/60* (2006.01)

(52) U.S. Cl.
CPC ........ *G06F 3/0488* (2013.01); *G06T 2200/24* (2013.01)

(56) References Cited

U.S. PATENT DOCUMENTS

| | | | |
|---|---|---|---|
| 2012/0218278 | A1 | 8/2012 | Marketsmueller |
| 2014/0201673 | A1* | 7/2014 | Dunn .................. G06F 9/451 715/781 |
| 2016/0078602 | A1 | 3/2016 | Kaldor |
| 2017/0061364 | A1 | 3/2017 | Waltz |
| 2017/0309054 | A1* | 10/2017 | Brunner ................. G06T 13/00 |
| 2022/0358894 | A1* | 11/2022 | Wang .................... G06F 9/451 |

FOREIGN PATENT DOCUMENTS

| | | |
|---|---|---|
| CN | 105283845 A | 1/2016 |
| CN | 107369197 A | 11/2017 |
| CN | 108829475 A | 11/2018 |
| CN | 109788334 A | 5/2019 |
| CN | 109992347 A | 7/2019 |
| CN | 110018759 A | 7/2019 |
| CN | 110209444 A | 9/2019 |
| CN | 110377264 A | 10/2019 |
| CN | 110489228 A | 11/2019 |
| CN | 110502294 A | 11/2019 |
| CN | 110503708 A | 11/2019 |
| CN | 111298443 A | 6/2020 |
| WO | 2017030735 A1 | 2/2017 |

\* cited by examiner

IMAGE PROCESSING METHOD AND ELECTRONIC DEVICE

CROSS-REFERENCE TO RELATED APPLICATIONS

This application is a National Stage of International Application No. PCT/CN2021/081367, filed on Mar. 17, 2021, which claims priority to Chinese Patent Application No. 202010762068.9, filed on Jul. 31, 2020, both of which are hereby incorporated by reference in their entireties.

TECHNICAL FIELD

Embodiments of this application relate to the field of image processing technologies, and in particular, to an image processing method and an electronic device.

BACKGROUND

With development of electronic technologies, performance of various electronic devices (such as mobile phones) is better. Consumers have higher requirements for human-machine interaction performance of electronic products. Visual continuity of content displayed by an electronic device to a user is important human-machine interaction performance.

High frame rate displaying is also a development trend of electronic devices. For example, a frame rate of an electronic device has evolved from 60 hertz (Hz) to 90 Hz and then to 120 Hz. However, if the frame rate of the electronic device is higher, a frame loss problem is more likely to occur, causing discontinuity of content displayed by the electronic device and affecting user experience. Therefore, how to reduce or even avoid frame loss when the electronic device displays images is an urgent problem to be resolved.

SUMMARY

Embodiments of this application provide an image processing method and an electronic device, to reduce a frame loss possibility in image displaying by the electronic device, ensure smoothness of images displayed on a display, and improve visual experience of a user.

To achieve the foregoing objective, the following technical solutions are used in this application:

According to a first aspect, an embodiment of this application provides an image processing method. The method may be applied to an electronic device. In the method, the electronic device draws a first layer, renders the first layer, and buffers the rendered first layer in an SF buffer queue. The electronic device finishes drawing the first layer before a first time, and the electronic device may draw a second layer, render the second layer, and buffer the rendered second layer in the SF buffer queue before the first time. A full name of SF in English is Surface Flinger. The first time is a time of arrival of a first vertical synchronization signal for triggering the electronic device to draw the second layer.

In this application, before arrival of a next first vertical synchronization signal, the electronic device may continue to perform a next layer drawing task (that is, drawing the second layer) after finishing one layer drawing task (that is, finishing drawing the first layer), instead of waiting for the arrival of the first vertical synchronization signal before drawing the second layer. In other words, the electronic device may use an idle period of a UI thread to perform the next layer drawing task in advance. In this way, the layer drawing and rendering tasks can be finished in advance, a frame loss possibility in image displaying by the electronic device can be reduced, smoothness of images displayed on a display can be ensured, and visual experience of a user can be improved.

In a possible design of the first aspect, the electronic device may draw the second layer immediately after drawing the first layer before the first time. Specifically, that the electronic device finishes drawing the first layer before the first time, and the electronic device draws a second layer, renders the second layer, and buffers the rendered second layer in the SF buffer queue before the first time, may include: the electronic device finishes drawing the first layer before the first time, and in response to finishing drawing the first layer, the electronic device draws the second layer, renders the second layer, and buffers the rendered second layer in the SF buffer queue. This design provides a specific manner for the electronic device to draw the second layer in advance.

In another possible design of the first aspect, even if the electronic device finishes drawing the first layer before the first time, the electronic device may not immediately start to draw the second layer in response to finishing drawing the first layer.

Specifically, the electronic device finishes drawing the first layer before a second time, and the electronic device may start at the second time to draw the second layer, render the second layer, and buffer the rendered second layer in the SF buffer queue. The second time is a time where a preset percentage of a signal period of the first vertical synchronization signal for triggering the electronic device to draw the first layer has been consumed, where the preset percentage is less than 1, and the second time precedes the first time.

In other words, if the electronic device finishes drawing the first layer before the second time, the electronic device does not draw the second layer immediately, but starts to draw the second layer only when the second time arrives. This design provides a specific manner for the electronic device to draw the second layer in advance.

In another possible design of the first aspect, the electronic device may alternatively finish drawing the first layer before the first time and after the second time. In this case, the electronic device may, in response to finishing drawing the first layer, draw the second layer, render the second layer, and buffer the rendered second layer in the SF buffer queue. In other words, the electronic device may draw the second layer immediately after finishing drawing the first layer. This design provides a specific manner for the electronic device to draw the second layer in advance.

In another possible design of the first aspect, the electronic device may draw the second layer in advance in response to a first user interface (UI) event. Specifically, the electronic device may receive the first UI event. The first UI event is used to trigger the electronic device to display preset image content or display image content in a preset manner. The first UI event includes any one of the following: the electronic device receiving a fling operation input by the user, the electronic device receiving a tap operation performed by the user on a preset control in a foreground application, and the electronic device automatically triggering a UI event. In response to the first UI event, the electronic device draws the first layer, renders the first layer, and buffers the rendered first layer in the SF buffer queue.

In another possible design of the first aspect, to prevent a layer overflow in the SF buffer queue from affecting continuity of the images displayed by the electronic device, in this embodiment of this application, before drawing the second layer in advance, the electronic device may determine whether the SF buffer queue has sufficient a buffer space for buffering the layers drawn and rendered in advance by the electronic device. Specifically, the electronic device may determine a buffer space of the SF buffer queue and a quantity of buffered frames in the SF buffer queue, where the buffered frames are layers buffered in the SF buffer queue; and then calculate a difference between the buffer space of the SF buffer queue and the quantity of buffered frames to obtain a remaining buffer space of the SF buffer queue. If the remaining buffer space of the SF buffer queue is greater than a first preset threshold, the electronic device finishes drawing the first layer before the first time, and the electronic device draws the second layer, renders the second layer, and buffers the rendered second layer in the SF buffer queue before the first time.

In this application, the electronic device draws and renders the layer in advance when the remaining buffer space of the SF buffer queue is greater than the first space threshold, that is, when the remaining buffer space of the SF buffer queue is sufficient for buffering the layer drawn and rendered in advance. In this way, a frame loss problem in layer drawing and rendering in advance due to insufficient a buffer space in the SF buffer queue can be reduced, the frame loss possibility in image displaying by the electronic device can be reduced, continuity of the images displayed on the display can be ensured, and visual experience of the user can be improved.

In another possible design of the first aspect, if the remaining buffer space of the SF buffer queue is less than a second preset threshold, in response to the first vertical synchronization signal, the electronic device draws the second layer, renders the second layer, and buffers the rendered second layer in the SF buffer queue.

In another possible design of the first aspect, the electronic device may dynamically set the buffer space of the SF buffer queue. Specifically, before the electronic device finishes drawing the first layer before the first time, and the electronic device draws the second layer, renders the second layer, and buffers the rendered second layer in the SF buffer queue before the first time, the method in this embodiment of this application may further include: the electronic device sets the buffer space of the SF buffer queue to M+p frames, where M is a size of the buffer space of the SF buffer queue before the setting; and p is a quantity of frames lost by the electronic device within a preset time, or p is a preset positive integer.

Because the electronic device dynamically sets the buffer space of the SF buffer queue, a buffer space of the SF buffer can be expanded. In this way, a problem that a layer overflow in the SF buffer affects continuity of the images displayed by the electronic device can be resolved, and continuity of the images displayed by the electronic device can be improved.

In another possible design of the first aspect, if M+p is greater than a preset upper limit N, the electronic device sets the buffer space of the SF buffer queue to N frames. In this design, the electronic device sets the upper limit of the buffer space of the SF buffer queue.

In another possible design of the first aspect, the electronic device uses an Android (Android®) original animation algorithm to calculate a motion distance of the layer and draws the layer based on the motion distance of the layer, but a picture displayed by the electronic device is prone to jitter.

To reduce a possibility that the picture displayed by the electronic device jitters, the electronic device may calculate the motion distance of the corresponding layer based on the signal period of the first vertical synchronization signal and draw the layer based on the motion distance. Specifically, that the electronic device draws a second layer includes: the electronic device calculates a motion distance of the second layer based on the signal period of the first vertical synchronization signal, and draws the second layer based on the motion distance of the second layer, where the motion distance of the second layer is a motion distance of image content in the second layer with respect to image content in the first layer. By using the method of this application, the possibility that the picture displayed by the electronic device jitters can be reduced.

In another possible design of the first aspect, a method of the calculating, by the electronic device, a motion distance of the second layer based on the signal period of the first vertical synchronization signal, and drawing the second layer based on the motion distance of the second layer may include: the electronic device calculates a processing time of the second layer based on the signal period of the first vertical synchronization signal, calculates the motion distance of the second layer based on the processing time of the second layer, and draws the second layer based on the motion distance of the second layer.

When the second layer is an $i^{th}$ layer drawn by the electronic device in response to the first UI event, the processing time of the second layer is $p_{i-1}T_{i-1}$, where i≥2, i is a positive integer, $p_{i-1}$ is a processing time of an $(i-1)^{th}$ layer, and $T_{i-1}$ is the signal period of the first vertical synchronization signal for triggering the electronic device to draw the $(i-1)^{th}$ layer. This design provides a specific manner for the electronic device to calculate the motion distance of the second layer.

In another possible design of the first aspect, the electronic device may receive an interrupt event used to trigger the electronic device to stop displaying the image content corresponding to the first UI event. For example, the electronic device may receive a second UI event. The second UI event is an interrupt event used to trigger the electronic device to stop displaying the image content corresponding to the first UI event. In response to the second UI event, the electronic device may stop drawing a layer corresponding to the first UI event. Then in response to a second vertical synchronization signal, the electronic device deletes a layer corresponding to the first UI event that is buffered in the SF buffer queue. The second vertical synchronization signal is used to trigger the electronic device to composite a rendered layer to obtain an image frame. The electronic device may draw, in response to the first vertical synchronization signal, a third layer corresponding to the second UI event, render the third layer, and buffer the rendered third layer in the SF buffer queue.

In response to the second UI event, the electronic device stops drawing the layer corresponding to the first UI event. Then in response to the second vertical synchronization signal, the electronic device deletes the layer corresponding to the first UI event that is buffered in the SF buffer queue. In this way, the electronic device can display image content corresponding to the second UI event as soon as possible, a touch response latency can be reduced, and hand-following performance of the electronic device can be improved.

In another possible design of the first aspect, after the electronic device receives the second UI event, and before the electronic device draws, in response to the first vertical synchronization signal, the third layer corresponding to the second UI event, renders the third layer, and buffers the rendered third layer in the SF buffer queue, the method in this application may further include: the electronic device redraws a fourth layer to back off layer drawing logic of the electronic device to the fourth layer, and obtains a processing time of the fourth layer, where the fourth layer is a frame layer next to a layer corresponding to an image frame being displayed by the electronic device when the electronic device receives the second UI event; or the fourth layer includes a layer corresponding to an image frame being displayed by the electronic device when the electronic device receives the second UI event and a frame layer next to the layer corresponding to the image frame being displayed by the electronic device.

It should be noted that the electronic device no longer renders the fourth layer, and the processing time of the fourth layer is used by the electronic device to calculate a motion distance of the fourth layer.

Because the electronic device redraws the fourth layer to back off the layer drawing logic of the electronic device to the fourth layer, a large transition of image content displayed by the electronic device can be avoided, continuity of the image content displayed by the electronic device can be improved, and user experience can be improved.

According to a second aspect, an embodiment of this application provides an electronic device. The electronic device includes a display, a memory, and one or more processors. The display and the memory are coupled to the processor. The display is configured to display an image generated by the processor. The memory is configured to store computer program code, and the computer program code includes computer instructions. When the computer instructions are executed by the processor, the electronic device is enabled to perform the following operations: drawing a first layer, rendering the first layer, and buffering the rendered first layer in an SF buffer queue; and finishing drawing the first layer before a first time, and before the first time, drawing a second layer, rendering the second layer, and buffering the rendered second layer in the SF buffer queue, where the first time is a time of arrival of a first vertical synchronization signal for triggering the electronic device to draw the second layer.

In a possible design of the second aspect, when the computer instructions are executed by the processor, the electronic device is further enabled to perform the following step: finishing drawing the first layer before the first time, and in response to finishing drawing the first layer, drawing the second layer, rendering the second layer, and buffering the rendered second layer in the SF buffer queue.

In another possible design of the second aspect, when the computer instructions are executed by the processor, the electronic device is further enabled to perform the following step: finishing drawing the first layer before a second time, and starting at the second time to draw the second layer, rendering the second layer, and buffering the rendered second layer in the SF buffer queue, where the second time is a time where a preset percentage of a signal period of the first vertical synchronization signal for triggering the electronic device to draw the first layer has been consumed, where the preset percentage is less than 1, and the second time precedes the first time.

In another possible design of the second aspect, when the computer instructions are executed by the processor, the electronic device is further enabled to perform the following step: finishing drawing the first layer before the first time and after the second time, and in response to finishing drawing the first layer, drawing the second layer, rendering the second layer, and buffering the rendered second layer in the SF buffer queue.

In another possible design of the second aspect, when the computer instructions are executed by the processor, the electronic device is further enabled to perform the following steps: receiving a first UI event, where the first UI event is used to trigger the display to display preset image content or display image content in a preset manner, and the first UI event includes any one of the following: the electronic device receiving a fling operation input by a user, the electronic device receiving a tap operation performed by the user on a preset control in a foreground application, and the electronic device automatically triggering a UI event; and in response to the first UI event, drawing the first layer, rendering the first layer, and buffering the rendered first layer in the SF buffer queue.

In another possible design of the second aspect, when the computer instructions are executed by the processor, the electronic device is further enabled to perform the following steps: determining a buffer space of the SF buffer queue and a quantity of buffered frames in the SF buffer queue, where the buffered frames are layers buffered in the SF buffer queue; calculating a difference between the buffer space of the SF buffer queue and the quantity of buffered frames to obtain a remaining buffer space of the SF buffer queue; and if the remaining buffer space of the SF buffer queue is greater than a first preset threshold, finishing drawing the first layer before the first time, and before the first time, drawing the second layer, rendering the second layer, and buffering the rendered second layer in the SF buffer queue.

In another possible design of the second aspect, when the computer instructions are executed by the processor, the electronic device is further enabled to perform the following step: if the remaining buffer space of the SF buffer queue is less than a second preset threshold, in response to the first vertical synchronization signal, drawing the second layer, rendering the second layer, and buffering the rendered second layer in the SF buffer queue.

In another possible design of the second aspect, when the computer instructions are executed by the processor, the electronic device is further enabled to perform the following step: setting the buffer space of the SF buffer queue to M+p frames, where M is a size of the buffer space of the SF buffer queue before the setting; and p is a quantity of frames lost by the electronic device within a preset time, or p is a preset positive integer.

In another possible design of the second aspect, when the computer instructions are executed by the processor, the electronic device is further enabled to perform the following step: if M+p is greater than a preset upper limit N, setting the buffer space of the SF buffer queue to N frames.

In another possible design of the second aspect, when the computer instructions are executed by the processor, the electronic device is further enabled to perform the following step: calculating a motion distance of the second layer based on the signal period of the first vertical synchronization signal, and drawing the second layer based on the motion distance of the second layer, where the motion distance of the second layer is a motion distance of image content in the second layer with respect to image content in the first layer.

In another possible design of the second aspect, when the computer instructions are executed by the processor, the electronic device is further enabled to perform the following steps: calculating a processing time of the second layer based on the signal period of the first vertical synchronization signal; and calculating the motion distance of the second layer based on the processing time of the second layer, and drawing the second layer based on the motion distance of the second layer. When the second layer is an $i^{th}$ layer drawn by the electronic device in response to the first UI event, the processing time of the second layer is where $i \geq 2$, i is a positive integer, $p_{i-1}$ is a processing time of an $(i-1)^{th}$ layer, and $T_{i-1}$ is the signal period of the first vertical synchronization signal for triggering the electronic device to draw the $(i-1)^{th}$ layer.

In another possible design of the second aspect, when the computer instructions are executed by the processor, the electronic device is further enabled to perform the following steps: receiving a second UI event; in response to the second UI event, stopping drawing a layer corresponding to the first UI event; in response to a second vertical synchronization signal, deleting a layer corresponding to the first UI event that is buffered in the SF buffer queue, where the second vertical synchronization signal is used to trigger the electronic device to composite a rendered layer to obtain an image frame; and in response to the first vertical synchronization signal, drawing a third layer corresponding to the second UI event, rendering the third layer, and buffering the rendered third layer in the SF buffer queue, where the second UI event is an interrupt event used to trigger the electronic device to stop displaying the image content corresponding to the first UI event.

In another possible design of the second aspect, when the computer instructions are executed by the processor, the electronic device is further enabled to perform the following step: redrawing a fourth layer to back off layer drawing logic of the electronic device to the fourth layer, and obtaining a processing time of the fourth layer, where the electronic device no longer renders the fourth layer, and the processing time of the fourth layer is used by the electronic device to calculate a motion distance of the fourth layer; and the fourth layer is a frame layer next to a layer corresponding to an image frame being displayed by the display when the second UI event is received; or the fourth layer includes a layer corresponding to an image frame being displayed by the display when the second UI event is received and a frame layer next to the layer corresponding to the image frame being displayed by the display.

According to a third aspect, this application provides a system-on-chip. The system-on-chip may be applied to an electronic device including a memory and a display. The system-on-chip includes one or more interface circuits and one or more processors. The interface circuit and the processor are interconnected by lines. The interface circuit is configured to receive signals from the memory and send the signals to the processor, where the signals include computer instructions stored in the memory. When the processor executes the computer instructions, the electronic device performs the method described in the first aspect and any possible design of the first aspect.

According to a fourth aspect, this application provides a computer-readable storage medium. The computer-readable storage medium includes computer instructions. When the computer instructions are run on an electronic device, the electronic device is enabled to perform the method described in the first aspect and any possible design of the first aspect.

According to a fifth aspect, this application provides a computer program product. When the computer program product is run on a computer, the computer is enabled to perform the method described in the first aspect and any possible design of the first aspect.

It may be understood that, for beneficial effects that can be achieved by the electronic device described in the second aspect and any possible design of the second aspect, the system-on-chip described in the third aspect, the computer-readable storage medium described in the fourth aspect, and the computer program product described in the fifth aspect, reference may be made to the beneficial effects in the first aspect and any possible design of the first aspect. Details are not described herein again.

DESCRIPTION OF EMBODIMENTS

Hereinafter, the terms "first" and "second" are intended only for description, and shall not be understood as an indication or implication of relative importance or an implicit indication of a quantity of indicated technical features. Therefore, a feature defined by "first" or "second" may explicitly or implicitly include one or more features. In the description of the embodiments, "a plurality of" means at least two, unless otherwise specified.

An embodiment of this application provides an image processing method. The method may be applied to an electronic device including a display (such as a touchscreen). The method may be used to reduce a frame loss possibility in image displaying by the electronic device, ensure smoothness of images displayed on the display, and improve visual experience of a user.

For example, the electronic device may be a mobile phone, a tablet computer, a desktop, a laptop, a handheld computer, a notebook computer, an ultra-mobile personal computer (UMPC), a netbook, or a device including a display (for example, a touchscreen) such as a cellular phone, a personal digital assistant (PDA), or an augmented reality (AR) or virtual reality (VR) device. A specific form of the electronic device is not particularly limited in this embodiment of this application.

The following describes implementations of the embodiments of this application with reference to accompanying drawings.

Figure 1:
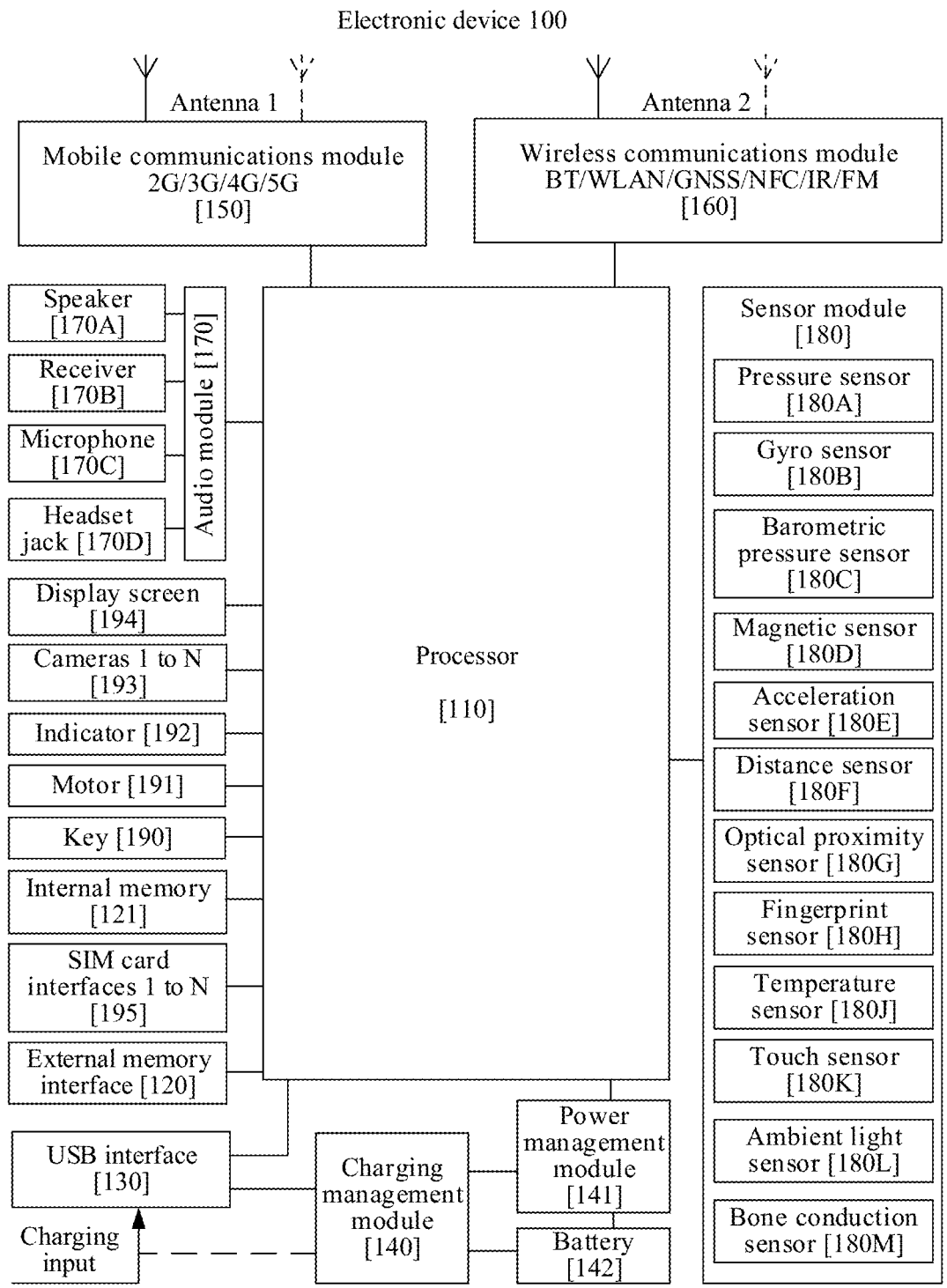
FIG. 1 is a schematic diagram of a hardware structure of an electronic device according to an embodiment of this application.

FIG. 1 is a schematic diagram of a structure of an electronic device 100 according to an embodiment of this application. As shown in FIG. 1, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 293, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure illustrated in this embodiment does not constitute a specific limitation on the electronic device 100. In other embodiments, the electronic device 100 may include more or fewer components than those shown in the figure, or some components are combined, or some components are split, or component arrangements are different. The illustrated components may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on instruction operation code and a timing signal, and implement control over instruction fetching and instruction execution.

A memory may be further disposed in the processor 110, and is configured to store an instruction and data. In some embodiments, the memory in the processor 110 is a cache memory. The memory may store an instruction or data that has just been used or cyclically used by the processor 110. If the processor 110 needs to use the instruction or data again, the processor 110 may invoke the instruction or data directly from the memory. Therefore, repeated access is avoided, a waiting time of the processor 110 is reduced, and efficiency of the system is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, or the like.

It may be understood that an interface connection relationship between the modules illustrated in this embodiment is only a schematic illustration, and does not constitute a limitation on the structure of the electronic device 100. In other embodiments, the electronic device 100 may alternatively use interface connection manners different than the foregoing embodiments, or use a combination of a plurality of interface connection manners.

The charging management module 140 is configured to receive a charging input from a charger. When charging the battery 142, the charging management module 140 may further supply power to the electronic device by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 293, the wireless communications module 160, and the like. In other embodiments, the power management module 141 may alternatively be disposed in the processor 110. In other embodiments, the power management module 141 and the charging management module 140 may alternatively be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may also be reused to improve antenna utilization. For example, the antenna 1 may be reused as a diversity antenna of a wireless local area network.

The mobile communications module 150 may provide a wireless communications solution applied to the electronic device 100 and including 2G/3G/4G/5G or the like. The mobile communications module 150 may include at least one filter, a switch, a power amplifier, a low noise amplifier (LNA), and the like. The mobile communications module 150 can receive an electromagnetic wave from the antenna 1, perform processing such as filtering and amplification on the received electromagnetic wave, and transmit the processed electromagnetic wave to the modem processor for demodulation. The mobile communications module 150 can further amplify a signal modulated by the modem processor, and then the antenna 1 converts the signal into an electromagnetic wave for radiation.

The modem processor may include a modulator and a demodulator. The modulator is configured to modulate a to-be-sent low frequency baseband signal into a medium or high frequency signal. The demodulator is configured to demodulate a received electromagnetic wave signal into a low frequency baseband signal. Then the demodulator transmits the demodulated low frequency baseband signal to the baseband processor for processing. The low frequency baseband signal is processed by the baseband processor and then transmitted to the application processor. The application processor outputs a sound signal by using an audio device (not limited to the speaker 170A, the receiver 170B, or the like), or displays an image or a video by using the display 194.

The wireless communications module 160 may provide wireless communication solutions for the electronic device 100 which include wireless local area networks (WLAN) (for example, Wireless Fidelity (Wi-Fi) networks), Bluetooth (BT), global navigation satellite systems (GNSS), frequency modulation (FM), near field communication (NFC) technology, infrared (IR) technology, and the like. The wireless communications module 160 may be one or more components integrating at least one communication processing module. The wireless communications module 160 receives an electromagnetic wave by using the antenna 2, performs frequency modulation and filtering processing on the electromagnetic wave signal, and sends the processed signal to the processor 110. The wireless communications module 160 can also receive a to-be-sent signal from the processor 110, and perform frequency modulation and amplification on the signal which is then converted into an electromagnetic wave and transmitted by the antenna 2.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, and/or IR technology, or the like. The GNSS may include the global positioning system (GPS), the global navigation satellite system (GLONASS), the BeiDou navigation satellite system (BDS), quasi-zenith satellite systems (QZSS), satellite based augmentation systems (SBAS), and/or the like.

The electronic device 100 implements a display function by using the GPU, the display 194, the application processor, and the like. The GPU is a microprocessor used for image processing, and is connected to the display 194 and the application processor. The GPU is configured to perform mathematical and geometric computation for graphic rendering. The processor 110 may include one or more GPUs, and the GPU executes a program instruction to generate or change display information.

The display 194 is configured to display an image, a video, and the like. The display 194 includes a display panel. The display panel may use a liquid crystal display (LCD), organic light-emitting diodes (OLED), active-matrix organic light emitting diodes or active matrix organic light emitting diodes (AMOLED), flex light-emitting diodes (FLED), Minileds, a MicroLeds, Micro-oLeds, quantum dot light emitting diodes (QLED), or the like.

The display 194 in this embodiment of this application may be a touchscreen. To be specific, the touch sensor 180K is integrated in the display 194. The touch sensor 180K may also be known as a "touch panel". In other words, the display 194 may include a display panel and a touch panel, and the touch sensor 180K and the display 194 form a touchscreen, which is also referred to as a "touch screen". The touch sensor 180K is configured to detect a touch operation that acts on or near the touch sensor 180K. After the touch operation is detected by the touch sensor 180K, the touch operation may be transmitted by a driver of a kernel layer (such as a TP driver) to an upper layer to determine a type of a touch event. A visual output related to the touch operation may be provided by the display 194. In other embodiments, the touch sensor 180K may alternatively be disposed on a surface of the electronic device 100, or disposed in a position different than the display 194.

The electronic device 100 may implement a shooting function by using the ISP, the camera 293, the video codec, the GPU, the display 194, the application processor, or the like. The ISP is configured to process data fed back by the camera 293. The camera 293 is configured to capture still images or videos. The digital signal processor is configured to process a digital signal. In addition to processing a digital image signal, the digital signal processor can also process other digital signals. The video codec is configured to compress or decompress a digital video. The electronic device 100 may support one or more video codecs. In this way, the electronic device 100 can play back or record videos in various encoding formats, for example, moving picture experts group (MPEG) 1, MPEG2, MPEG3, and MPEG4.

The NPU is a neural-network (NN) computing processor. By referring to a structure of a biological neural network, such as a transmission mode between neurons in a human brain, the NPU quickly processes input information, and can further perform self-learning continuously. Applications such as intelligent cognition of the electronic device 100, for example, image recognition, face recognition, speech recognition, and text understanding, can be implemented by using the NPU.

The external memory interface 120 may be configured to connect an external memory card, for example, a micro SD card, to expand a storage capacity of the electronic device 100. The external memory card communicates with the processor 110 by using the external memory interface 120, to implement a data storage function. For example, files such as music and videos are stored in the external memory card. The internal memory 121 may be configured to store computer-executable program code, where the computer-executable program code includes instructions. The processor 110 performs various function applications and data processing of the electronic device 100 by running the instructions stored in the internal memory 121. For example, in this embodiment of this application, the processor 110 may execute the instructions stored in the internal memory 121. The internal memory 121 may include a program storage area and a data storage area. The program storage area may store an operating system, an application program (for example, a sound playback function or an image playback function) required by at least one function, and the like. The data storage area may store data (such as audio data and a phone book) created in use of the electronic device 100. In addition, the internal memory 121 may include a high-speed random access memory, and may further include a non-volatile memory, for example, at least one magnetic disk storage device, a flash memory, or a universal flash storage (UFS).

The electronic device 100 may implement an audio function by using the audio module 170, the speaker 170A, the receiver 170B, the microphone 170C, the headset jack 170D, the application processor, or the like, for example, music playback, or recording.

The audio module 170 is configured to convert digital audio information into an analog audio signal for outputting, and also configured to convert an analog audio input into a digital audio signal. The audio module 170 may be further configured to encode and decode an audio signal. The speaker 170A, also referred to as a "loudspeaker", is configured to convert an audio electrical signal into a sound signal. The receiver 170B, also referred to as an "earpiece", is configured to convert an audio electrical signal into a sound signal. The microphone 170C, also referred to as a "mic" or a "mike", is configured to convert a sound signal into an electrical signal. The headset jack 170D is configured to connect a wired headset.

The pressure sensor 180A is configured to sense a pressure signal and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates having a conductive material. When a force is applied to the pressure sensor 180A, capacitance between electrodes changes. The electronic device 100 determines an intensity of pressure based on the change of the capacitance. When a touch operation acts on the display 194, the electronic device 100 detects an intensity of the touch operation based on the pressure sensor 180A. The electronic device 100 may also calculate a touch position based on a detection signal of the pressure sensor 180A. In some embodiments, touch operations that act on a same touch position but have different touch operation intensities may correspond to different operation instructions. In this embodiment of this application, the electronic device 100 may obtain an intensity of pressure of the user's touch operation by using the pressure sensor 180A.

The key 190 includes a power-on key, a volume key, or the like. The key 190 may be a mechanical key, or may be a touch key. The electronic device 100 may receive a key input, and generate a key signal input related to a user setting and function control of the electronic device 100. The motor 191 may generate a vibration alert. The motor 191 may be configured to generate a vibration alert for an incoming call, and may also be configured to feed back a touch vibration. The indicator 192 may be an indicator light, and may be configured to indicate a charging state or a change of power, and may also be configured to indicate a message, a missed call, a notification, or the like. The SIM card interface 195 is configured to connect a SIM card. The SIM card may be inserted into the SIM card interface 195 or pulled out of the SIM card interface 195, so that the SIM card is in contact with or detached from the electronic device 100. The electronic device 100 may support one or N SIM card interfaces, where K is a positive integer greater than 1. The SIM card interface 195 may support a nano-SIM card, a micro-SIM card, a SIM card, or the like.

The following describes the vertical synchronization signal 1, the vertical synchronization signal 2, and the vertical synchronization signal 3.

Vertical synchronization signal 1: such as VSYNC_APP. The vertical synchronization signal 1 may be used to trigger drawing of one or more layers and render the drawn layer. In other words, the vertical synchronization signal 1 may be used to trigger a UI thread to draw one or more layers, and a render thread renders the one or more layers drawn by the UI thread.

Vertical synchronization signal 2: such as VSYNC_SF. The vertical synchronization signal 2 may be used to trigger layer composition of one or more rendered layers to obtain an image frame. In other words, the vertical synchronization signal 2 may be used to trigger a composition thread to perform layer composition on one or more layers rendered by the render thread to obtain an image frame.

Vertical synchronization signal 3: such as HW_VSYNC. The vertical synchronization signal 3 may be used to trigger hardware to refresh a displayed image frame.

The vertical synchronization signal 3 is a hardware signal triggered by a driver of the display of the electronic device. In this embodiment of this application, a signal period T3 of the vertical synchronization signal 3 (such as HW_VSYNC) is determined based on a frame rate of the display of the electronic device. Specifically, the signal period T3 of the vertical synchronization signal 3 is a reciprocal of the frame rate of the display (such as the LCD or OLED) of the electronic device.

For example, the frame rate of the display of the electronic device may be any value such as 60 hertz (Hz), 70 Hz, 75 Hz, 80 Hz, 90 Hz, or 120 Hz. Using the frame rate of 60 Hz as an example, the signal period of the vertical synchronization signal 3 is 1/60=0.01667 seconds (s)=16.667 milliseconds (ms). Using the frame rate of 90 Hz as an example, the signal period of the vertical synchronization signal 3 is 1/90=0.01111 seconds (s)=11.11 milliseconds (ms). It should be noted that the electronic device may support a plurality of different frame rates. The frame rate of the electronic device may be switched between the foregoing different frame rates. The frame rate in this embodiment of this application is a frame rate currently used by the electronic device. In other words, the signal period of the vertical synchronization signal 3 is a reciprocal of the frame rate currently used by the electronic device.

Figure 2A:
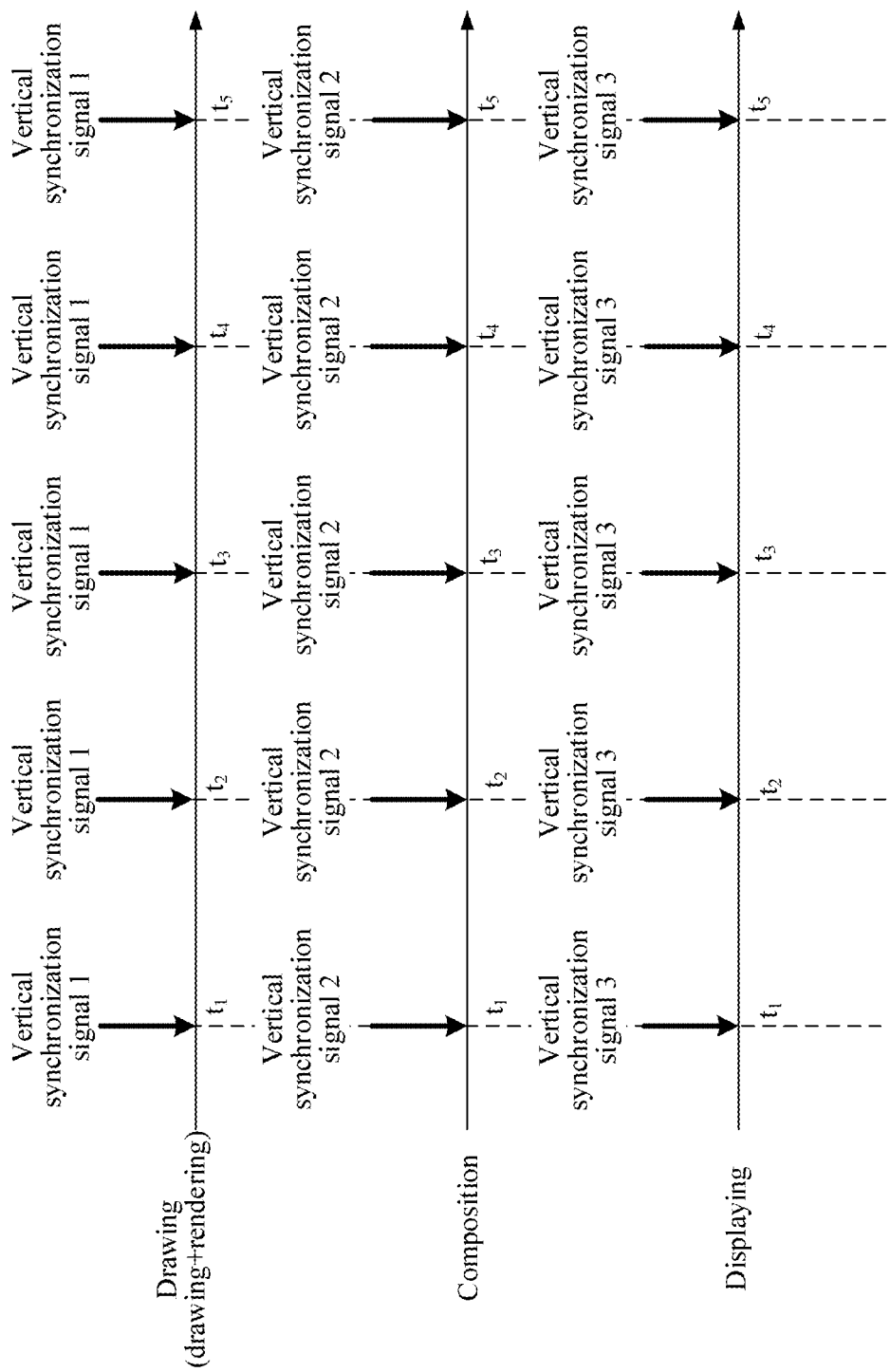
FIG. 2A is a schematic diagram of a vertical synchronization signal according to an embodiment of this application.

It should be noted that the vertical synchronization signal 3 in this embodiment of this application is a periodic discrete signal. For example, as shown in FIG. 2A, there is a vertical synchronization signal 3 triggered by a hardware driver at an interval of one signal period. The vertical synchronization signal 1 and the vertical synchronization signal 2 are generated based on the vertical synchronization signal 3, that is, the vertical synchronization signal 3 may be a signal source of the vertical synchronization signal 1 and the vertical synchronization signal 2. Alternatively, the vertical synchronization signal 1 and the vertical synchronization signal 2 are synchronized with the vertical synchronization signal 3. Therefore, signal periods of the vertical synchronization signal 1 and the vertical synchronization signal 2 are the same as the signal period of the vertical synchronization signal 3, and phases are consistent. For example, as shown in FIG. 2A, the signal period of the vertical synchronization signal 1 and the signal period of the vertical synchronization signal 2 are the same as the signal period of the vertical synchronization signal 3. In addition, as shown in FIG. 2A, the phases of the vertical synchronization signal 1, the vertical synchronization signal 2, and the vertical synchronization signal 3 are consistent. It may be understood that, in an actual implementation process, a phase error may exist between the vertical synchronization signal 1, the vertical synchronization signal 2, and the vertical synchronization signal 3 due to various factors (for example, processing performance). It should be noted that the phase error is ignored in understanding of the method in this embodiment of this application.

In summary, the vertical synchronization signal 1, the vertical synchronization signal 2, and the vertical synchronization signal 3 are all periodic discrete signals. For example, as shown in FIG. 2A, there is a vertical synchronization signal 1 at an interval of one signal period, a vertical synchronization signal 2 at an interval of one signal period, and a vertical synchronization signal 3 at an interval of one signal period. Signal periods of the vertical synchronization signal 1, the vertical synchronization signal 2, and the vertical synchronization signal 3 may all be referred to as a synchronization period $T_Z$. In other words, the synchronization period in this embodiment of this application is the reciprocal of the frame rate of the electronic device.

It should be noted that in different systems or architectures, names of the vertical synchronization signals may be different. For example, in some systems or architectures, the name of the vertical synchronization signal (that is, the vertical synchronization signal 1) used to trigger drawing of one or more layers may not be VSYNC_APP. However, no matter what the name of the vertical synchronization signal is, as long as the signal is a synchronization signal with similar functions and conforms to the technical idea of the method provided in this embodiment of this application, the signal shall fall within the protection scope of this application.

Moreover, in different systems or architectures, definitions of the vertical synchronization signals may also be different. For example, in other systems or architectures, the definition of the vertical synchronization signal 1 may be: the vertical synchronization signal 1 may be used to trigger rendering of one or more layers; the definition of the vertical synchronization signal 2 may be: the vertical synchronization signal 2 may be used to trigger generation of an image frame based on the one or more layers; and the definition of the vertical synchronization signal 3 may be: the vertical synchronization signal 3 may be used to trigger displaying of the image frame. In this embodiment of this application, the definition of the vertical synchronization signal is not limited. However, no matter what the definition of the vertical synchronization signal is, as long as the signal is a synchronization signal with similar functions and conforms to the technical idea of the method provided in this embodiment of this application, the signal shall fall within the protection scope of this application.

For ease of understanding, in this embodiment of this application, by using an example in which the display is a touchscreen, and the user's operation on the display is a touch operation, a software processing procedure of the electronic device in a process from "inputting a touch operation on the touchscreen by the user's finger" to "displaying an image corresponding to the touch operation by the touchscreen" is described with reference to FIG. 2B.

Figure 2B:
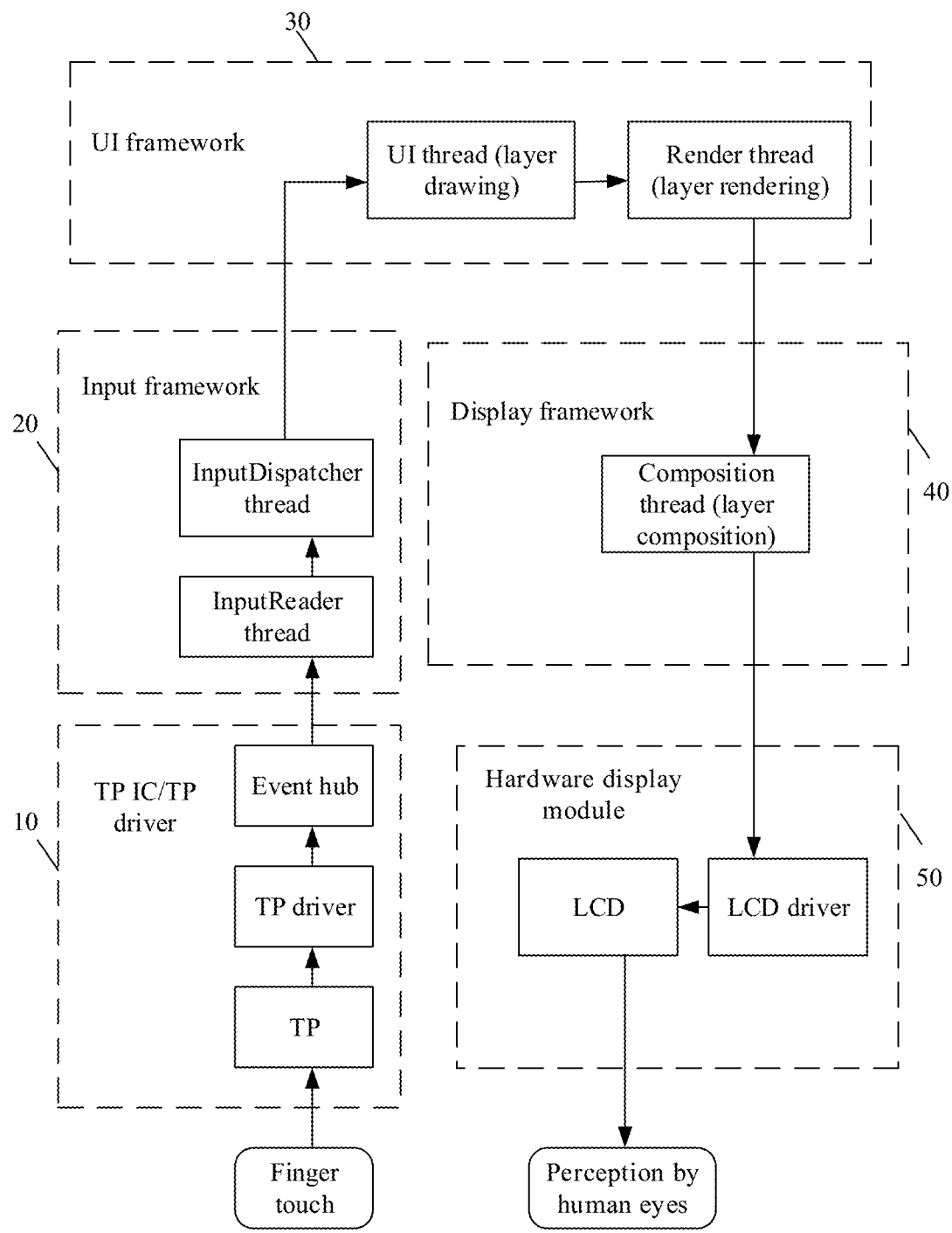
FIG. 2B is a schematic software processing flowchart for displaying an image by an electronic device in response to a touch operation according to an embodiment of this application.

As shown in FIG. 2B, the electronic device may include a touch panel (TP)/TP driver 10, an input framework 20, a UI framework 30, a display framework 40, and a hardware display module 50.

As shown in FIG. 2B, the software processing procedure of the electronic device may include the following steps (1) to (5). Step (1): After the TP in the TP IC/TP driver 10 captures the touch operation of the user's finger on the TP of the electronic device, the TP driver reports a corresponding touch event to an event hub. Step (2): An input reader thread of the input framework 20 may read the touch event from the event hub, and then send the touch event to an input dispatcher thread; and the input dispatcher thread sends the touch event up to the UI thread in the UI framework 30. Step (3): The UI thread (for example, a do frame) in the UI framework 30 draws one or more layers corresponding to the touch event; and a render thread (for example, a draw frame) performs layer rendering on the one or more layers. The UI thread is a thread in a central processing unit (CPU) of the electronic device. The render thread is a thread in the GPU of the electronic device. Step (4): A composition thread (Surface Flinger) in the display framework 40 performs layer composition on the one or more drawn layers (that is, the one or more rendered layers) to obtain an image frame. Step (5): A liquid crystal display (LCD) driver of the hardware display module 50 may receive the composited image frame, and the LCD displays the composited image frame. After the LCD displays the image frame, the image displayed by the LCD can be perceived by human eyes.

Generally, in response to the user's touch operation on the TP or a UI event, the UI framework can invoke, after arrival of the vertical synchronization signal 1, the UI thread to draw one or more layers corresponding to the touch event, and then invoke the render thread to render the one or more layers; then a hardware composer (HWC) can invoke, after arrival of the vertical synchronization signal 2, the composition thread to perform layer composition on the one or more drawn layers (that is, the one or more rendered layers) to obtain an image frame; and finally, the hardware display module can refresh and display the image frame on the LCD after arrival of the vertical synchronization signal 3. The UI event may be triggered by the user's touch operation on the TP. Alternatively, the UI event may be triggered automatically by the electronic device. For example, when a foreground application of the electronic device is automatically switched between pictures, the UI event may be triggered. The foreground application is an application corresponding to a screen currently displayed on the display of the electronic device.

The TP may periodically detect the user's touch operation. After the TP detects the touch operation, the TP can wake up the vertical synchronization signal 1 and the vertical synchronization signal 2, to trigger the UI framework to perform layer drawing and rendering based on the vertical synchronization signal 1, and trigger the hardware composer HWC to perform layer composition based on the vertical synchronization signal 2. The detection period of the TP for detecting the touch operation is the same as the signal period T3 of the vertical synchronization signal 3 (for example, HW_VSYNC).

It should be noted that the UI framework periodically performs layer drawing and rendering based on the vertical synchronization signal 1; the hardware composer HWC periodically performs layer composition based on the vertical synchronization signal 2; and the LCD periodically performs image frame refreshing based on the vertical synchronization signal 3.

A frame loss phenomenon may occur in the process of performing layer drawing, rendering, and composing, and refreshing and displaying the image frame by the electronic device in response to the vertical synchronization signal 1, the vertical synchronization signal 2, and the vertical synchronization signal 3. Specifically, in the process of refreshing and displaying the image frame by the display, a frame of blank image may be displayed. Therefore, continuity and smoothness of images displayed on the display are affected, and visual experience of the user is affected.

Figure 2C:
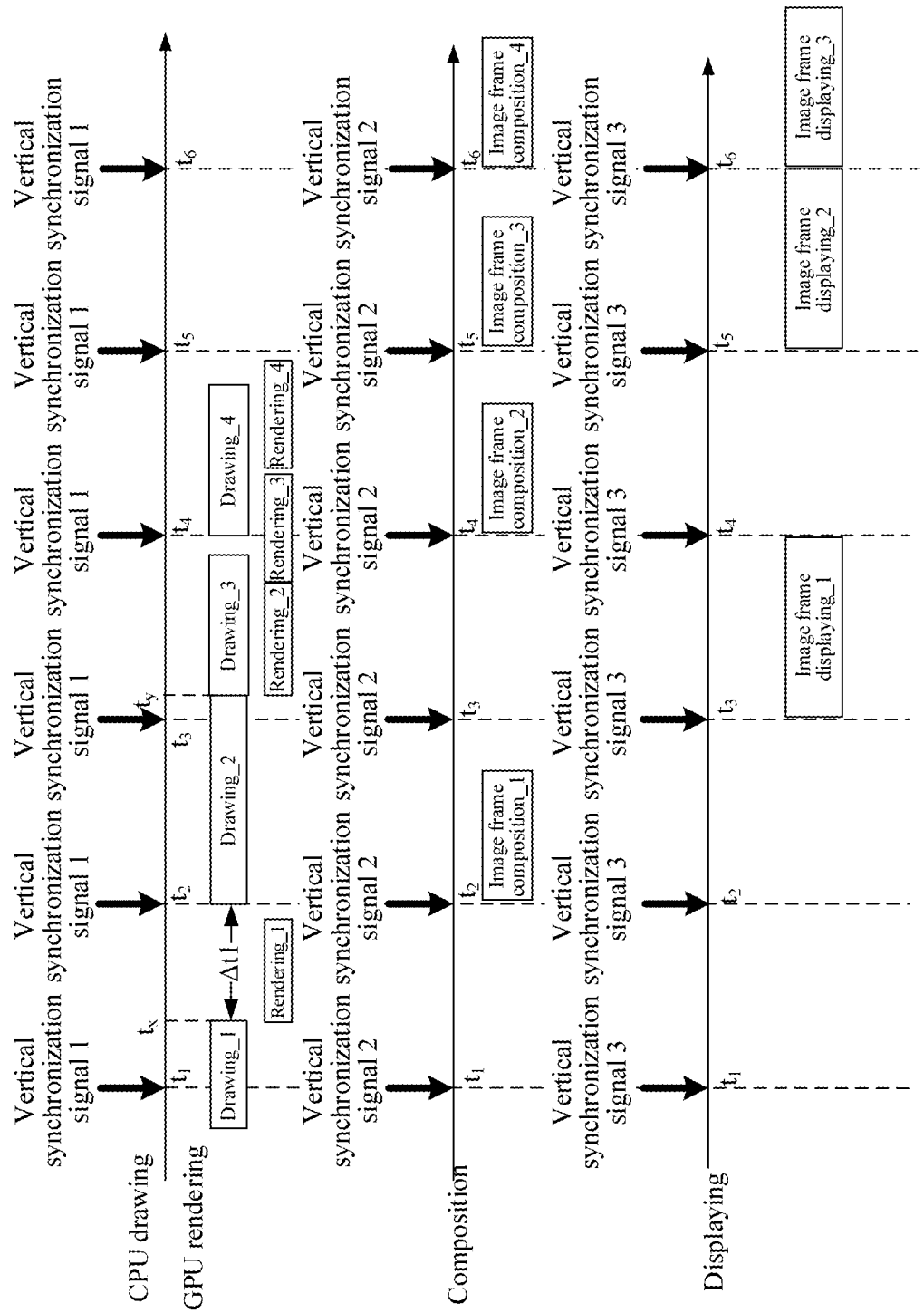
FIG. 2C is a schematic principle diagram of layer drawing, rendering, composition, and image frame displaying by an electronic device in a conventional technology.

For example, as shown in FIG. 2C, at time $t_1$, a vertical synchronization signal 1 arrives; in response to the vertical synchronization signal 1 at time $t_1$, the electronic device performs "drawing_1" and "rendering_1"; at time $t_2$, a vertical synchronization signal 2 arrives; in response to the vertical synchronization signal 2 at time $t_2$, the electronic device performs "image frame composition_1"; at time $t_3$, a vertical synchronization signal 3 arrives; and in response to the vertical synchronization signal 3 at time $t_3$, the electronic device performs "image frame displaying_1". As shown in FIG. 2C, at time $t_2$, a vertical synchronization signal 1 arrives; in response to the vertical synchronization signal 1 at time $t_2$, the electronic device performs "drawing_2" and "rendering_2". As shown in FIG. 2C, because long duration is required for "drawing_2", "drawing_2" and "rendering_2" cannot be completed in one synchronization period (for example, a synchronization period from $t_2$ to $t_3$). In other words, the electronic device has not finished "rendering_2" before arrival of a vertical synchronization signal 2 at time $t_3$; therefore, the electronic device can only wait for arrival of a vertical synchronization signal 2 at time $t_4$, and in response to the vertical synchronization signal 2 at time $t_4$, perform "image frame composition_2". Therefore, the electronic device can also only wait for arrival of a vertical synchronization signal 3 at time $t_5$, and in response to the vertical synchronization signal 3 at time $t_5$, the electronic device performs "image frame displaying_2".

Similarly, duration of rendering the layer by the render thread is relatively long. Therefore, "drawing" and "rendering" cannot be completed in one synchronization period (not shown in the figure) either.

It can be learned from FIG. 2C that, in a synchronization period from $t_4$ to $t_5$, a frame loss phenomenon occurs in image displaying by the display, that is, the display displays a frame of blank image. The method in this embodiment of this application can be used to avoid the frame loss phenomenon in image displaying, to avoid displaying a frame of blank image on the display. In other words, the method in this embodiment of this application can be used to reduce a frame loss possibility in image displaying by the electronic device, ensure smoothness of images displayed on the display, and improve visual experience of the user.

For example, the method provided in this embodiment of this application may be performed by an image processing apparatus. The apparatus may be any one of the electronic devices (for example, the apparatus may be the electronic device 100 shown in FIG. 1). Alternatively, the apparatus may also be a central processing unit (CPU) of the electronic device, or a control module that is in the electronic device and configured to perform the method provided in this embodiment of this application.

The image processing method performed by the electronic device (such as a mobile phone) in the embodiments of this application is used as an example to describe the method provided in the embodiments of this application. In the embodiments of this application, the vertical synchronization signal 1 (for example, VSYNC_APP) is a first vertical synchronization signal, the vertical synchronization signal 2 (for example, VSYNC_SF) is a second vertical synchronization signal, and the vertical synchronization signal 3 (for example, HW_VSYNC) is a third vertical synchronization signal.

Figure 3:
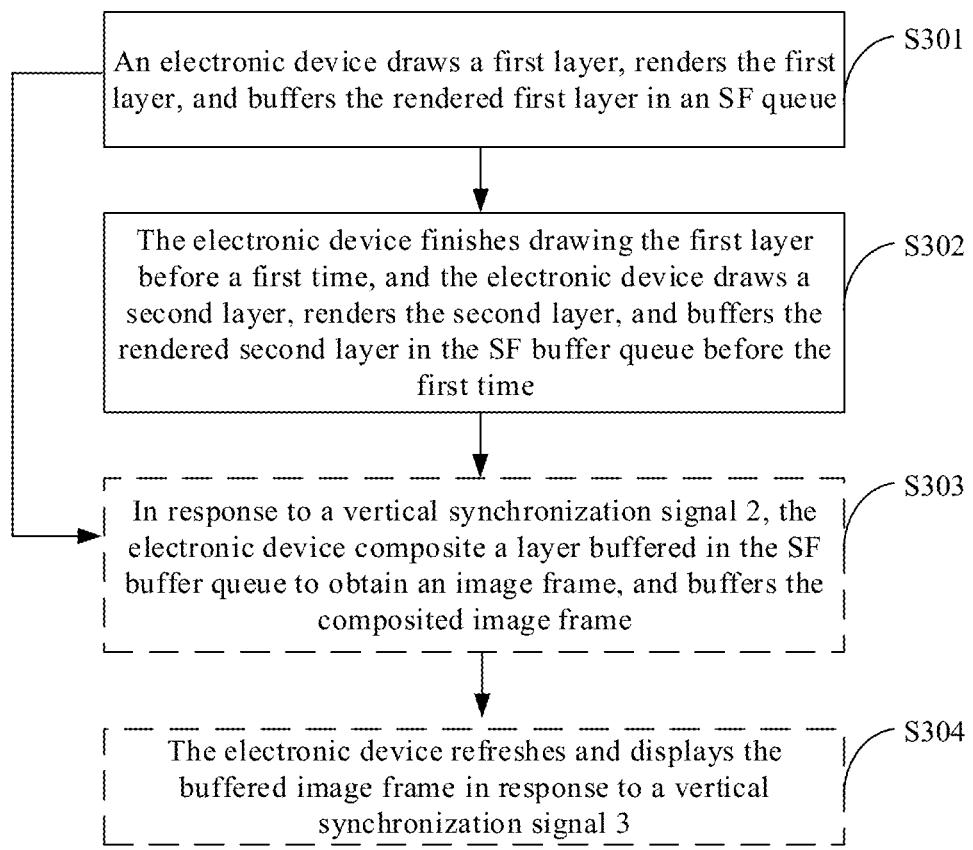
FIG. 3 is a flowchart of an image processing method according to an embodiment of this application.

An embodiment of this application provides an image processing method. As shown in FIG. 3, the image processing method may include S301 and S302.

S301. An electronic device draws a first layer, renders the first layer, and buffers the rendered first layer in an SF queue.

S302. The electronic device finishes drawing the first layer before a first time, and the electronic device draws a second layer, renders the second layer, and buffers the rendered second layer in the SF buffer queue before the first time.

In one case of this embodiment of this application, the electronic device starts to draw the first layer at a time of arrival of a vertical synchronization signal 1.

Figure 4A:
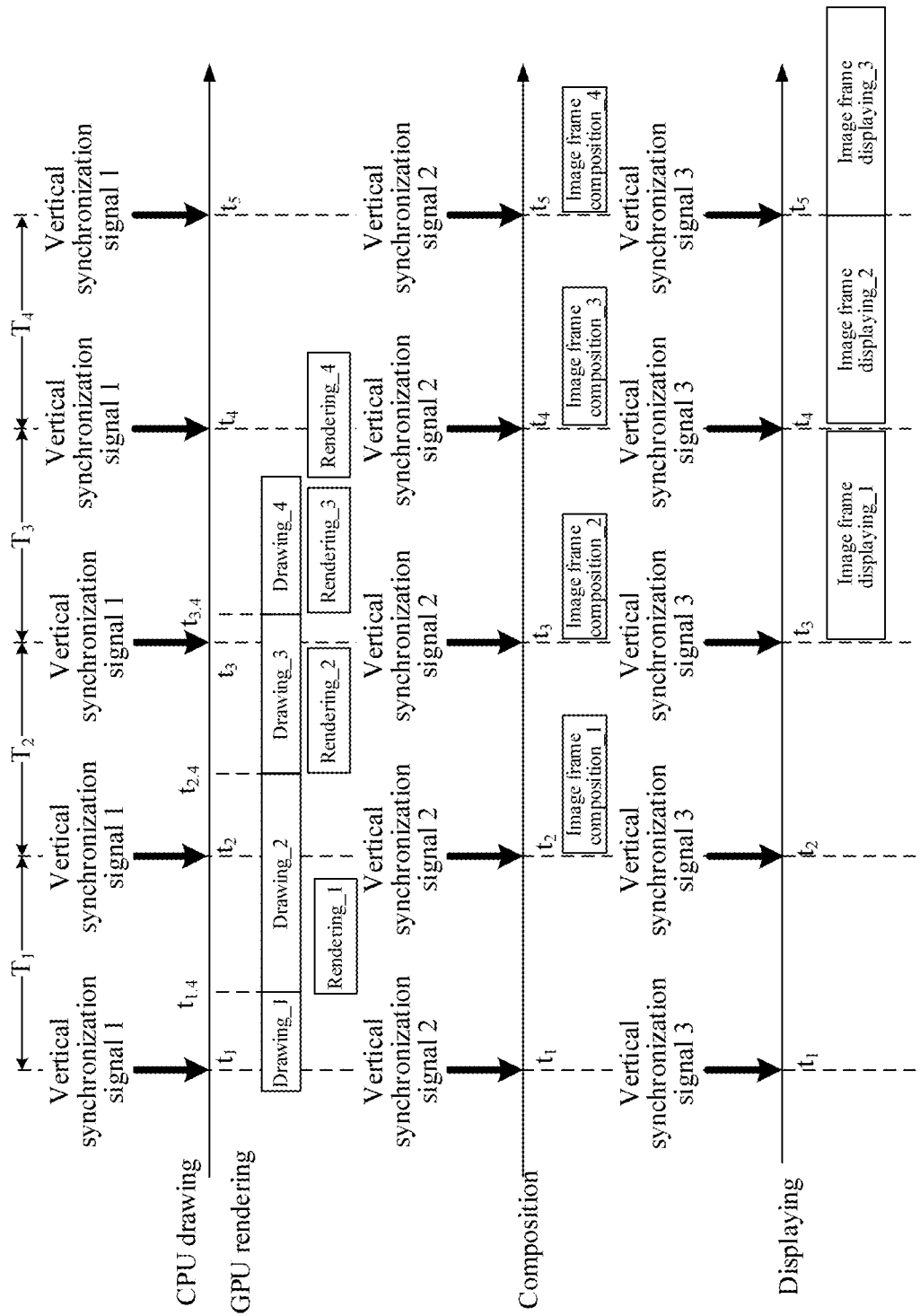
FIG. 4A is a schematic principle diagram of layer drawing, rendering, composition, and image frame displaying by an electronic device according to an embodiment of this application.

For example, the first layer may be a layer 1 drawn by the electronic device by performing "drawing_1" shown in FIG. 4A, and the electronic device starts to draw the layer 1 at time $t_1$ in response to the vertical synchronization signal 1 at time $t_1$. The second layer may be a layer 2 drawn by the electronic device by performing "drawing_2" after the electronic device performs "drawing_1" shown in FIG. 4A or FIG. 5A to finish drawing the layer 1.

In another case of this embodiment of this application, the first layer may be drawn after drawing of one frame layer is finished and before a next vertical synchronization signal 1 arrives.

For example, the first layer may be the layer 2 drawn by the electronic device by performing "drawing_2" shown in FIG. 4A. The second layer may be a layer 3 drawn by the electronic device by performing "drawing_3" after the electronic device performs "drawing_2" shown in FIG. 4A to finish drawing the layer 2. The layer 2 (that is, the first layer) may be drawn by the electronic device at time $t_{1.4}$ after drawing of the layer 1 is finished (that is, the electronic device finishes performing the "drawing_1") and before a vertical synchronization signal 1 at time $t_2$ arrives. Time $t_{1.4}$ follows $t_1$ and precedes $t_2$. Time $t_{1.4}$ shown in FIG. 4A is the same as time $t_x$ shown in FIG. 2C. At time $t_x$ shown in FIG. 2C, the electronic device finishes "drawing_1".

For another example, the first layer may be the layer 3 drawn by the electronic device by performing "drawing_3" shown in FIG. 4A. The second layer may be a layer 4 drawn by the electronic device by performing "drawing_4" after the electronic device performs "drawing_3" shown in FIG. 4A to finish drawing the layer 3. The layer 3 (that is, the first layer) may be drawn by the electronic device at time $t_{2.4}$ after drawing of the layer 2 is finished (that is, the electronic device finishes performing the "drawing_2") and before a vertical synchronization signal 1 at time $t_3$ arrives. Time $t_{2.4}$ follows $t_2$ and precedes $t_3$.

The first time is a time when a vertical synchronization signal 1 for triggering the electronic device to draw the second layer arrives.

For example, when the first layer is the layer 1 drawn by the electronic device by performing "drawing_1" shown in FIG. 4A, and the second layer is the layer 2 drawn by the electronic device by performing "drawing_2" shown in FIG. 4A, the first time is $t_2$ shown in FIG. 4A. In a conventional technology, a vertical synchronization signal 1 at time $t_2$ is used to trigger an electronic device to perform "drawing_2" to draw a layer 2.

For another example, when the first layer is the layer 2 drawn by the electronic device by performing "drawing_2" shown in FIG. 4A, and the second layer is the layer 2 drawn by the electronic device by performing "drawing_3" shown in FIG. 4A, the first time is $t_3$ shown in FIG. 4A. In the conventional technology, a vertical synchronization signal 1 at time $t_3$ is used to trigger the electronic device to perform "drawing_3" to draw a layer 3.

Generally, a UI thread of the electronic device periodically draws a layer based on a vertical synchronization signal 1. Therefore, in the conventional technology, the electronic device performs S301. Even if the UI thread of the electronic device has finished drawing the first layer, if the vertical synchronization signal 1 is not detected, the UI thread of the electronic device does not draw the second layer. The UI thread of the electronic device does not start to draw the second layer until a next vertical synchronization signal 1 arrives.

For example, as shown in FIG. 2C, at time $t_1$, a vertical synchronization signal 1 arrives; and in response to the vertical synchronization signal 1 at time $t_1$, the UI thread of the electronic device may perform "drawing_1" to draw the layer 1 (that is, the first layer), and then a render thread of the electronic device performs "rendering_1" to render the layer 1. The UI thread finishes "drawing_1" at time $t_x$ shown in FIG. 2C, that is, finishes a task of drawing the first layer. However, as shown in FIG. 2C, at time $t_2$, a next vertical synchronization signal 1 arrives; and in response to the vertical synchronization signal 1 at time $t_2$, the UI thread can perform "drawing_2" to draw the layer 2 (that is, the second layer), and the render thread performs "rendering_2" to render the layer 2.

For example, the first time is $t_2$ shown in FIG. 2C. As shown in FIG. 2C, if the electronic device finishes drawing the first layer at time $t_x$ before $t_2$ (that is, finishes performing "drawing_1"), in the conventional technology, drawing of the second layer is started only in response to the vertical synchronization signal 1 at time $t_2$ (that is, "drawing_2" is finished). Therefore, the UI thread is in an idle state in a period (such as $\Delta t1$) from $t_x$ to $t_2$ shown in FIG. 2C.

In this embodiment of this application, the foregoing idle period (the period $\Delta t1$ shown in FIG. 2C) of the UI thread can be used to draw the second layer in advance. Therefore, a task of drawing the second layer can be finished in advance, and a possibility that the electronic device finishes "rendering_2" before arrival of a vertical synchronization signal 2 at time $t_3$ shown in FIG. 2C can be increased. In this way, a frame loss possibility in image displaying by the electronic device is reduced, and smoothness of images displayed on a display can be ensured. Specifically, the electronic device may perform S302. In this embodiment of this application, a specific method for performing S302 by the electronic device is described herein.

Figure 4B:
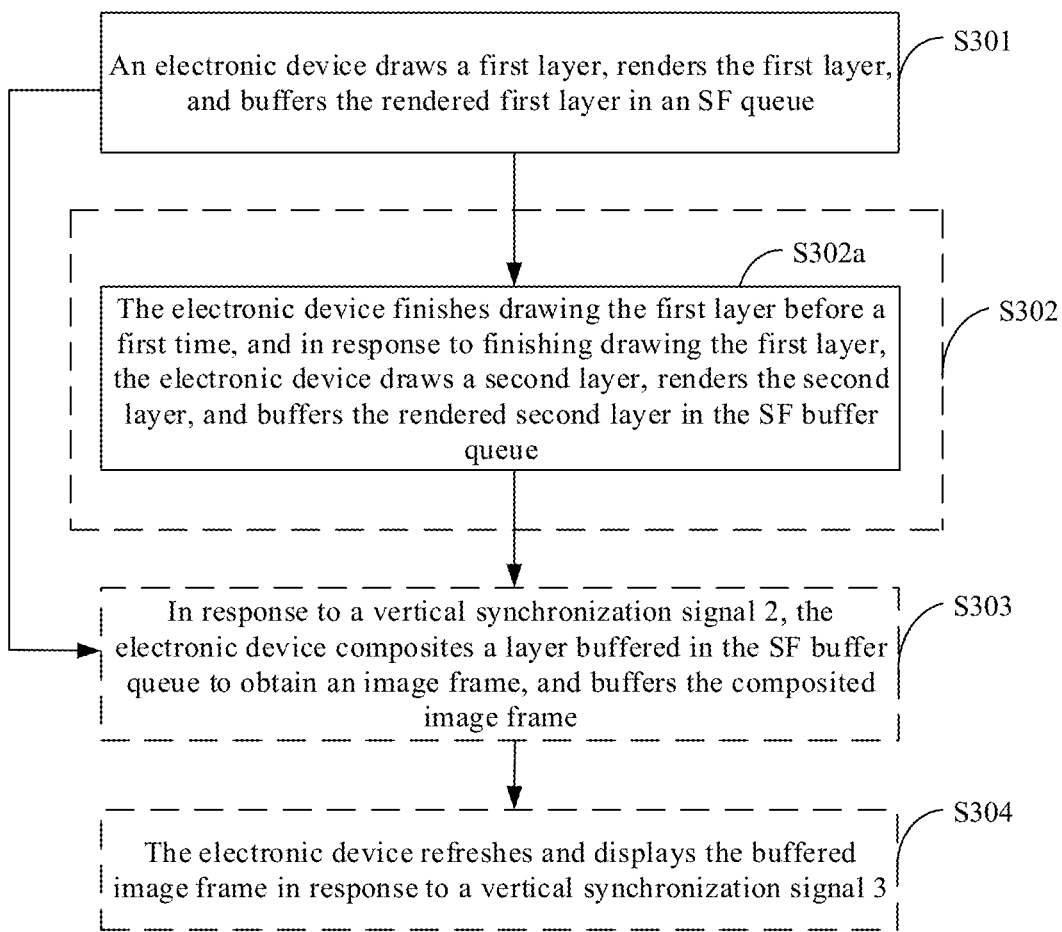
FIG. 4B is a flowchart of an image processing method according to an embodiment of this application.

In an implementation of this embodiment of this application, when the electronic device finishes drawing the first layer before the first time, the electronic device may start to draw the second layer and render the second layer immediately after finishing drawing the first layer. Specifically, as shown in FIG. 4B, the foregoing S302 may include S302a.

S302a. The electronic device finishes drawing the first layer before the first time, and in response to finishing drawing the first layer, the electronic device draws the second layer, renders the second layer, and buffers the rendered second layer in the SF buffer queue.

For example, as shown in FIG. 4A, at time $t_1$, a vertical synchronization signal 1 arrives; and in response to the vertical synchronization signal 1 at time $t_1$, the UI thread of the electronic device may perform "drawing_1" to draw the layer 1 (that is, the first layer), and then the render thread of the electronic device performs "rendering_1" to render the layer 1. The UI thread finishes "drawing_1" at time $t_{1.4}$ shown in FIG. 4A, that is, finishes drawing the layer 1. In response to finishing "drawing_1" at time $t_{1.4}$ by the UI thread shown in FIG. 4A, the UI thread may start to perform "drawing_2" at time $t_{1.4}$ to draw the layer 2 (that is, the second layer), and the render thread performs "rendering_2" to render the layer 2, instead of waiting for the vertical synchronization signal 1 at time $t_2$ before starting to perform "drawing_2" to draw the layer 2 at time $t_2$.

For another example, the UI thread finishes "drawing_2" at time $t_{2.4}$ shown in FIG. 4A, that is, finishes drawing the layer 2 (that is, the first layer). In response to finishing "drawing_2" at time $t_{2.4}$ by the UI thread shown in FIG. 4A, the UI thread may start to perform "drawing_3" at time $t_{2.4}$ to draw the layer 3 (that is, the second layer), and the render thread performs "rendering_3" to render the layer 3, instead of waiting for the vertical synchronization signal 1 at time $t_3$ before starting to perform "drawing_3" to draw the layer 3 at time $t_3$.

For another example, the UI thread finishes "drawing_3" at time $t_{3.4}$ shown in FIG. 4A, that is, finishes drawing the layer 3 (that is, the first layer). In response to finishing "drawing_3" at time $t_{3.4}$ by the UI thread shown in FIG. 4A, the UI thread may start to perform "drawing_4" at time $t_{3.4}$ to draw the layer 4 (that is, the second layer), and the render thread performs "rendering_4" to render the layer 4, instead of waiting for a vertical synchronization signal 1 at time $t_4$ before starting to perform "drawing_4" to draw the layer 4 at time $t_4$.

In this way, as shown in FIG. 4A, "drawing_2" and "rendering_2" may be finished before the vertical synchronization signal 2 at time $t_3$ arrives. In this way, the electronic device (such as a composition thread of the electronic device) can perform "image frame composition_2" in response to the vertical synchronization signal 2 at time $t_3$, so that the electronic device (such as an LCD of the electronic device) can perform "image frame displaying_2" in response to a vertical synchronization signal 3 at time $t_4$. This can resolve the problem that the frame loss phenomenon (that is, the display displays a frame of blank image) occurs in image displaying by the display in the synchronization period from $t_4$ to $t_5$ shown in FIG. 2C.

In another implementation of this embodiment of this application, even if the electronic device finishes drawing the first layer before the first time, the electronic device may not immediately start to draw the second layer in response to finishing drawing the first layer. Specifically, as shown in FIG. 5B, the foregoing S302 may include S302b and S302c.

S302b. The electronic device finishes drawing the first layer before the second time, and the electronic device starts at the second time to draw the second layer, render the second layer, and buffer the rendered second layer in the SF buffer queue.

The second time is a time where a preset percentage of a signal period of the vertical synchronization signal 1 for triggering the electronic device to draw the first layer has been consumed, where the preset percentage is less than 1. For example, the preset percentage may be any value such as 50%, 33.33%, or 40%. The preset percentage may be preconfigured in the electronic device, or may be set by a user on the electronic device. In the following embodiments, the method of the embodiments of this application is described by assuming the preset percentage to be equal to 33.33% (that is, ⅓).

Figure 5A:
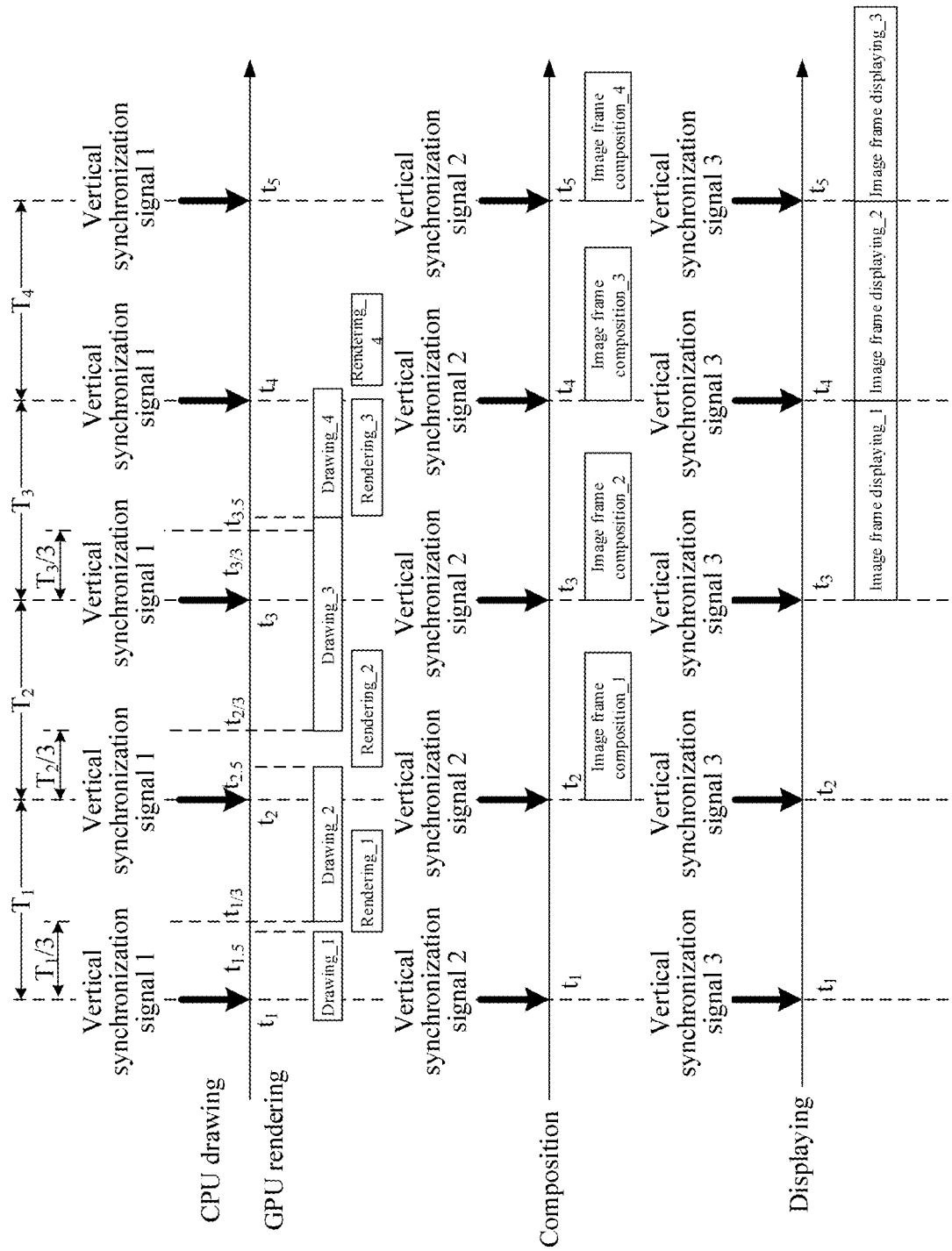
FIG. 5A is a schematic principle diagram of layer drawing, rendering, composition, and image frame displaying by an electronic device according to an embodiment of this application.
Figure 5B:
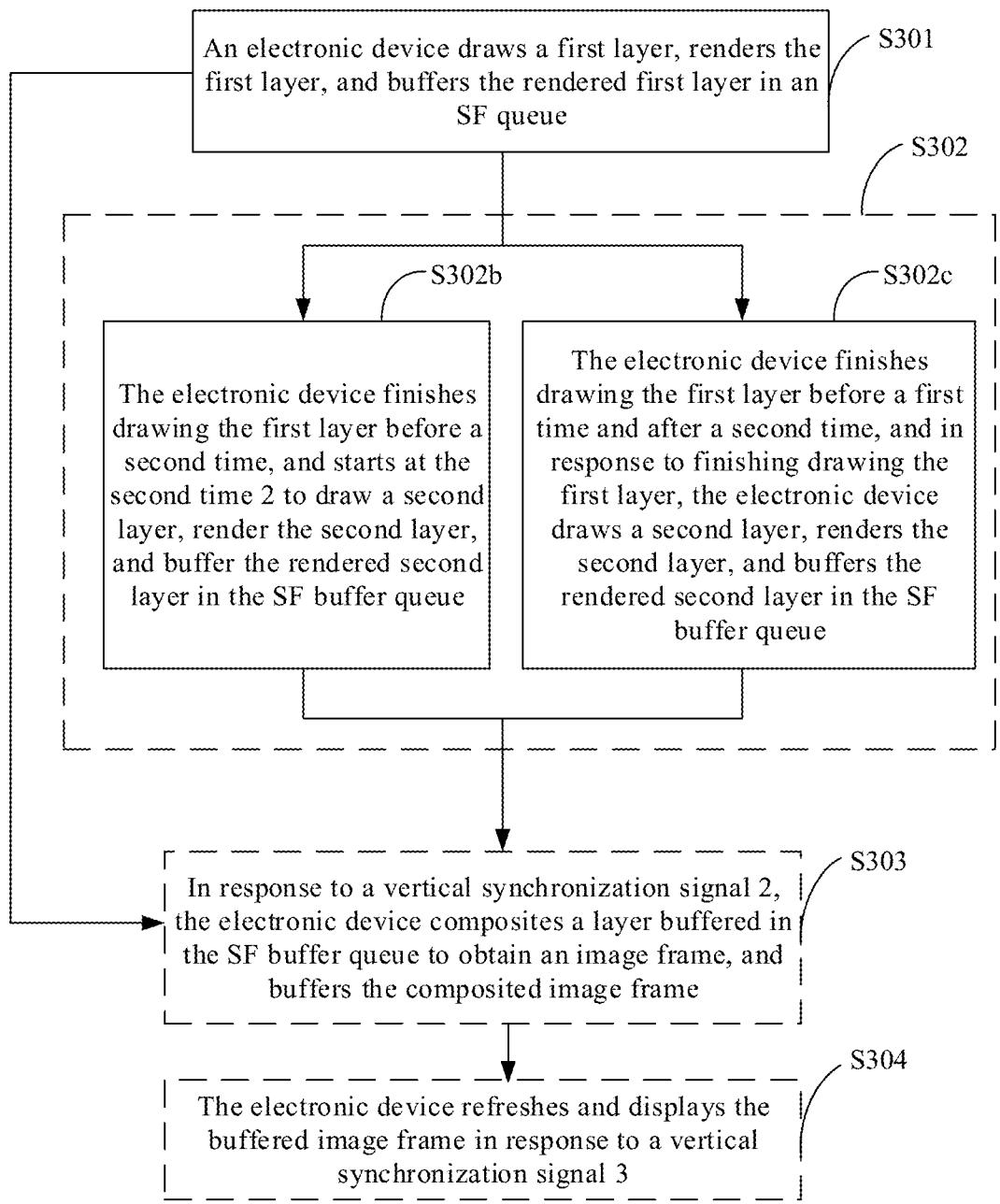
FIG. 5B is a flowchart of another image processing method according to an embodiment of this application.

For example, in the conventional technology, the vertical synchronization signal 1 at time $t_1$ shown in FIG. 5A is used to trigger the electronic device to perform "drawing_1" to draw the layer 1 (that is, the first layer); and the second time is time $t_{1/3}$, which is a time where a preset percentage of a signal period $T_1$ of the vertical synchronization signal 1 at $t_1$ has been consumed. Specifically, duration from $t_1$ to $t_{1/3}$ is a preset percentage of $T_1$. For example, the duration from $t_1$ to $t_{1/3}$ is equal to ⅓ $T_1$ (that is, $T_{1/3}$). In this example, the first time is time $t_2$ shown in FIG. 5A, the second time is time $t_{1/3}$ shown in FIG. 5A, and $t_{1/3}$ precedes $t_2$.

As shown in FIG. 5A, the electronic device performs "drawing_1" and finishes drawing the layer 1 (that is, the first layer) at time $t_{1.5}$, where $t_{1.5}$ precedes $t_{1/3}$ (that is, the second time). In other words, the electronic device finishes drawing the layer 1 before $t_{1/3}$ (that is, the second time). Therefore, the electronic device can perform S302b, and start to perform "drawing_2" at $t_{1/3}$ (that is, the second time) to draw the layer 2 (that is, the second layer).

For another example, in the conventional technology, the vertical synchronization signal 1 at $t_2$ shown in FIG. 5A is used to trigger the electronic device to perform "drawing_2" to draw the layer 2 (that is, the first layer); and the second time is $t_{2/3}$, which is a time where a preset percentage of a signal period T2 of the vertical synchronization signal 1 at $t_2$ has been consumed. Specifically, duration from $t_2$ to $t_{2/3}$ is equal to ⅓ T2, that is, the duration from $t_2$ to $t_{2/3}$ is a preset percentage of T2. In this embodiment, the first time is $t_3$ shown in FIG. 5A, the second time is $t_{2/3}$ shown in FIG. 5A, where $t_{2/3}$ precedes $t_3$.

As shown in FIG. 5A, the electronic device performs "drawing_2" and finishes drawing the layer 2 (that is, the first layer) at time $t_{2.5}$, where $t_{2.5}$ precedes $t_{2/3}$ (that is, the second time). In other words, the electronic device finishes drawing the layer 2 before $t_{2/3}$ (that is, the second time). Therefore, the electronic device can perform S302b, and start to perform "drawing_3" at $t_{2/3}$ (that is, the second time) to draw the layer 3 (that is, the second layer).

S302c. The electronic device finishes drawing the first layer before the first time and after the second time, and in response to finishing drawing the first layer, the electronic device draws the second layer, renders the second layer, and buffers the rendered second layer in the SF buffer queue.

For example, in the conventional technology, the vertical synchronization signal 1 at time $t_3$ shown in FIG. 5A is used to trigger the electronic device to perform "drawing_3" to draw the layer 3 (that is, the first layer); and the second time is time $t_{3/3}$, that is, a time with a preset percentage of time consumption in a signal period T3 of the vertical synchronization signal 1 at time $t_3$. Specifically, duration from $t_3$ to $t_{3/3}$ is equal to T3/3, that is, the duration from $t_3$ to $t_{3/3}$ is a preset percentage of T3. In this embodiment, the first time is $t_4$ shown in FIG. 5A, the second time is $t_{3/3}$ shown in FIG. 5A, and $t_{3/3}$ precedes $t_4$.

As shown in FIG. 5A, the electronic device performs "drawing_3" and finishes drawing the layer 3 at time $t_{3.5}$, where $t_{3.5}$ follows $t_{3/3}$ (that is, the second time) and precedes $t_4$ (that is, the first time). Therefore, the electronic device can perform S302c, and in response to finishing drawing the layer 3 by the electronic device at time $t_{3.5}$, perform "drawing_4" at time $t_{3.5}$ to draw the layer 4 (that is, the second layer).

In this embodiment of this application, the electronic device may buffer the rendered layer in the SF buffer queue (Buffer). The SF buffer can buffer the rendered layers in a queue according to a "first in first out" principle.

Figure 6:
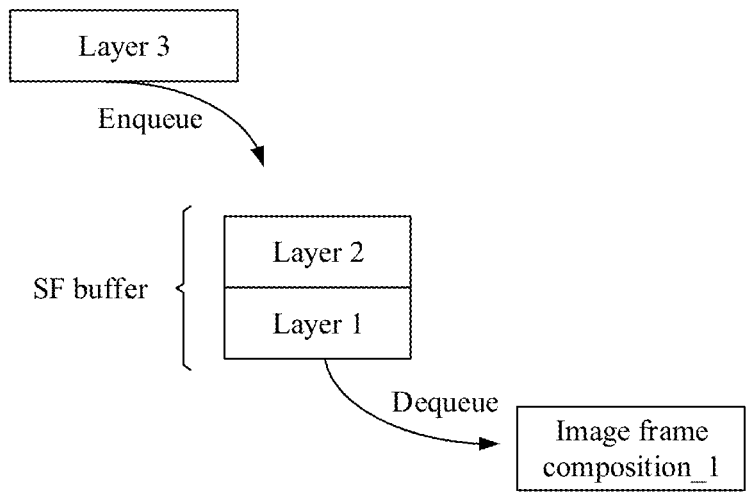
FIG. 6 is a schematic diagram of a method for buffering a layer in an SF buffer according to an embodiment of this application.

For example, with reference to FIG. 5A, as shown in FIG. 6, the render thread of the electronic device performs "rendering_1" shown in FIG. 5A to obtain the rendered layer 1; the render thread may insert the rendered layer 1 into the SF buffer; then the render thread of the electronic device performs "rendering_2" shown in FIG. 5A to obtain the rendered layer 2; the render thread may insert the rendered layer 2 into the SF buffer; then the render thread of the electronic device performs "rendering_3" shown in FIG. 5A to obtain the rendered layer 3; and the render thread may insert the rendered layer 3 into the SF buffer. The SF buffer buffers the layer 1, the layer 2, and the layer 3 according to the "first in first out" principle. In other words, the layers in the SF buffer shown in FIG. 6 are enqueued in order of the layer 1, the layer 2, and the layer 3, and dequeued in order of the layer 1, the layer 2, and the layer 3. As shown in FIG. 3, FIG. 4B, or FIG. 5B, after the foregoing S301 or S302, the method in this embodiment of this application may further include S303 and S304.

S303. The electronic device performs, in response to the vertical synchronization signal 2, layer composition on a layer buffered in the SF buffer queue to obtain an image frame, and buffers the composited image frame.

S304. The electronic device refreshes and displays the buffered image frame in response to the vertical synchronization signal 3.

For example, at time $t_2$ shown in FIG. 4A or FIG. 5A, a vertical synchronization signal 2 arrives; in response to the vertical synchronization signal 2 at time $t_2$, the composition thread of the electronic device may perform "image frame composition_1" to perform layer composition on the rendered layer 1, to obtain an image frame 1; at time $t_3$ shown in FIG. 4A or FIG. 5A, a vertical synchronization signal 3 arrives; and in response to the vertical synchronization signal 3 at time $t_3$, the LCD of the electronic device may perform "image frame displaying_1" to refresh and display the image frame 1.

At time $t_3$ shown in FIG. 4A or FIG. 5A, a vertical synchronization signal 2 arrives; in response to the vertical synchronization signal 2 at time $t_3$, the composition thread of the electronic device may perform "image frame composition_2" to perform layer composition on the rendered layer 2 to obtain an image frame 2; at time $t_4$ shown in FIG. 4A or FIG. 5A, a vertical synchronization signal 3 arrives; and in response to the vertical synchronization signal 3 at time $t_4$, the LCD of the electronic device may perform "image frame displaying_2" to refresh and display the image frame 2.

At time $t_4$ shown in FIG. 4A or FIG. 5A, a vertical synchronization signal 2 arrives; in response to the vertical synchronization signal 2 at time $t_4$, the composition thread of the electronic device may perform "image frame composition_3" to perform layer composition on the rendered layer 3 to obtain an image frame 3; at time is shown in FIG. 4A or FIG. 5A, a vertical synchronization signal 3 arrives; and in response to the vertical synchronization signal 3 at time $t_5$, the LCD of the electronic device may perform "image frame displaying_3" to refresh and display the image frame 3.

In this embodiment of this application, the "buffered layer" described in S303 refers to the layer buffered in the SF buffer, such as the layer buffered in the SF buffer shown in FIG. 6. For example, in response to the vertical synchronization signal 2 at time $t_2$ shown in FIG. 4A or FIG. 5A, the composition thread of the electronic device may obtain the layer 1 from the SF buffer shown in FIG. 6 (that is, the layer 1 is dequeued from the SF buffer), and perform "image frame composition_1" to perform layer composition on the rendered layer 1, to obtain the image frame 1.

"Buffering the image frame" described in S303 refers to buffering the composited image frame into a frame buffer. The frame buffer can buffer image frames in a queue according to the "first in first out" principle. For example, the image frame 1 obtained by the composition thread of the electronic device by performing "image frame composition_1" shown in FIG. 4A or FIG. 5A may be inserted into the frame buffer shown in FIG. 7A. Then the composition thread of the electronic device performs "image frame composition_2" shown in FIG. 4 or FIG. 5A to obtain the image frame 2 that may continue to be inserted into the frame buffer shown in FIG. 7A; and then the composition thread of the electronic device performs "image frame composition_3" shown in FIG. 4A or FIG. 5A to obtain the image frame 3 that may be inserted into the frame buffer shown in FIG. 7A.

Figure 7A:
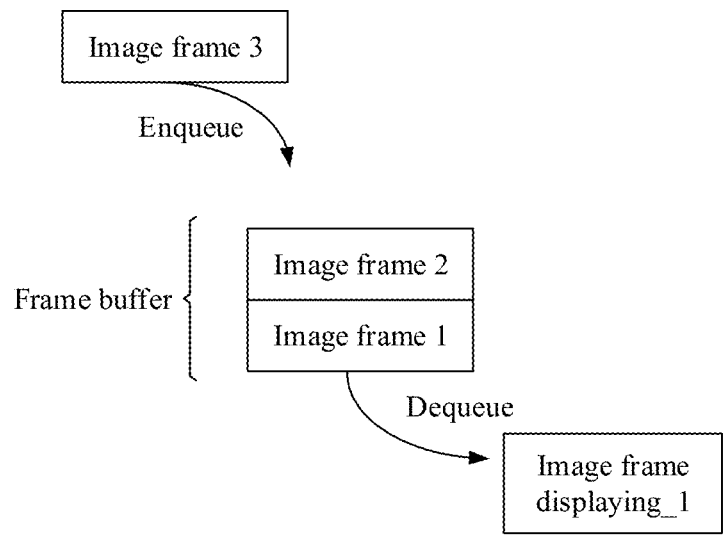
FIG. 7A is a schematic diagram of a method for buffering a layer in a frame buffer according to an embodiment of this application.

The frame buffer buffers the image frame 1, the image frame 2, and the image frame 3 according to the "first in first out" principle. In other words, the layers in the frame buffer shown in FIG. 7A are enqueued in order of the image frame 1, the image frame 2, and the image frame 3, and dequeued in order of the image frame 1, the image frame 2, and the image frame 3. That is, the electronic device performs S304, and in response to the vertical synchronization signal 3, can refresh and display the buffered image frames in the frame buffer according to the "first in first out" principle.

In summary, in the conventional technology, as shown in FIG. 2C, the UI thread of the electronic device is triggered by the vertical synchronization signal 1 to perform the layer drawing task; and the UI thread can perform only one layer drawing task in one synchronization period (that is, within one frame). However, in this embodiment of this application, the UI thread performs the layer drawing task without being triggered by the vertical synchronization signal 1; and the UI thread can perform a plurality of layer drawing tasks in one synchronization period (that is, within one frame). Specifically, as shown in FIG. 4A or FIG. 5A, after the UI thread finishes performing a layer drawing task, the UI thread may use an idle period to perform a next layer drawing task in advance. In this way, the UI thread can perform a plurality of layer drawing tasks in the synchronization period (that is, within one frame).

Figure 7B:
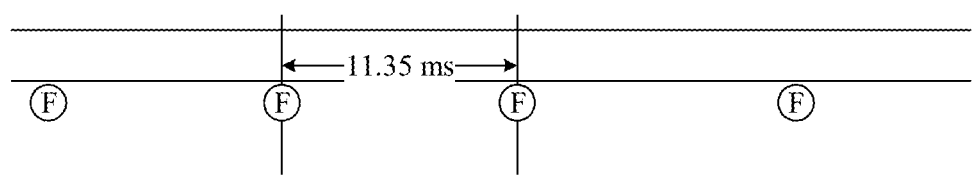
FIG. 7B is a timing diagram for drawing a plurality of frame layers by an electronic device in a conventional technology, as captured by a SysTrace tool.
Figure 7C:
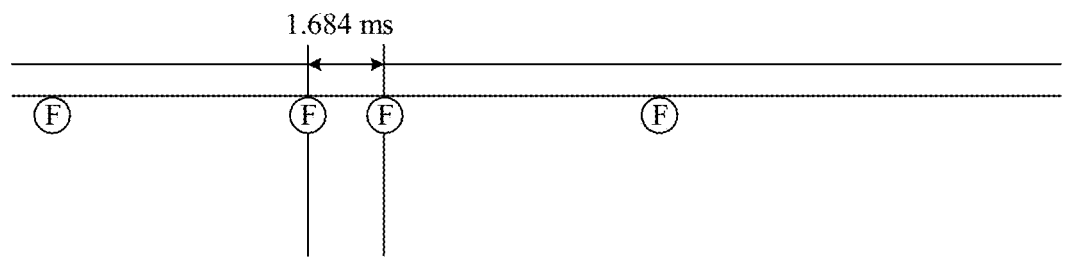
FIG. 7C is a timing diagram for drawing a plurality of frame layers by an electronic device according to an embodiment of this application, as captured by a SysTrace tool.

FIG. 7B is a timing diagram for drawing a plurality of frame layers by the electronic device, as captured by a person skilled in the art by using a general SysTrace tool of Android (Android®) when the electronic device implements the solution of the conventional technology. FIG. 7C is a timing diagram for drawing a plurality of frame layers by the electronic device, as captured by a person skilled in the art by using a SysTrace tool when the electronic device implements the solution of this embodiment of this application. Herein, by comparing FIG. 7B and FIG. 7C in this embodiment of this application, the solution of this embodiment of this application and the solution of the conventional technology can be distinguished. For the detailed description of the SysTrace tool, refer to the related description in the conventional technology. Details are not described herein.

It is assumed that a screen refresh rate of the electronic device is 90 Hz, and that the signal period of the vertical synchronization signal 1 is 11.11 ms. By performing the solution of the conventional technology, the electronic device draws one frame layer in response to one vertical synchronization signal 1, and draws a next frame layer in response to a next vertical synchronization signal 1. Therefore, a frame interval between two adjacent frame layers is equal to the signal period of the vertical synchronization signal 1 (for example, 11.11 ms). When duration of drawing one frame layer is longer than the signal period, the frame interval between this layer and the next frame layer is longer than the signal period of the vertical synchronization signal 1 (for example, 11.11 ms). In other words, when the solution of the conventional technology is performed, the frame interval between two adjacent frame layers is not shorter than the signal period of the vertical synchronization signal 1. As shown in FIG. 7B, the frame interval between two adjacent layers is longer than or equal to 11.11 ms. For example, the frame interval between two adjacent layers is 11.35 ms, where 11.35 ms is greater than 11.11 ms.

By performing the solution of this embodiment of this application, the electronic device can draw a next frame layer in response to finishing drawing one frame layer, without waiting for the vertical synchronization signal 1. Therefore, a frame interval between two adjacent frame layers is shorter than the signal period of the vertical synchronization signal 1 (for example, 11.11 ms). When duration of drawing one frame layer is relatively long, the frame interval between this layer and the next frame layer may be longer than or equal to the signal period of the vertical synchronization signal 1 (for example, 11.11 ms). In other words, when the solution of this embodiment of this application is performed, the frame interval between two adjacent frame layers may be shorter than the signal period of the vertical synchronization signal 1. As shown in FIG. 7C, the frame interval between two adjacent layers is 1.684 ms, where 1.684 ms is less than 11.11 ms.

In this embodiment of this application, after the electronic device finishes performing one layer drawing task, the electronic device may continue to perform the next layer drawing task, instead of waiting for the arrival of the vertical synchronization signal 1 before performing the next layer drawing task. In other words, the electronic device can use an idle period (the period Δt1 shown in FIG. 2C) of the UI thread to perform the next layer drawing task in advance. In this way, the layer drawing and rendering tasks can be finished in advance, the frame loss possibility in image displaying by the electronic device can be reduced, smoothness of the images displayed on the display can be ensured, and visual experience of the user can be improved.

In the conventional technology, in response to the user's touch operation on the TP or a UI event, the electronic device may start the foregoing process of layer drawing, rendering, composition, and image frame displaying based on the vertical synchronization signal. In this embodiment of this application, in response to the user's touch operation on the TP or a UI event, the electronic device may also start the foregoing process of layer drawing, rendering, composition, and image frame displaying based on the vertical synchronization signal. A difference between the solution of this embodiment of this application and the conventional technology is: after starting the foregoing process, the electronic device may no longer perform the layer drawing task based on the vertical synchronization signal 1; instead, in response to finishing the previous layer drawing task, continue to perform the next layer drawing task.

However, in this embodiment of this application, the electronic device does not perform layer drawing, rendering, composition, and image frame displaying for all touch operations or UI events according to the process of S301 to S304. In this embodiment of this application, when the image displayed by the electronic device triggered by the touch operation or UI event is a "deterministic animation", the electronic device may perform layer drawing, rendering, composition, and image frame displaying according to the process of S301 to S304.

Specifically, before the foregoing S301, the method in this embodiment of this application may further include: the electronic device receives a first UI event. In response to the first UI event, the electronic device may wake up the vertical synchronization signal. After waking up the vertical synchronization signal, the electronic device can perform S301 to S304. The first UI event is used to trigger the electronic device to display preset image content or display image content in a preset manner. The preset image content or the image content displayed in the preset manner may be referred to as "deterministic animation".

In an implementation, the first UI event may be a user operation received by the electronic device. In this implementation, the first UI event is a user operation (such as a touch operation) that can trigger the electronic device to display predefined image content. In other words, the image content displayed by the electronic device triggered by the first UI event may be predetermined by the electronic device. Therefore, the electronic device can use an idle period of the UI thread to perform the layer drawing task in advance.

For example, the first UI event may be a fling operation (also referred to as a fling gesture) input by the user on the display (for example, the touchscreen) of the electronic device. The electronic device receives the fling gesture input by the user, and the user's finger slides against the display. After the finger leaves the display, the animation displayed on the display still slides in a sliding direction of the finger with "inertia" until stop. In other words, based on to the inertia of the fling gesture, the electronic device may calculate the image content to be displayed by the electronic device. In this case, the electronic device may use an idle period of the UI thread to perform the layer drawing task in advance.

Figure 7D:
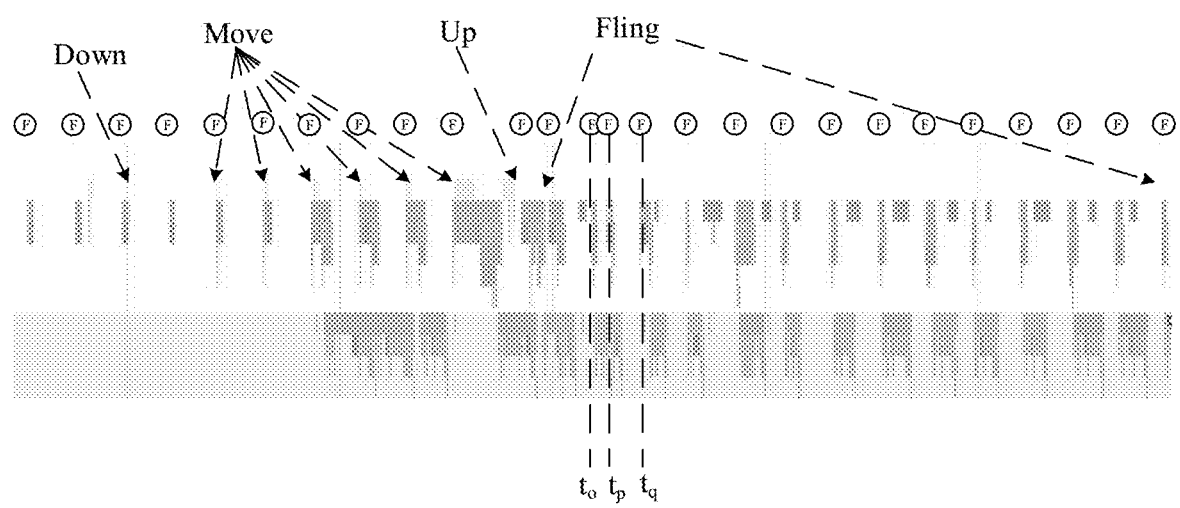
FIG. 7D is another timing diagram for drawing a plurality of frame layers by an electronic device according to an embodiment of this application, as captured by a SysTrace tool.

For example, FIG. 7D is a timing diagram for drawing a plurality of frame layers by the electronic device, as captured by a person skilled in the art by using the SysTrace tool in a process in which the electronic device receives and responds to a fling operation.

That the electronic device receives and responds to the fling operation may be divided into four stages: falling down (Down), move (Move), lifting up (Up), and fling (Fling), as shown in FIG. 7D. "Down" shown in FIG. 7D means that the user's finger falls down on the display (for example, the touchscreen) of the electronic device, and the electronic device can detect that the user's finger is down (Down). "Move" shown in FIG. 7D means that the user's finger slides on the display after falling down on the display, and the electronic device can detect the move (Move) of the user's finger. "Up" shown in FIG. 7D means that the user's finger leaves the display after sliding a distance on the display, that is, the finger is lifted up from the display, and the electronic device can detect that the user's finger is up (Up). "Fling" shown in FIG. 7D means that after the user lifts the finger, the animation displayed on the display still slides in the sliding direction of the finger with the "inertia".

It may be understood that when the user's finger is lifted up (Up), a trajectory of the fling can be determined based on the moving inertia according to the sliding operation before the user's finger is lifted, meaning that the trajectory of the fling can be estimated. Therefore, at the fling stage shown in FIG. 7D, the electronic device can draw a layer in advance. As shown in FIG. 7D, a frame interval between two adjacent layers in a period from time $t_o$ to time $t_p$, and a frame interval between two adjacent layers in a period from $t_p$ to $t_q$ are relatively short, shorter than a frame interval between two adjacent layers in other times. The frame interval between two adjacent layers in other times is equal to the signal period of the vertical synchronization signal 1. It can be learned that, at the fling stage shown in FIG. 7D, the electronic device draws at least two layers in advance.

For example, the first UI event may also be the user's tap operation on a preset control in a foreground application. The foreground application is an application corresponding to a screen currently displayed on the display of the electronic device. Image content to be displayed by the electronic device in response to the user's tap operation on the preset control is predefined. Therefore, the electronic device can use an idle period of the UI thread to perform the layer drawing task in advance.

Figure 8A:
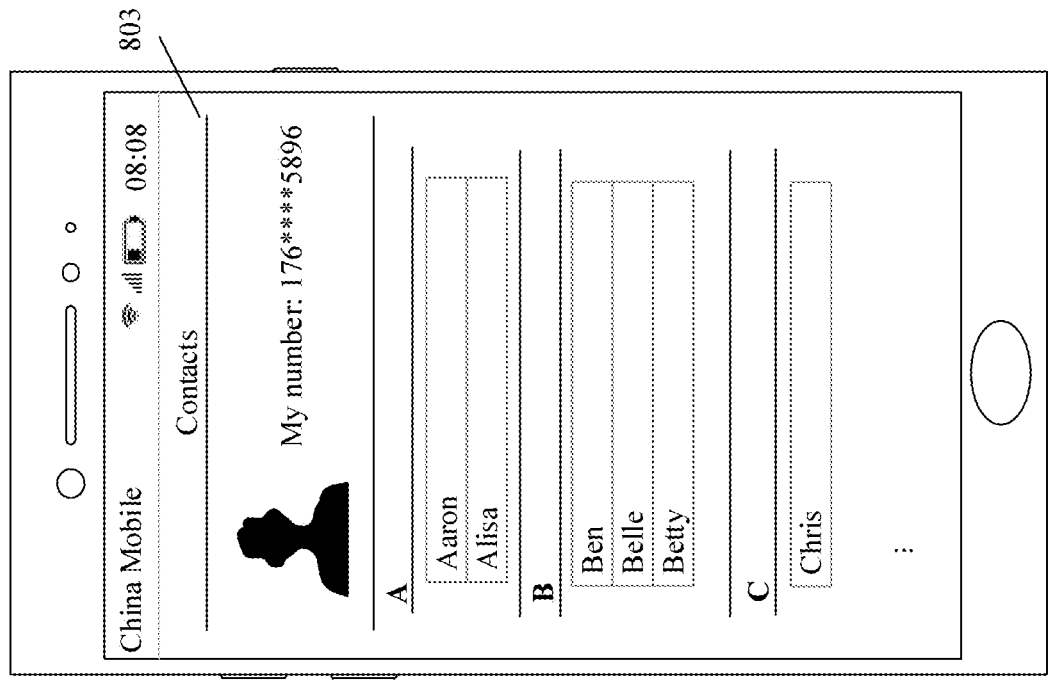
FIG. 8A is a schematic diagram of a display screen of an electronic device according to an embodiment of this application.
Figure 8A:
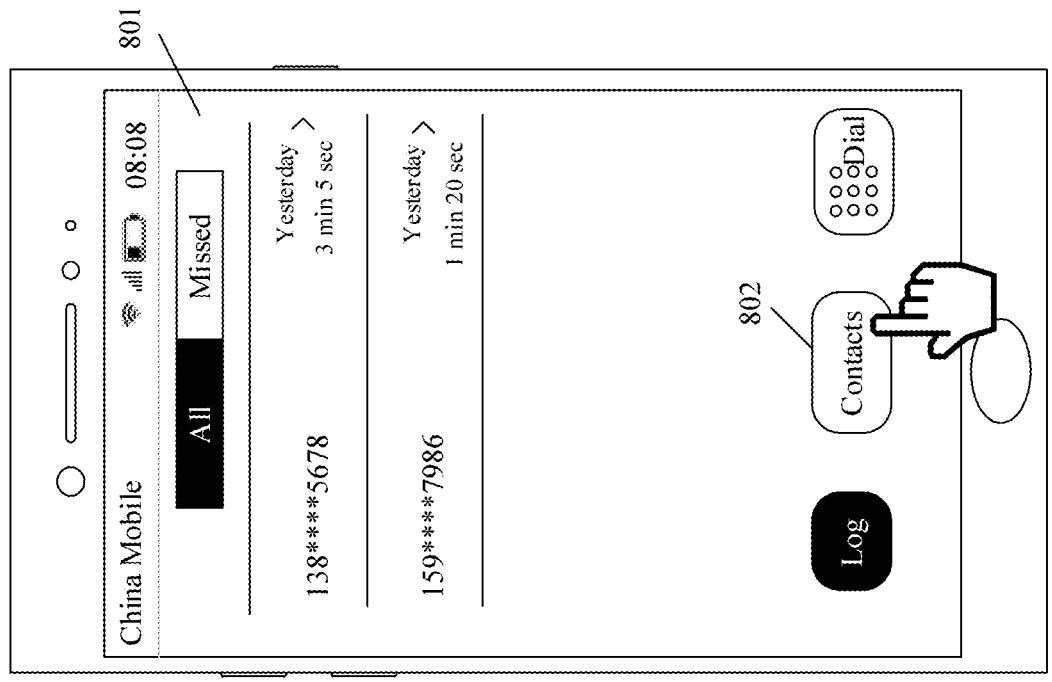

For example, assuming that the electronic device is a mobile phone, the mobile phone displays a call log screen 801 of a phone application shown in FIG. 8A part (a). The first UI event may be the user's tap operation on a preset control "Contacts" 802 in the call log screen 801. The user's tap operation on the preset control "contacts" 802 is used to trigger the mobile phone to display a Contacts screen, for example, the contacts screen 803 shown in FIG. 8A part (b). The contacts screen is predefined. Therefore, in response to the user's tap operation on the preset control "Contacts" 802, the mobile phone can wake up the vertical synchronization signal, and perform the method in this embodiment of this application.

Figure 8B:
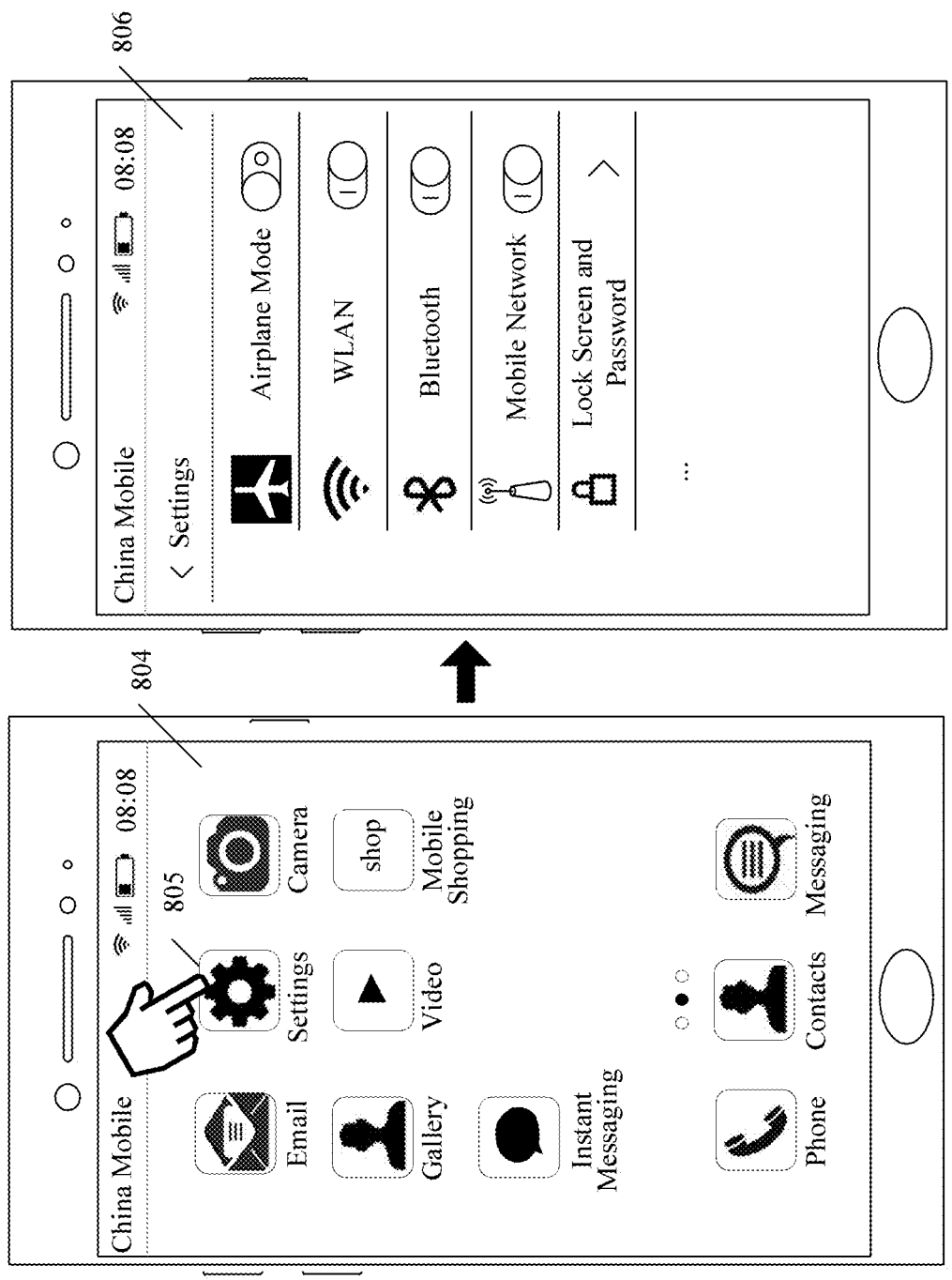
FIG. 8B is another schematic diagram of a display screen of an electronic device according to an embodiment of this application.

For another example, assuming that the electronic device is a mobile phone, the mobile phone displays a home screen 804 shown in FIG. 8B part (a). The home screen 804 includes an icon 805 of a settings application. The first UI event may be the user's tap operation on the icon 805 of the settings application shown in FIG. 8B part (a). The user's tap operation on the icon 805 of the settings application (that is, a preset control) is used to trigger the mobile phone to display a settings screen, for example, the settings screen 806 shown in FIG. 8B part (b). The settings screen 806 is predefined. Therefore, in response to the user's tap operation on the icon 805 of the settings application, the mobile phone can wake up the vertical synchronization signal, and perform the method in this embodiment of this application.

In addition, a screen displayed by the mobile phone in response to the user's tap operation on some function options (such as a mobile network option or a lock screen password option) in the settings screen 806 is also predefined. For example, in response to the user's tap operation on the mobile network option in the settings screen 806, the mobile phone may display a mobile network setting screen. The mobile network setting screen is predefined. Therefore, in response to the user's tap operation on some function options in the settings screen, the mobile phone can wake up the vertical synchronization signal, and perform the method in this embodiment of this application.

Figure 8C:
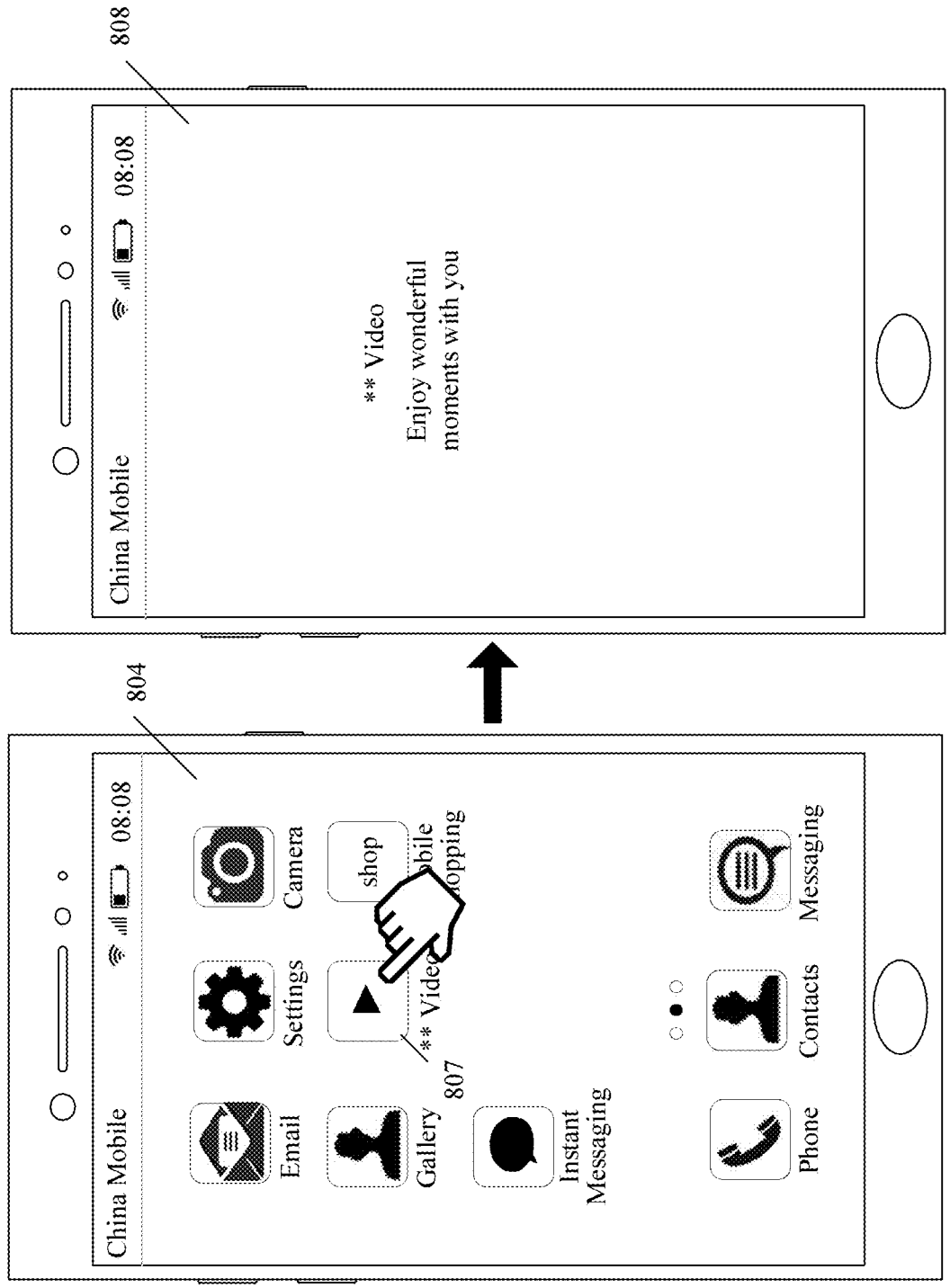
FIG. 8C is another schematic diagram of a display screen of an electronic device according to an embodiment of this application.

For another example, assuming that the electronic device is a mobile phone, the mobile phone displays a home screen 804 shown in FIG. 8C part (a). The home screen 804 includes an icon 807 of a video application. The first UI event may be the user's tap operation on the icon 807 of the video application shown in FIG. 8C part (a). The user's tap operation on the icon 807 of the video application (that is, a preset control) is used to trigger the mobile phone to display a homepage of the video application. Generally, before the mobile phone displays the homepage of the video application, an advertisement page of the video application shown in FIG. 8C part (b) may be displayed. The advertisement page of the video application is predefined. Therefore, in response to the user's tap operation on the icon 807 of the video application, the mobile phone can wake up the vertical synchronization signal, and perform the method in this embodiment of this application.

In another implementation, the first UI event may be a UI event automatically triggered by the electronic device. For example, when a foreground application of the electronic device is automatically switched between pictures, the UI event may be triggered. The foreground application is an application corresponding to a screen currently displayed on the display of the electronic device.

In this embodiment of this application, when the electronic device displays a "deterministic animation" in response to the first UI event, the electronic device may perform layer drawing, rendering, composition, and image frame displaying according to the process of S301 to S304. In this way, while accuracy of the content displayed by the electronic device is ensured, the frame loss possibility in image displaying by the electronic device can be reduced, smoothness of the images displayed on the display can be ensured, and visual experience of the user can be improved.

In other embodiments, after the electronic device enables a preset function or enters a preset mode, the electronic device may perform layer drawing, rendering, composition, and image frame displaying according to the process of S301 to S304. For example, the preset function may also be referred to as an advance drawing function, a preprocessing function, or an intelligent layer processing function. The preset mode may also be referred to as an advance drawing mode, a preprocessing mode, an intelligent layer processing mode, or the like.

The electronic device may enable the preset function or enter the preset mode in response to the user's operation of enabling the preset option in the electronic device. For example, the preset option may be a function switch of the settings screen of the electronic device.

It can be learned from the foregoing embodiment that the layers rendered by the render thread of the electronic device are buffered in the SF buffer, and in response to the vertical synchronization signal 2, the composition thread sequentially performs layer composition on the layers buffered in the SF buffer. Generally, up to N frame layers can be buffered in the SF buffer of the electronic device. For example, N=2 or N=3. However, for the foregoing solution of this embodiment of this application, if the SF buffer of the electronic device can buffer only two frame layers, there may be a problem that a layer drawn and rendered in advance by the electronic device cannot be buffered in the SF buffer. Therefore, the layer drawn and rendered by the electronic device in advance overflows because the buffer space of the SF buffer is insufficient.

Figure 9:
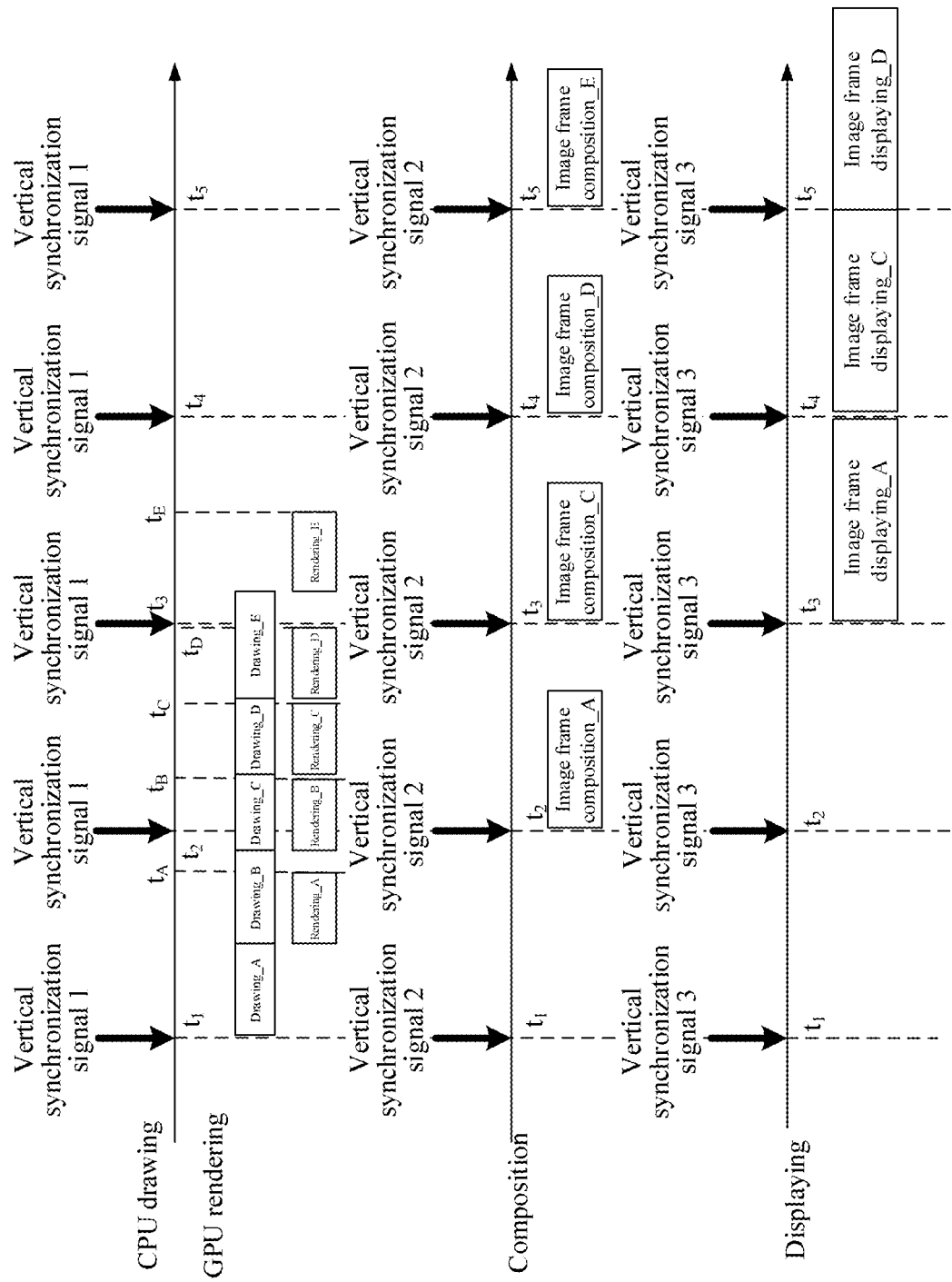
FIG. 9 is another schematic principle diagram of layer drawing, rendering, composition, and image frame displaying by an electronic device according to an embodiment of this application.

For example, referring to FIG. 9 and FIG. 10A to FIG. 10D, FIG. 10 is a schematic principle diagram of layer drawing, rendering, composition, and image frame displaying in the method in this embodiment of this application; and FIG. 10A to FIG. 10D show enqueuing and dequeuing of layers in the SF buffer in the process of performing the method by the electronic device in FIG. 9.

As shown in FIG. 9, the UI thread of the electronic device may perform "drawing_A" to draw a layer A in response to the vertical synchronization signal 1 at time $t_1$, and then the render thread may perform "rendering_A" to render the layer A. The render thread of the electronic device finishes performing "rendering_A" at time $t_A$ shown in FIG. 9 or FIG. 10A. At time $t_A$, as shown in FIG. 10A, the rendered layer A is enqueued in the SF buffer.

Figure 10A:
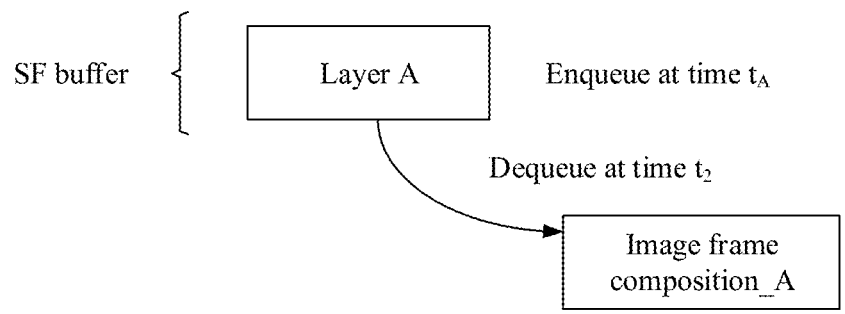
FIG. 10A is a schematic diagram of another method for buffering a layer in an SF buffer according to an embodiment of this application.

As shown in FIG. 9, at time $t_2$ before time $t_B$, the vertical synchronization signal 2 arrives, and in response to the vertical synchronization signal 2 at time $t_2$, the composition thread of the electronic device may perform "image frame composition_A"; therefore, at time $t_2$, as shown in FIG. 10A, the layer A is dequeued from the SF buffer, and the composition thread performs "image frame composition_A".

Figure 10B:
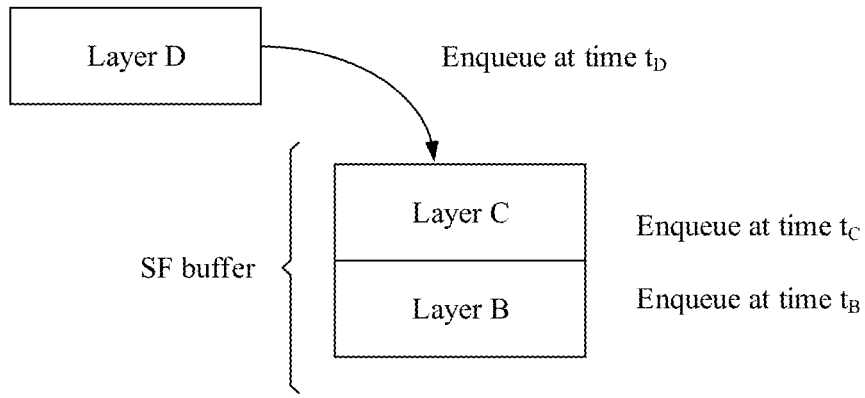
FIG. 10B is a schematic diagram of another method for buffering a layer in an SF buffer according to an embodiment of this application.

At time $t_B$ shown in FIG. 9, the render thread finishes performing "rendering_B"; therefore, as shown in FIG. 10B, a rendered layer B is enqueued in the SF buffer at time $t_B$. At time $t_C$ shown in FIG. 9, the render thread finishes performing "rendering_C"; therefore, as shown in FIG. 10B, a rendered layer C is enqueued in the SF buffer at time $t_C$.

Figure 10C:
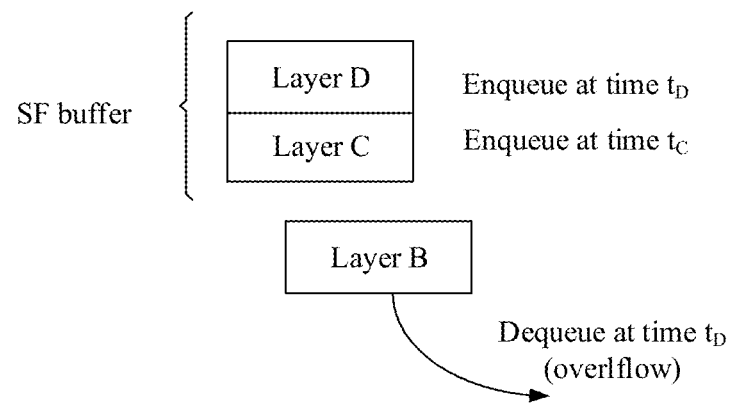
FIG. 10C is a schematic diagram of another method for buffering a layer in an SF buffer according to an embodiment of this application.

In addition, at time $t_D$ shown in FIG. 9, the render thread finishes performing "rendering_D"; therefore, as shown in FIG. 10B, a rendered layer D is enqueued in the SF buffer at time $t_D$. However, at time $t_3$ after time $t_D$, a next vertical synchronization signal 2 (that is, a next vertical synchronization signal 2 after time $t_2$) arrives, the layer B shown in FIG. 10B is dequeued from the SF buffer, and the composition thread performs "image frame composition_B". In other words, when the layer D is enqueued in the SF buffer at time $t_D$, the layer B has not been dequeued by the composition thread by performing "image frame composition_B". In this case, as shown in FIG. 10C, the layer D is enqueued in the SF buffer at time $t_D$, and the layer B is caused to be dequeued from the SF buffer at time $t_D$, that is, the layer B overflows from the SF buffer at time $t_D$.

Figure 10D:
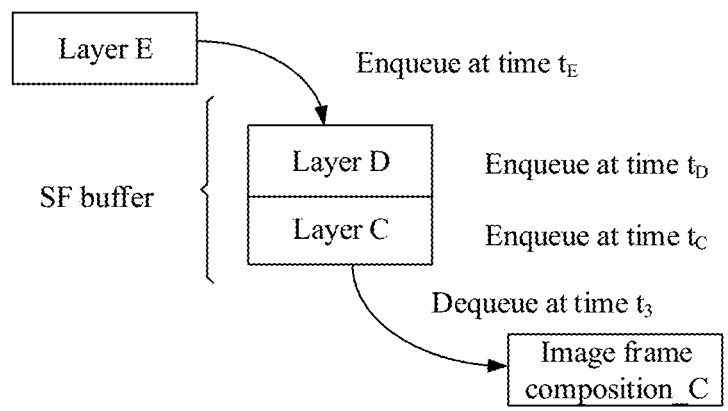
FIG. 10D is a schematic diagram of another method for buffering a layer in an SF buffer according to an embodiment of this application.

Therefore, in response to the vertical synchronization signal 2 at time $t_3$ shown in FIG. 9, only the layer C shown in FIG. 10D can be dequeued from the SF buffer, and the composition thread performs "image frame composition_C". As can be learned from FIG. 9, due to the overflow of the layer C shown in FIG. 10C, the electronic device performs "image frame displaying_A" in a synchronization period from time $t_3$ to time $t_4$ to refresh and display an image frame A, and then directly refreshes and performs "image frame displaying_C" to refresh and display an image frame C in a next frame (that is, a synchronization period from time $t_4$ to time $t_5$), instead of refreshing and displaying an image frame B corresponding to "rendering_B". Consequently, a frame loss phenomenon occurs, continuity of the images displayed by the electronic device is affected, and visual experience of the user is affected.

To resolve the problem that the layer overflow in the SF buffer affects the continuity of the images displayed by the electronic device, the electronic device may further expand a a buffer space of the SF buffer. For example, the electronic device may set the buffer space of the SF buffer to M+p frames.

In some embodiments, a size of the buffer space of the SF buffer (that is, M+p) may be determined based on a quantity of frames lost by the electronic device within a preset time. M is the size of the buffer space of the SF buffer before the setting; and p is the quantity of frames lost by the electronic device within the preset time.

Specifically, the electronic device may count the quantity of frames lost in the process of performing the first UI event by the electronic device within the preset time, and set the size of the buffer space of the SF buffer (that is, M+p) based on the counted quantity p of lost frames. For example, the preset time may be one week, one day, or half a day before the electronic device receives the first UI event this time.

In other embodiments, M is the size of the buffer space of the SF buffer before the setting, and p is a preset positive integer. A specific value of p may be preconfigured in the electronic device, or may be set by the user. For example, p may be equal to any positive integer such as 1, 2, or 3.

In this embodiment, in response to finishing rendering the second layer, if the SF buffer is insufficient for buffering a new layer, the electronic device may expand the SF buffer to enlarge the SF buffer. Every time the electronic device expands the SF buffer, the buffer space of the SF buffer can be increased by p frames. For example, the SF buffer preconfigured by the electronic device may buffer two frame layers (that is, M=2), and p=1. The electronic device may expand the SF buffer, so that the SF buffer can buffer three frame layers, that is, M+p=3.

In this embodiment of this application, an upper limit N of the SF buffer may be set. Specifically, the electronic device may set the buffer space of the SF buffer to a maximum of N frames. In other words, when M+p is greater than the preset upper limit N, the electronic device may set the buffer space of the SF buffer to N frames. A specific value of N may be preconfigured in the electronic device, or may be set by the user. For example, N may be equal to any positive integer such as 5, 6, 8, or 10.

In other embodiments, the electronic device may preconfigure the size of the buffer space of the SF buffer. For example, in response to the first UI event, the electronic device may preconfigure the size of the buffer space of the SF buffer (that is, M+p) based on the first UI event. For example, M+p may be equal to any positive integer such as 5, 6, 8, or 10.

Figure 10E:
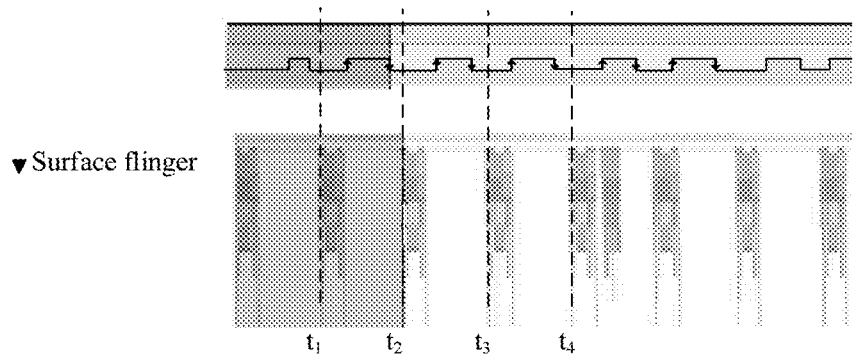
FIG. 10E is a schematic diagram of changing of frames buffered in an SF buffer in a process of drawing a plurality of frame layers by an electronic device in a conventional technology.
Figure 10F:
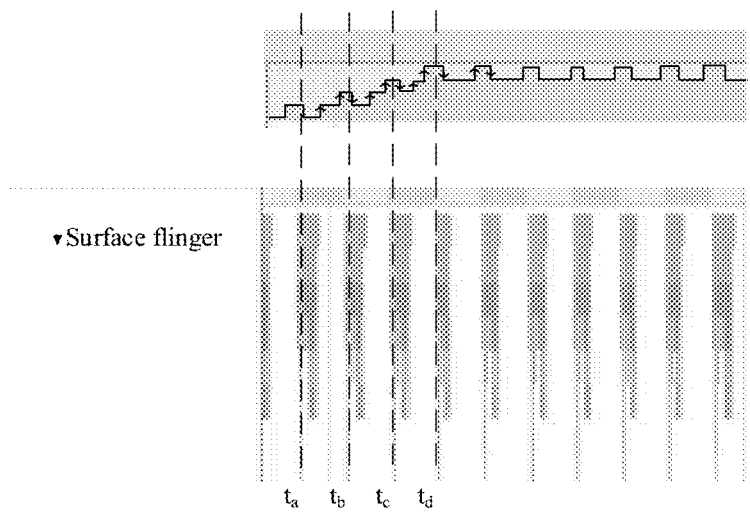
FIG. 10F is a schematic diagram of changing of frames buffered in an SF buffer in a process of drawing a plurality of frame layers by an electronic device according to an embodiment of this application.

For example, FIG. 10E is a schematic diagram of changing of buffered frames in the SF buffer, where the changes are captured by a person skilled in the art by using the general SysTrace tool of Android® when the electronic device performs the solution of the conventional technology. FIG. 10F is a schematic diagram of changing of buffered frames in the SF buffer, where the changes are captured by a person skilled in the art by using the SysTrace tool when the electronic device performs the solution of this embodiment of this application. Herein, by comparing FIG. 10E and FIG. 10F in this embodiment of this application, differences in the changing of the SF buffer in the solution of this embodiment of this application and the solution of the conventional technology can be analyzed, to illustrate that the SF buffer can be expanded by the electronic device by performing the method in this embodiment of this application.

It should be noted that each up arrow shown in FIG. 10E and FIG. 10F is used to indicate that one buffered frame is added to the SF buffer; and each down arrow shown in FIG. 10E and FIG. 10F is used to indicate that one buffered frame is subtracted from the SF buffer.

When the electronic device performs the solution of the conventional technology, only one buffered frame can be added to the buffered frames in the SF buffer in each signal period. Moreover, when the electronic device performs the solution of the conventional technology, a quantity of buffered frames in the SF buffer does not exceed 3.

For example, in the signal period from time $t_1$ to time $t_2$ shown in FIG. 10E, one buffered frame is added to the SF buffer, then one buffered frame is subtracted, and the quantity of buffered frames in the SF buffer does not exceed 3. In the signal period from time $t_2$ to time $t_3$ shown in FIG. 10E, one buffered frame is added to the SF buffer, then one buffered frame is subtracted, and the quantity of buffered frames in the SF buffer does not exceed 3. In the signal period from time $t_3$ to time $t_4$ shown in FIG. 10E, one buffered frame is added to the SF buffer, then one buffered frame is subtracted, and the quantity of buffered frames in the SF buffer does not exceed 3.

When the electronic device performs the method in this embodiment of this application, a plurality of buffered frames may be added to the buffered frames in the SF buffer in each signal period. Moreover, when the electronic device performs the method in this embodiment of this application, the quantity of buffered frames in the SF buffer may not exceed 3.

For example, in a signal period from time $t_a$ to time $t_b$ shown in FIG. 10F, two buffered frames are added to the SF buffer, and the SF buffer includes at least two buffered frames. In a signal period from time $t_b$ to time $t_c$ shown in FIG. 10F, in the SF buffer, one buffered frame is subtracted, two buffered frames are added, and the SF buffer includes at least three buffered frames. In a signal period from time $t_c$ to time $t_d$ shown in FIG. 10E, in the SF buffer, one buffered frame is subtracted, two buffered frames are added, and the SF buffer includes at least four buffered frames.

In other embodiments, to prevent the layer overflow in the SF buffer from affecting the continuity of the images displayed by the electronic device, in this embodiment of this application, before performing the foregoing S302, the electronic device may determine whether the SF buffer has sufficient a buffer space for buffering the layer drawn and rendered in advance by the electronic device. Specifically, before S302, the method in this embodiment of this application may further include S1001 and S1002.

S1001. The electronic device determines the buffer space of the SF buffer and the quantity of buffered frames in the SF buffer.

The buffer space of the SF buffer refers to a maximum quantity of layers that can be buffered in the SF buffer. The quantity of buffered frames in the SF buffer refers to a quantity of layers currently buffered in the SF buffer.

S1002. The electronic device calculates a difference between the buffer space of the SF buffer and the quantity of buffered frames in the SF buffer to obtain a remaining buffer space of the SF buffer.

For example, assuming that the buffer space of the SF buffer is 3 frames, and that the quantity of buffered frames in the SF buffer is 2 frames, the remaining buffer space of the SF buffer is 1 frame.

After S1002, if the remaining buffer space of the SF buffer is greater than a first preset threshold, the electronic device may perform S302. It may be understood that if the remaining buffer space of the SF buffer is greater than the first preset threshold, it indicates that the remaining buffer space of the SF buffer is sufficient for buffering the layer drawn and rendered in advance. In this case, the electronic device may perform S302 to draw and render the layer in advance.

After S1002, if the remaining buffer space of the SF buffer is less than a second preset threshold, it indicates that the remaining buffer space of the SF buffer is insufficient for buffering the layer drawn and rendered in advance. In this case, the electronic device does not perform S302 to draw and render the layer in advance; instead, in a manner in the conventional technology, in response to the vertical synchronization signal 1, the electronic device draws the second layer, renders the second layer, and buffers the rendered second layer in the SF buffer.

It should be noted that, in this embodiment of this application, the electronic device may perform S1001 and S1002 every time after finishing drawing a layer (that is, the first layer) and before drawing a next layer (that is, the second layer). After S1002, if the remaining buffer space of the SF buffer is greater than the first preset threshold, the electronic device may perform S302 to draw and render the layer in advance. After S1002, if the remaining buffer space of the SF buffer is less than the second preset threshold, the electronic device does not perform S302 to draw and render the layer in advance, but instead, draws and renders the layer in response to the vertical synchronization signal 1. In the process in which the electronic device draws and renders the layer in response to the vertical synchronization signal 1, and buffers the rendered layer in the SF buffer, if the electronic device receives the first UI event again, the electronic device may perform S301 to S304.

In this embodiment of this application, when the remaining buffer space of the SF buffer is greater than the first space threshold, that is, when the remaining buffer space of the SF buffer is sufficient for buffering the layer drawn and rendered in advance, the electronic device performs the method in this embodiment of this application to draw and render the layer in advance. In this way, a frame loss problem in layer drawing and rendering in advance due to insufficient a buffer space in the SF buffer can be reduced, the frame loss possibility in image displaying by the electronic device can be reduced, continuity of the images displayed on the display can be ensured, and visual experience of the user can be improved.

Generally, an Android® original animation algorithm calculates a motion distance of the layer based on the time when the UI thread starts to draw the layer, and draws the layer based on the motion distance of the layer. However, for the solution of this embodiment of this application in which the electronic device uses an idle period of the UI thread to draw the layer in advance, if the foregoing manner is used to calculate the motion distance, a picture displayed by the electronic device is prone to jitter.

Figure 11A:
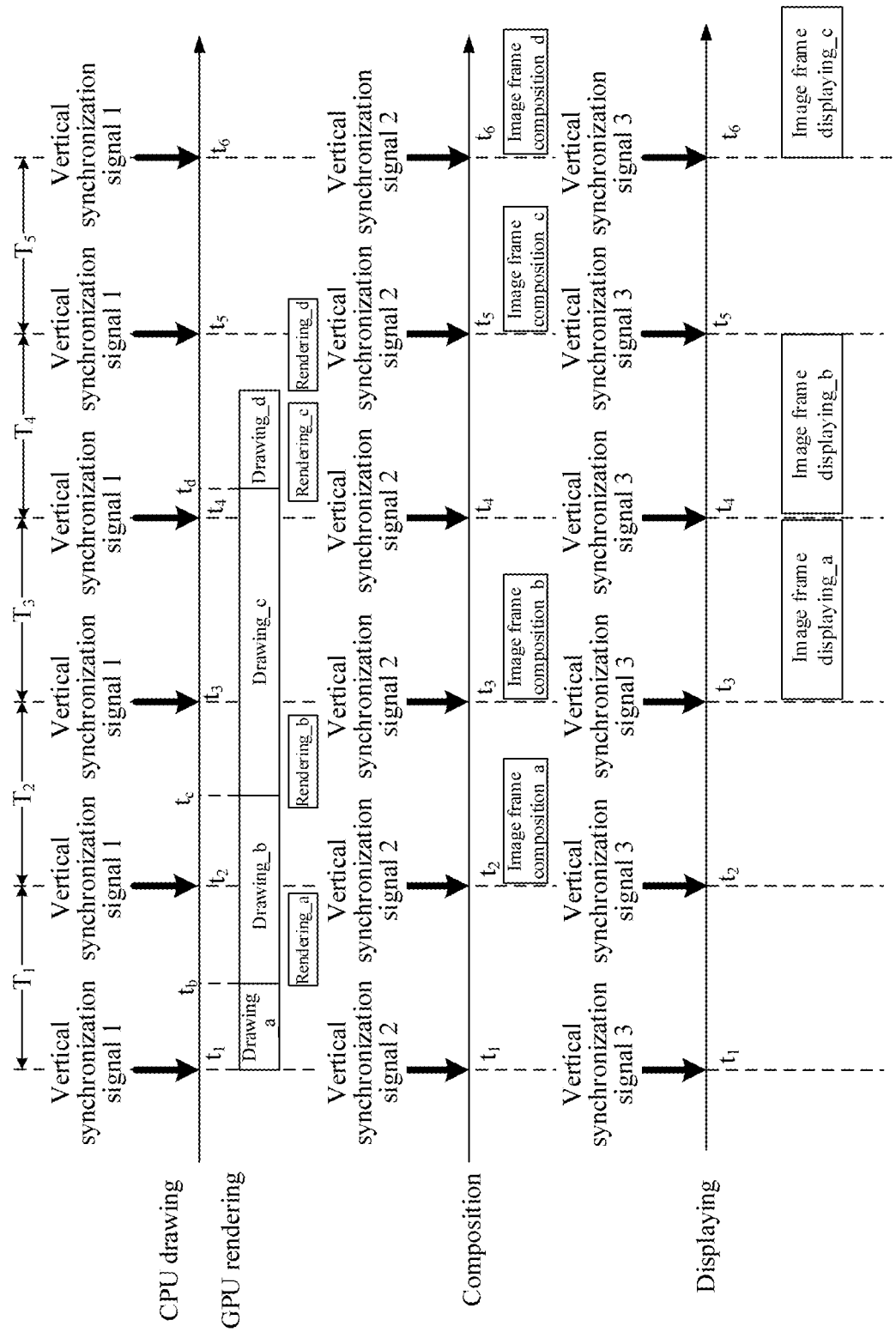
FIG. 11A is another schematic principle diagram of layer drawing, rendering, composition, and image frame displaying by an electronic device according to an embodiment of this application.

For example, as shown in FIG. 11A, the electronic device performs "drawing_A" to draw a layer a in response to the vertical synchronization signal 1 at time $t_1$. By using the Android® original animation algorithm, the electronic device may calculate a motion distance of the layer a based on the time when the electronic device starts to draw the layer a (that is, time $t_1$), and draw the layer a based on the motion distance of the layer a. A motion distance of a layer is a motion distance of image content in the layer with respect to image content in a previous frame layer.

As shown in FIG. 11A, the electronic device starts to perform "drawing_b" at time $t_b$ to draw a layer b. By using the Android® original animation algorithm, the electronic device may calculate a motion distance of the layer b based on the time when the electronic device starts to draw the layer b (that is, time $t_b$), and draw the layer b based on the motion distance.

As shown in FIG. 11A, the electronic device starts to perform "drawing_c" at time $t_c$ to draw a layer c. By using the Android® original animation algorithm, the electronic device may calculate a motion distance of the layer c based on the time when the electronic device starts to draw the layer c (that is, time $t_c$), and draw the layer c based on the motion distance.

As shown in FIG. 11A, the electronic device starts to perform "drawing_d" at time $t_d$ to draw a layer d. By using the Android® original animation algorithm, the electronic device may calculate a motion distance of the layer d based on the time when the electronic device starts to draw the layer d (that is, time td), and draw the layer d based on the motion distance.

Figure 11B:
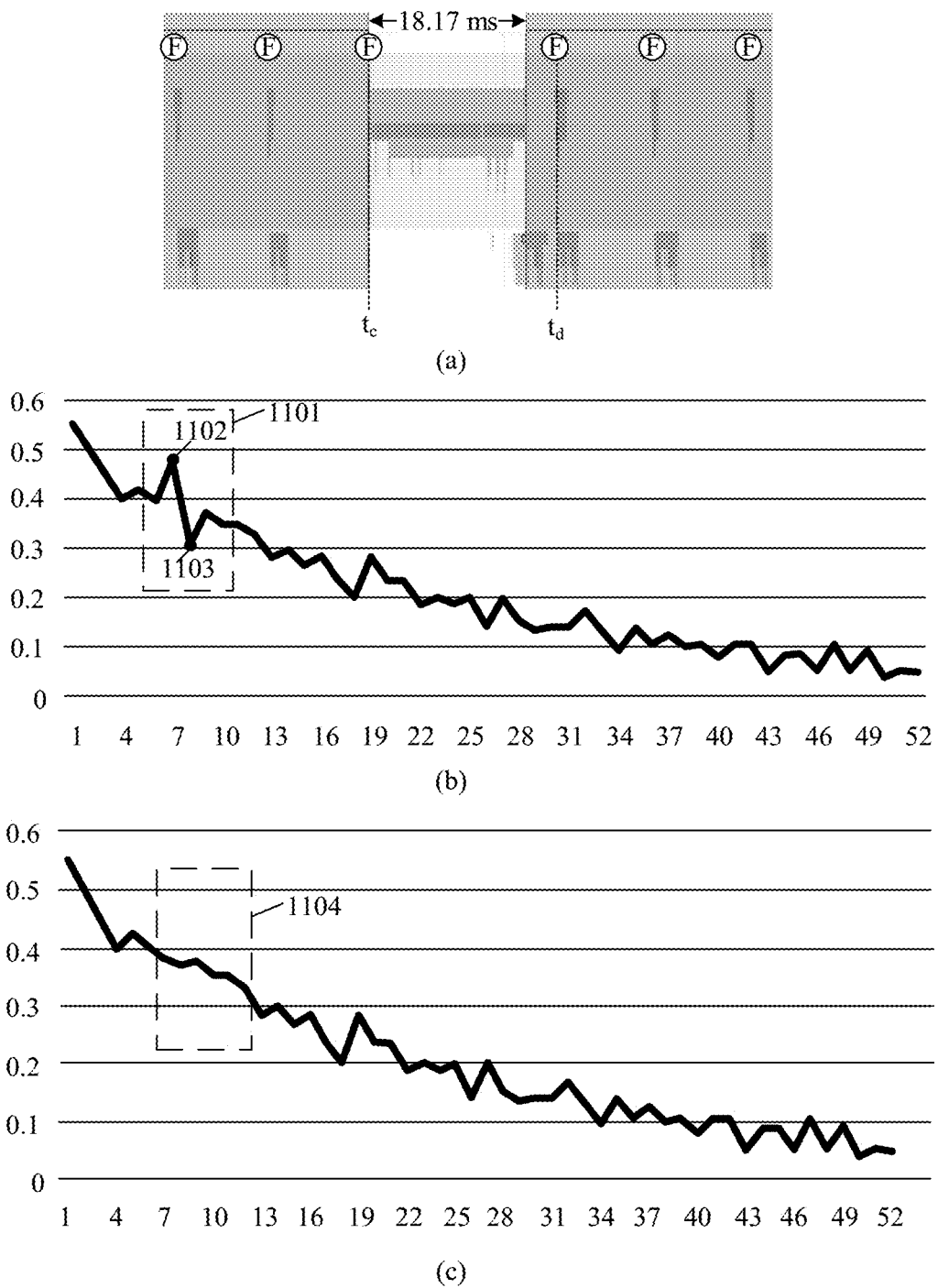
FIG. 11B is a schematic diagram of changing of motion distances of layers according to an embodiment of this application.

If duration of drawing one frame layer is excessively long (as shown in FIG. 11A, duration of drawing the layer c is excessively long), not only the frame loss problem occurs, but also a time difference between a time when the electronic device starts to draw a next frame layer (such as the layer d) and a time when the electronic device starts to draw the layer c is excessively large. For example, it is assumed that the signal period of the vertical synchronization signal 1 is 16.67 ms. As shown in FIG. 11B part (a), a time difference between time $t_c$ and time $t_d$ is excessively large, and the time difference is greater than 18.17 ms. Further, the difference between the time when the electronic device starts to draw the layer d and the time when the electronic device starts to draw the layer c differs from the synchronization period (that is, the signal period of the vertical synchronization signal 1) excessively greatly.

By using the Android® original animation algorithm, when the motion distance of the layer is calculated based on the time of starting to draw the layer, if a time difference between a time of starting to draw a frame layer and a time of starting to draw a previous frame layer differs from the synchronization period (that is, the signal period of the vertical synchronization signal 1) more greatly, the motion distance of the frame layer is longer.

However, duration of refreshing and displaying each frame of image (that is, one image frame) by the electronic device is fixed, and is one synchronization period. The synchronization period (that is, the signal period of the vertical synchronization signal 1) is a reciprocal of a frame rate of the electronic device.

Therefore, when the electronic device refreshes and displays a plurality of frames of image with different motion distances separately with fixed duration (that is, one synchronization period), a displayed picture jitters. For example, assuming that the frame rate of the electronic device is 90 Hz, the synchronization period is 11.1 ms. For example, the electronic device needs to display a dynamic image of a train that travels at a constant speed. The original animation algorithm calculates a motion distance based on a time of starting to draw each layer shown in FIG. 11A, and a display effect of the electronic device is: as shown in FIG. 11A, the train travels at a constant speed in one image frame corresponding to "drawing_a"; the train travels at a constant speed in one image frame corresponding to "drawing_b"; the train suddenly accelerates in one image frame corresponding to "drawing_c"; and the train suddenly decelerates in one image frame corresponding to "drawing_d". In other words, the picture displayed by the electronic device jitters.

It can be learned that the calculation of the motion distance based on the time difference is not applicable to the solution either. In this embodiment of this application, the electronic device may selectively calculate the motion distance of the layer based on the synchronization period of the electronic device or the time of starting to draw the layer. Specifically, the method for drawing the second layer by the electronic device in S302 may include S1101.

S1101. The electronic device calculates a motion distance of the second layer based on the signal period of the vertical synchronization signal 1, and draws the second layer based on the motion distance of the second layer.

The motion distance of the second layer is a motion distance of image content in the second layer with respect to image content in the first layer. For example, the foregoing S1101 may include S1101a and S1101b.

S1101a. The electronic device calculates a processing time of the second layer based on the signal period of the vertical synchronization signal 1.

S1101b. The electronic device calculates the motion distance of the second layer based on the processing time of the second layer, and draws the second layer based on the motion distance of the second layer.

In an implementation of this embodiment, when the second layer is an $i^{th}$ layer drawn by the electronic device in response to the first UI event, the processing time of the second layer is $p_{i-1}+T_{i-1}$ where $i \geq 2$, i is a positive integer, $p_{i-1}$ is a processing time of an $(i-1)^{th}$ layer, and $T_{i-1}$ is the signal period of the vertical synchronization signal 1 for triggering the electronic device to draw the $(i-1)^{th}$ layer.

For example, it is assumed that the layer a drawn by the electronic device by performing "drawing_a" shown in FIG. 11A is the first layer drawn by the electronic device in response to the first UI event; the layer b drawn by the electronic device by performing "drawing_b" shown in FIG. 11A is the second layer drawn by the electronic device in response to the first UI event; the layer c drawn by the electronic device by performing "drawing_c" shown in FIG. 11A is a third layer drawn by the electronic device in response to the first UI event; and the layer d drawn by the electronic device by performing "drawing_d" shown in FIG. 11A is a fourth layer drawn by the electronic device in response to the first UI event.

For example, when the second layer is the layer b (that is, the second layer drawn by the electronic device in response to the first UI event, and i=2), a processing time of the layer b is $p_2=p_1+T_1$, where $p_1$ is the time when the electronic device starts to draw the layer a (time $t_1$ shown in FIG. 11A); and $p_2$ is time $t_2$ shown in FIG. 11A. In this way, the electronic device can calculate the motion distance of the layer b based on time $t_2$, and draw the layer b based on the motion distance. The electronic device may calculate the motion distance of the layer a based on time $t_1$, and draw the layer a based on the motion distance.

For another example, when the second layer is the layer c (that is, the third layer drawn by the electronic device in response to the first UI event, and i=3), a processing time of the layer c is $p_3=p_2+T_2$, where $p_2+T_2$ is $t_3$ shown in FIG. 11A, and the processing time $p_3$ of the layer c is $t_3$ shown in FIG. 11A. In this way, the electronic device can calculate the motion distance of the layer c based on $t_3$, and draw the layer c based on the motion distance.

For another example, when the first layer is the layer d (that is, the fourth layer drawn by the electronic device in response to the first UI event, and i=4), a processing time of the layer d is $p_4=p_3+T_3$, where $p_3+T_3$ is $t_4$ shown in FIG. 11A, and the processing time $p_4$ of the layer d is $t_4$. In this way, the electronic device can calculate the motion distance of the layer d based on $t_4$, and draw the layer d based on the motion distance.

In this implementation, the electronic device may calculate a motion distance of a layer based on a processing time of the layer. In this way, it can be ensured that a time difference between a processing time of one frame layer and a processing time of a previous frame layer is equal to the signal period of the vertical synchronization signal (that is, the foregoing synchronization period). For example, a time difference between the processing time $t_2$ of the layer b and the processing time $t_1$ of the layer a is $T_1$ equal to the synchronization period $T_1$; and a time difference between the processing time $t_3$ of the layer c and the processing time $t_2$ of the layer b is $T_2$ equal to the synchronization period $T_2$. In this way, a possibility that the picture displayed by the electronic device jitters can be reduced.

In another implementation of this embodiment, when the second layer is an $i^{th}$ layer drawn by the electronic device in response to the first UI event, the processing time of the second layer is $Max(p_{i-1}+T_{i-1}, p_i')$, where i≥2, i is a positive integer, $p_{i-1}$ is a processing time of an $(i-1)^{th}$ layer, $T_{i-1}$ is the signal period of the vertical synchronization signal 1 for triggering the electronic device to draw the $(i-1)^{th}$ layer, $p_i'$ is a time when the electronic device starts to draw the $i^{th}$ layer, and $p_{i-1}$ is the processing time of the $(i-1)^{th}$ layer.

$p_1$ is the processing time of the first layer, and the processing time of the first layer is equal to the time when the electronic device starts to draw the first layer. For example, the processing time of the layer a is the time when the electronic device starts to draw the layer a (that is, $t_1$ shown in FIG. 11A). In other words, the time $p_1$ when the electronic device starts to draw the first layer is $t_1$ shown in FIG. 11A. In this way, the electronic device can calculate the motion distance of the layer a based on $t_1$, and draw the layer a based on the motion distance.

For example, when the second layer is the layer b (that is, the second layer drawn by the electronic device in response to the first UI event, and i=2), the processing time $p_2$ of the layer b is $Max(p_1+T_1, p_2')$, where $p_2'$ is the time $t_b$ when the electronic device starts to draw the second layer. Because $p_1$ is $t_1$ shown in FIG. 11A, $p_1+T_1$ is $t_2$ shown in FIG. 11A. Because $t_2$ is greater than $t_b$ (that is, $p_2'$), the processing time $p_2$ of the layer b is $t_2$. In this way, the electronic device can calculate the motion distance of the layer b based on $t_2$, and draw the layer b based on the motion distance.

For another example, when the second layer is the layer c (that is, the third layer drawn by the electronic device in response to the first UI event, and i=3), the processing time $p_3$ of the layer c is $Max(p_2+T_2, p_3')$, where $p_3'$ is the time $t_c$ when the electronic device starts to draw the third layer. Because $p_2$ is $t_2$ shown in FIG. 11A, $p_2+T_2$ is $t_3$ shown in FIG. 11A. Because $t_3$ is greater than $t_c$ (that is, $p_3'$), the processing time $p_3$ of the layer c is $t_3$. In this way, the electronic device can calculate the motion distance of the layer c based on $t_3$, and draw the layer c based on the motion distance.

For another example, when the second layer is the layer d (that is, the fourth layer drawn by the electronic device in response to the first UI event, and i=4), the processing time $p_4$ of the layer d is $Max(p_3+T_3, p_4')$, where $p_4'$ is the time $t_d$ when the electronic device starts to draw the fourth layer. Because $p_3$ is $t_3$ shown in FIG. 11A, $p_3+T_3$ is $t_4$ shown in FIG. 11A. Because to (that is, $p_3'$) is greater than $t_4$, the processing time $p_4$ of the layer d is to (that is, $p_3'$). In this way, the electronic device can calculate the motion distance of the layer d based on $t_d$, and draw the layer d based on the motion distance.

The electronic device may calculate the processing time of the second layer in the foregoing manner, and save the processing time of the second layer in a time buffer queue of the electronic device. The time buffer queue can buffer the processing time of each layer according to the "first in first out" principle.

In this implementation, the electronic device may selectively calculate a motion distance of a layer based on a time of starting to draw the layer or a processing time of the layer. In this way, for most layers, it can be ensured that a time difference between a processing time of the layer and a processing time of a previous frame layer is equal to the signal period of the vertical synchronization signal (that is, the foregoing synchronization period). For example, a time difference between the processing time $t_2$ of the layer b and the processing time $t_1$ of the layer a is $T_1$ equal to the synchronization period $T_1$; and a time difference between the processing time $t_3$ of the layer c and the processing time $t_2$ of the layer b is $T_2$ equal to the synchronization period $T_2$. In this way, a possibility that the picture displayed by the electronic device jitters can be reduced.

Although the method in this implementation can be used to reduce the frame loss possibility in image displaying by the electronic device, frame loss is inevitable because it takes the electronic device a relatively long time to draw some layers. For example, as shown in FIG. 11A, duration of drawing the layer c by the electronic device by performing "drawing_c" is relatively long, and consequently, the electronic device loses a frame from $t_5$ to $t_6$. In this case, a time difference between the processing time of the next frame layer (such as the layer d) and the processing time of this frame layer (such as the layer c) differs from the synchronization period. For example, a time difference between the processing time $t_d$ of the layer d and the processing time $t_3$ of the layer c is a period from $t_3$ to $t_d$, which is longer than the synchronization period $T_3$. However, generally, the duration of drawing the layer by the electronic device is not so long. Therefore, a possibility of this case is very low.

For example, FIG. 11B part (b) is a schematic diagram of changing of motion distances of layers when the electronic device calculates the motion distances shown in FIG. 11A according to the Android® original animation algorithm. FIG. 11B part (c) is a schematic diagram of changing of motion distances of layers when the electronic device performs S1101 to calculate the motion distances shown in FIG. 11A.

In FIG. 11B part (b) and FIG. 11B part (c), a horizontal coordinate is a frame number of each layer, and a vertical coordinate is a motion distance of each layer. The frame number of the layer is used to indicate that the layer is an nth layer drawn by the electronic device, and n is a positive integer.

In a broken line box 1101 shown in FIG. 11B part (b), a point 1102 is used to represent a motion distance of the layer c drawn by the electronic device by performing "drawing c" shown in FIG. 11A, and a point 1103 is used to represent a motion distance of the layer d drawn by the electronic device by performing "drawing d" shown in FIG. 11A. According to the Android® original animation algorithm, when motion distances of the layer c and the layer d are calculated, there is a phenomenon that the motion distance of the previous frame layer c (the motion distance represented by the point 1102) shown in FIG. 11B part (b) is relatively long, but the motion distance of the next frame layer d (the motion distance represented by the point 1103) suddenly becomes short, that is, a frame jitter phenomenon.

However, when the electronic device performs S1101 to calculate the motion distances shown in FIG. 11A, the jitter phenomenon shown in FIG. 11B part (b) does not occur. For example, as shown in FIG. 11B part (c), a black curve in a broken line box 1104 is relatively smooth, and there is no phenomenon that motion distances of adjacent layers change drastically.

In summary, by using the method in this embodiment of this application, the possibility that the picture displayed by the electronic device jitters can be reduced.

For example, in this embodiment of this application, the foregoing method is described with reference to the process of drawing layers in advance by the electronic device shown in FIG. 12 and expanding the SF buffer.

Figure 12:
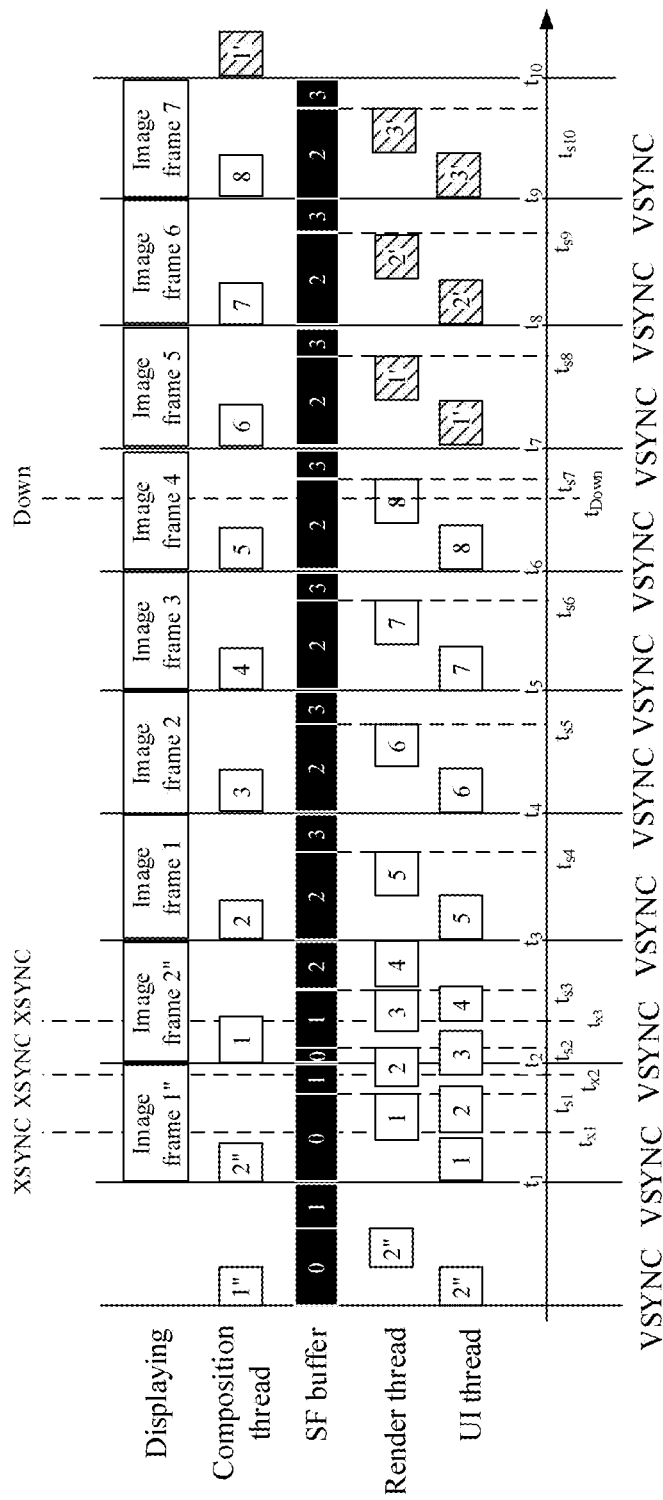
FIG. 12 is another schematic principle diagram of layer drawing, rendering, composition, and image frame displaying by an electronic device according to an embodiment of this application.

As shown in FIG. 12, after receiving the first UI event, the electronic device may start a vertical synchronization signal (that is, VSYNC); in response to the VSYNC at time $t_1$, the UI thread of the electronic device may draw the layer 1, and the render thread renders the drawn layer 1; at time $t_{x1}$ after $t_1$, the UI thread has finished drawing the layer 1; and the UI thread may draw the layer 2, and the render thread renders the drawn layer 2.

After the render thread finishes rendering the layer 1 at time $t_{s1}$ shown in FIG. 12, the layer 1 may be buffered in the SF buffer. As shown in FIG. 12, in a period from $t_1$ to $t_{s1}$, no layer is buffered in the SF buffer, that is, a quantity of layers buffered in the SF buffer is 0. Therefore, after the render thread buffers the layer 1 in the SF buffer at time $t_{s1}$, the quantity of layers buffered in the SF buffer becomes 1. At time $t_{x2}$ shown in FIG. 12, the UI thread has finished drawing the layer 2; and the UI thread may draw the layer 3, and the render thread renders the drawn layer 3.

At time $t_2$ shown in FIG. 12, when VSYNC arrives, the composition thread may read the foregoing layer 1 from the SF buffer, and perform layer composition on the layer 1 to obtain the image frame 1; that is, the layer 1 is dequeued from the SF buffer, and the quantity of layers buffered in the SF buffer becomes 0. At time $t_{s2}$ shown in FIG. 12, after the render thread finishes rendering the layer 2, the layer 2 may be buffered in the SF buffer, and the quantity of layers buffered in the SF buffer becomes 1. At time $t_{x3}$ shown in FIG. 12, the UI thread has finished drawing the layer 3; and the UI thread may draw the layer 4, and the render thread renders the drawn layer 4. At time $t_{s3}$ shown in FIG. 12, after the render thread finishes rendering the layer 3, the layer 3 may be buffered in the SF buffer, and the quantity of layers buffered in the SF buffer becomes 2.

At time $t_3$ shown in FIG. 12, VSYNC arrives, and the LCD of the electronic device refreshes and displays the image frame 1; and the composition thread may read the layer 2 from the SF buffer, and perform layer composition on the layer 2 to obtain the image frame 2; that is, the layer 2 is dequeued from the SF buffer. Therefore, at time $t_3$ shown in FIG. 12, the quantity of layers buffered in the SF buffer may become 1; however, at time $t_3$, the render thread finishes rendering the layer 4, and may buffer the layer 4 in the SF buffer. Therefore, at time $t_3$, the quantity of layers buffered in the SF buffer is still 2. At time $t_3$ shown in FIG. 12, VSYNC arrives, the UI thread draws a layer 5, and the render thread renders the drawn layer 5.

It is assumed that a maximum of three frame layers can be buffered in the SF buffer. At time $t_3$, two frame layers have been buffered in the SF buffer; and at time $t_3$, the UI thread starts to draw the layer 5. If the drawn layer 5 rendered by the render thread is buffered in the SF buffer, the quantity of layers in the SF buffer may reach the upper limit. Therefore, after $t_3$, after the UI thread finishes drawing the layer 5, and before arrival of VSYNC at time $t_4$, the UI thread does not draw any layer in advance. At time $t_{s4}$ shown in FIG. 12, after the render thread finishes rendering the layer 5, the layer 5 may be buffered in the SF buffer, and the quantity of layers buffered in the SF buffer becomes 3.

At time $t_4$ shown in FIG. 12, VSYNC arrives, and the LCD of the electronic device refreshes and displays the image frame 2; and the composition thread may read the layer 3 from the SF buffer, and perform layer composition on the layer 3 to obtain the image frame 3; that is, the layer 3 is dequeued from the SF buffer. Therefore, at time $t_4$ shown in FIG. 12, the quantity of layers buffered in the SF buffer may become 2. In addition, in response to VSYNC at time $t_4$, the UI thread may draw a layer 6, and the render thread renders the drawn layer 6. It may be understood that if the drawn layer 6 rendered by the render thread is buffered in the SF buffer, the quantity of layers in the SF buffer may reach the upper limit. Therefore, after $t_4$, after the UI thread finishes drawing the layer 6, and before arrival of VSYNC at time $t_5$, the UI thread does not draw any layer in advance. At time $t_{s5}$ shown in FIG. 12, after the render thread finishes rendering the layer 6, the layer 6 may be buffered in the SF buffer, and the quantity of layers buffered in the SF buffer becomes 3.

At time $t_5$ shown in FIG. 12, VSYNC arrives, and the LCD of the electronic device refreshes and displays the image frame 3; and the composition thread may read the layer 4 from the SF buffer, and perform layer composition on the layer 4 to obtain an image frame 4; that is, the layer 4 is dequeued from the SF buffer. Therefore, at time $t_5$ shown in FIG. 12, the quantity of layers buffered in the SF buffer may become 2. In addition, in response to VSYNC at time $t_5$, the UI thread may draw a layer 7, and the render thread renders the drawn layer 7. It may be understood that if the drawn layer 7 rendered by the render thread is buffered in the SF buffer, the quantity of layers in the SF buffer may reach the upper limit. Therefore, after $t_5$, after the UI thread finishes drawing the layer 7, and before arrival of VSYNC at time $t_6$, the UI thread does not draw any layer in advance. At time $t_{s6}$ shown in FIG. 12, after the render thread finishes rendering the layer 7, the layer 7 may be buffered in the SF buffer, and the quantity of layers buffered in the SF buffer becomes 3.

At time $t_6$ shown in FIG. 12, VSYNC arrives, and the LCD of the electronic device refreshes and displays the image frame 4; and the composition thread may read the layer 5 from the SF buffer, and perform layer composition on the layer 5 to obtain an image frame 5; that is, the layer 5 is dequeued from the SF buffer. Therefore, at time $t_6$ shown in FIG. 12, the quantity of layers buffered in the SF buffer may become 2. In addition, in response to VSYNC at time $t_6$, the UI thread may draw a layer 8, and the render thread renders the drawn layer 8. It may be understood that if the drawn layer 8 rendered by the render thread is buffered in the SF buffer, the quantity of layers in the SF buffer may reach the upper limit. Therefore, after $t_6$, after the UI thread finishes drawing the layer 8, and before arrival of VSYNC at time $t_7$, the UI thread does not draw any layer in advance. At time $t_{s7}$ shown in FIG. 12, after the render thread finishes rendering the layer 8, the layer 8 may be buffered in the SF buffer, and the quantity of layers buffered in the SF buffer becomes 3.

It should be noted that, in this embodiment of this application, that the electronic device finishes drawing the first layer before the first time, and the electronic device draws the second layer before the first time may include: if the electronic device finishes drawing the first layer before the first time, the electronic device generates XSYNC (also referred to as an XSYNC signal) before the first time; and the electronic device draws the second layer in response to the XSYNC. For example, as shown in FIG. 12, the electronic device draws the layer 2 in response to XSYNC at time $t_{x1}$; the electronic device draws the layer 3 in response to XSYNC at time $t_{x2}$; and the electronic device draws the layer 3 in response to XSYNC at time $t_{x3}$.

It may be understood that the electronic device may receive an interrupt event used to trigger the electronic device to stop displaying the image content corresponding to the first UI event. In this case, the SF buffer may also buffer the layer drawn and rendered by the electronic device in advance. How the electronic device processes, when receiving the interrupt event, the layer corresponding to the first UI event and buffered in the SF buffer, is described in the following embodiment.

Figure 13:
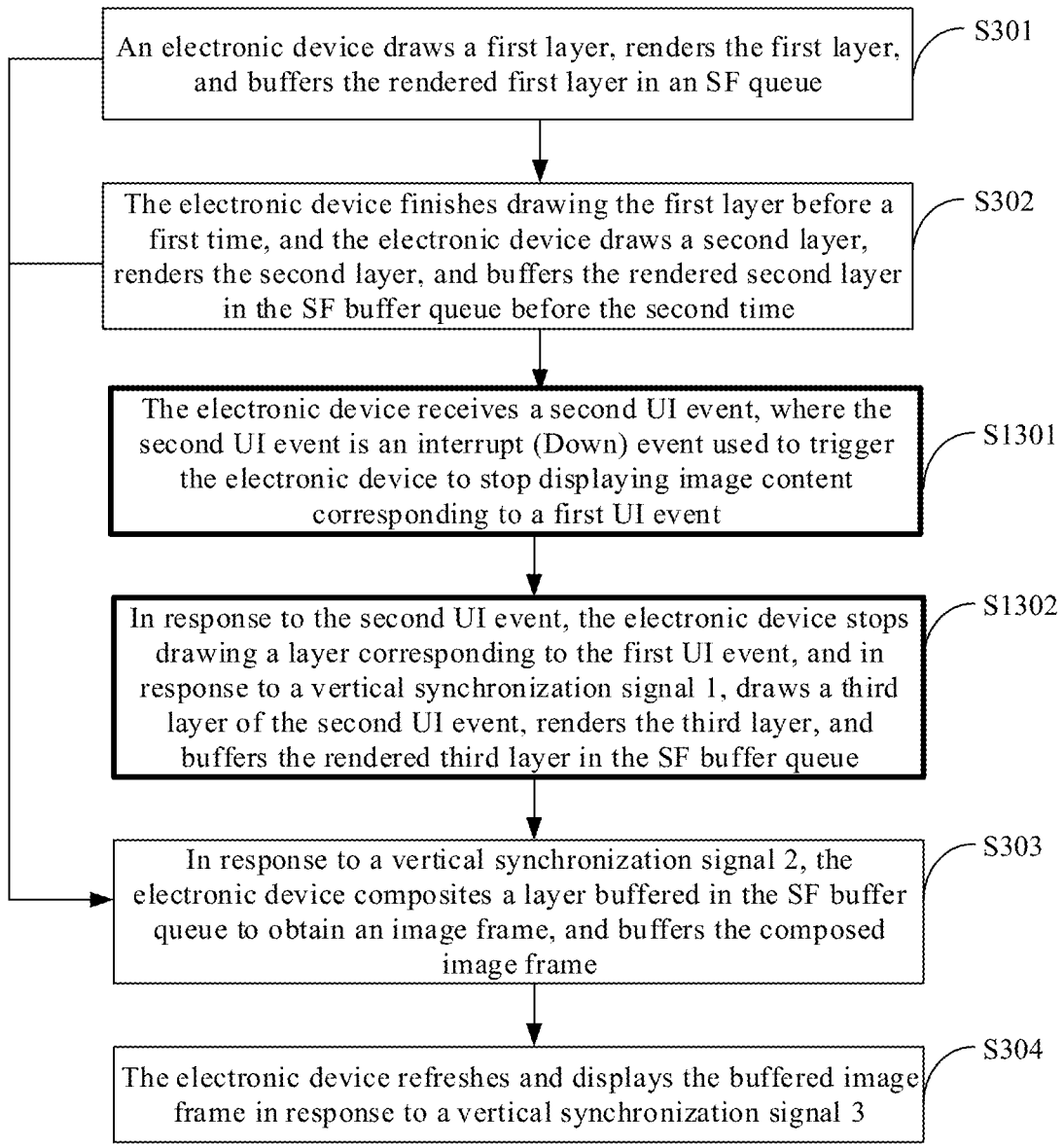
FIG. 13 is a flowchart of another image processing method according to an embodiment of this application.

In some embodiments, after receiving the interrupt event, the electronic device may not delete the layer buffered in the SF buffer. Specifically, as shown in FIG. 13, before S303, the method in this embodiment of this application may further include S1301 and S1302.

S1301. The electronic device receives a second UI event, where the second UI event is an interrupt (Down) event used to trigger the electronic device to stop displaying the image content corresponding to the first UI event.

The second UI event may be a user operation (for example, a touch operation) that can trigger the electronic device to display image content different from that corresponding to the first UI event. In other words, the image content displayed by the electronic device triggered by the second UI event is different from the image content displayed by the electronic device triggered by the first UI event.

It should be noted that, the second UI event may be a UI event that triggers the electronic device to display an image being a "deterministic animation" or may be a UI event that triggers the electronic device to display any other image content than a "deterministic animation".

It may be understood that in the process of displaying the corresponding image content by the electronic device in response to the first UI event, if another UI event (such as the second UI event) is received, it indicates that the user wants to operate the electronic device to display other image content (that is, the layer content corresponding to the second UI event).

S1302. In response to the second UI event, the electronic device stops drawing a layer corresponding to the first UI event, and in response to the vertical synchronization signal 1, draws a third layer corresponding to the second UI event, renders the third layer, and buffers the rendered third layer in the SF buffer queue.

For example, as shown in FIG. 12, the electronic device receives a down event (that is, the second UI event) at time $t_{Down}$. In response to the down event, the UI thread of the electronic device stops drawing a layer at a first UI time (a layer 9 after the layer 8 shown in FIG. 12); and in response to the vertical synchronization signal 1 (such as VSYNC at time $t_7$), the UI thread draws a layer 1', and the render thread renders the drawn layer 1'.

In addition, in response to VSYNC at time $t_7$, the LCD of the electronic device refreshes and displays the image frame 5; and the composition thread may read the layer 6 from the SF buffer, and perform layer composition on the layer 6 to obtain an image frame 6; that is, the layer 6 is dequeued from the SF buffer. Therefore, at time $t_7$ shown in FIG. 12, the quantity of layers buffered in the SF buffer may become 2. At time $t_{s8}$ shown in FIG. 12, after the render thread finishes rendering the layer 1', the layer 1' may be buffered in the SF buffer, and the quantity of layers buffered in the SF buffer becomes 3.

At time $t_8$ shown in FIG. 12, VSYNC arrives, and the LCD of the electronic device refreshes and displays the image frame 6; and the composition thread may read the layer 7 from the SF buffer, and perform layer composition on the layer 7 to obtain an image frame 7; that is, the layer 7 is dequeued from the SF buffer. Therefore, at time $t_8$ shown in FIG. 12, the quantity of layers buffered in the SF buffer may become 2. In addition, in response to VSYNC at time $t_8$, the UI thread may draw a layer 2', and the render thread renders the drawn layer 2'. At time $t_{s9}$ shown in FIG. 12, after the render thread finishes rendering the layer 2', the layer 2' may be buffered in the SF buffer, and the quantity of layers buffered in the SF buffer becomes 3.

At time $t_9$ shown in FIG. 12, VSYNC arrives, and the LCD of the electronic device refreshes and displays the image frame 7; and the composition thread may read the layer 8 from the SF buffer, and perform layer composition on the layer 8 to obtain an image frame 8; that is, the layer 8 is dequeued from the SF buffer. Therefore, at time $t_9$ shown in FIG. 12, the quantity of layers buffered in the SF buffer may become 2. In addition, in response to VSYNC at time $t_9$, the UI thread may draw a layer 3', and the render thread renders the drawn layer 3'. At time $t_{s9}$ shown in FIG. 12, after the render thread finishes rendering the layer 3', the layer 3' may be buffered in the SF buffer, and the quantity of layers buffered in the SF buffer becomes 3.

At time $t_{10}$ shown in FIG. 12, VSYNC arrives, and the composition thread may read the layer 1' from the SF buffer, and perform layer composition on the layer 1' to obtain an image frame 1'; that is, the layer 1' is dequeued from the SF buffer.

The layer 1', layer 2' and layer 3' are all third layers. As shown in FIG. 12, when the electronic device receives the down event at time $t_{Down}$, there are two frame layers (layer 6 and layer 7) buffered in the SF buffer; and the render thread is drawing the layer 8. When the UI thread starts to draw a layer corresponding to the down event at time $t_7$, there are three frame layers (layer 6, layer 7 and layer 8) buffered in the SF buffer.

It can be learned from FIG. 12 and the foregoing description that, in this embodiment, after receiving the down event, the electronic device may not delete the layer corresponding to the first UI event that is buffered in the SF buffer (such as the layer 6, layer 7, and layer 8), but continues to composite the layer in the SF buffer in response to VSYNC, and refreshes and displays the composited image frame.

It may be understood that, using the foregoing solution where the layer corresponding to the first UI event buffered in the SF buffer is not deleted may cause the electronic device to delay displaying the image content corresponding to the second UI event because many layers corresponding to the first UI event are buffered in the SF buffer. Consequently, a touch response latency of the electronic device is long, and hand-following performance of the electronic device is poor. A latency time from "inputting a touch operation by the user's finger on the touchscreen" to "displaying, on the touchscreen, an image corresponding to the touch operation and perceived by human eyes" may be referred to as touch response latency. The hand-following performance of the electronic device may be reflected as a length of the touch response latency. Specifically, the longer the touch response latency is, the worse the hand-following performance is; and the shorter the touch response latency is, the better the hand-following performance is. If the hand-following performance of the electronic device is better, user experience in controlling the electronic device through a touch operation is better, and the user feels smoother.

To shorten the touch response latency of the electronic device and improve the hand-following performance of the electronic device, in other embodiments, after receiving the foregoing interrupt event, the electronic device may delete some or all of the layers buffered in the SF buffer.

Figure 14:
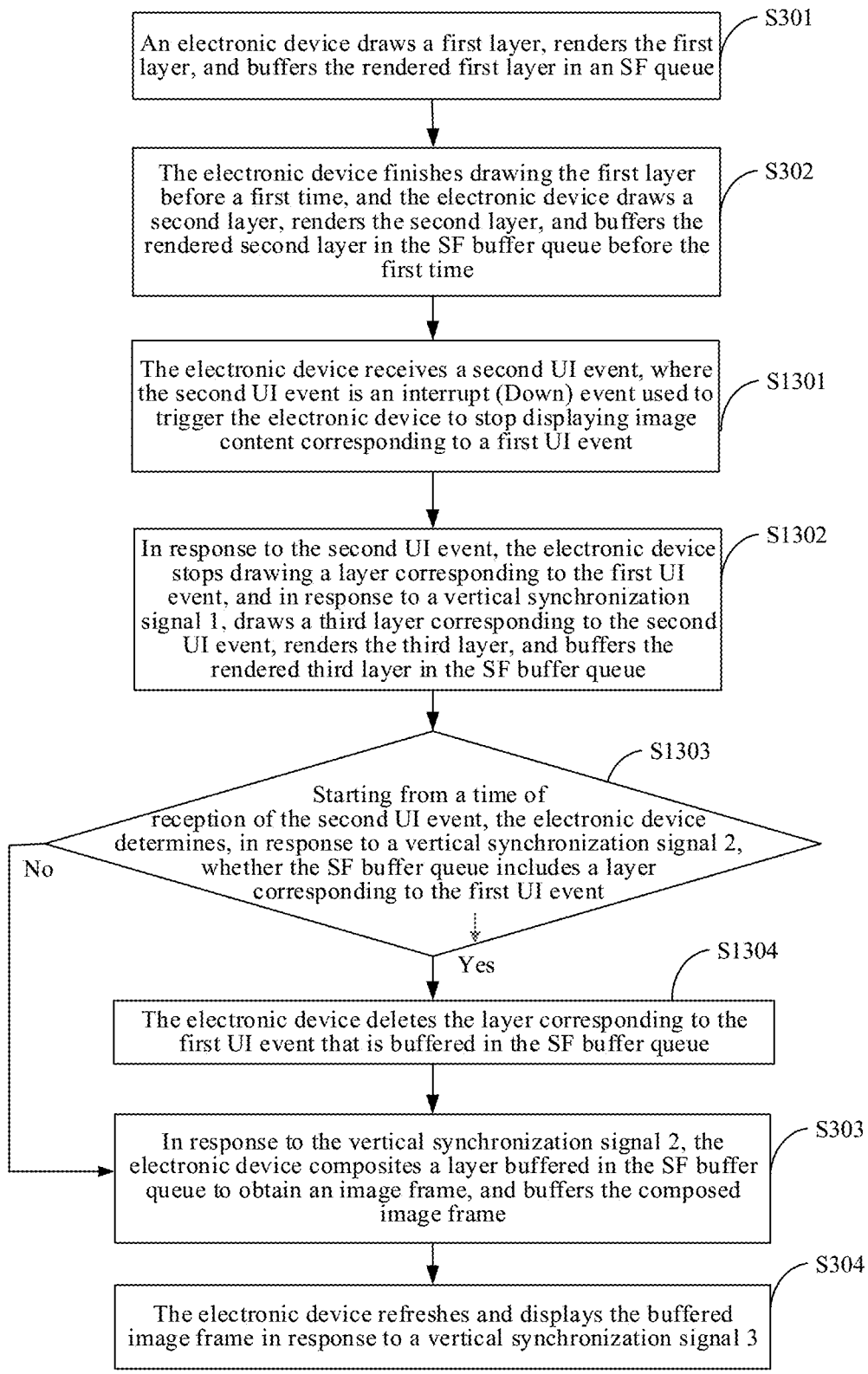
FIG. 14 is a flowchart of another image processing method according to an embodiment of this application.

In this embodiment, the electronic device may delete some of the layers buffered in the SF buffer. Specifically, as shown in FIG. 14, after the foregoing S1302, the electronic device may not perform S303 and S304, but perform S1303.

S1303. Starting from receiving the second UI event, the electronic device determines, in response to the vertical synchronization signal 2, whether the SF buffer queue includes the layer corresponding to the first UI event.

Specifically, after S1303, if the SF buffer queue includes the layer corresponding to the first UI event, the electronic device may perform S1304, S303, and S304; or if the SF buffer queue does not include the layer corresponding to the first UI event, the electronic device may perform S303 and S304.

S1304. The electronic device deletes the layer corresponding to the first UI event that is buffered in the SF buffer queue.

It is assumed that P frame layers buffered in the SF buffer queue (that is, the SF buffer) are layers corresponding to the first UI event. In some embodiments, the electronic device may delete Q frame layers among the P frame layers buffered in the SF buffer queue, and perform layer composition on a frame layer at a head of the SF buffer queue after the Q frame layers are deleted, to obtain an image frame, and buffer the composited image frame. The P frame layers are the layers corresponding to the first UI event, Q≤P, and both P and Q are positive integers.

Figure 15:
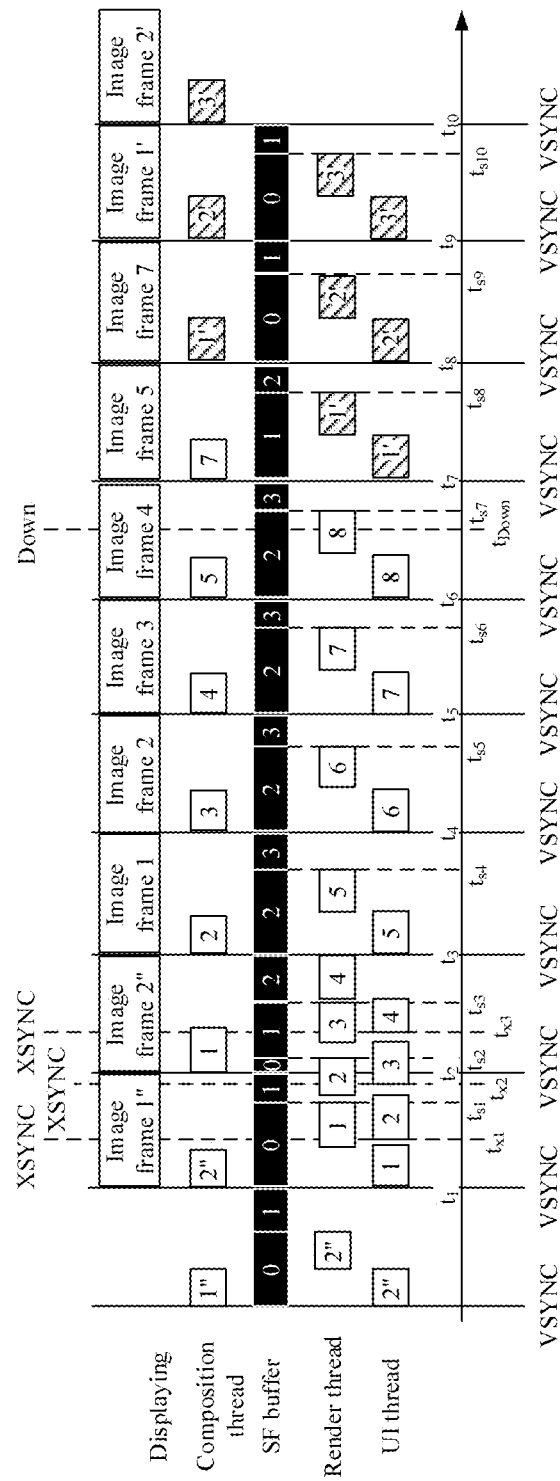
FIG. 15 is another schematic principle diagram of layer drawing, rendering, composition, and image frame displaying by an electronic device according to an embodiment of this application.
Figure 17:
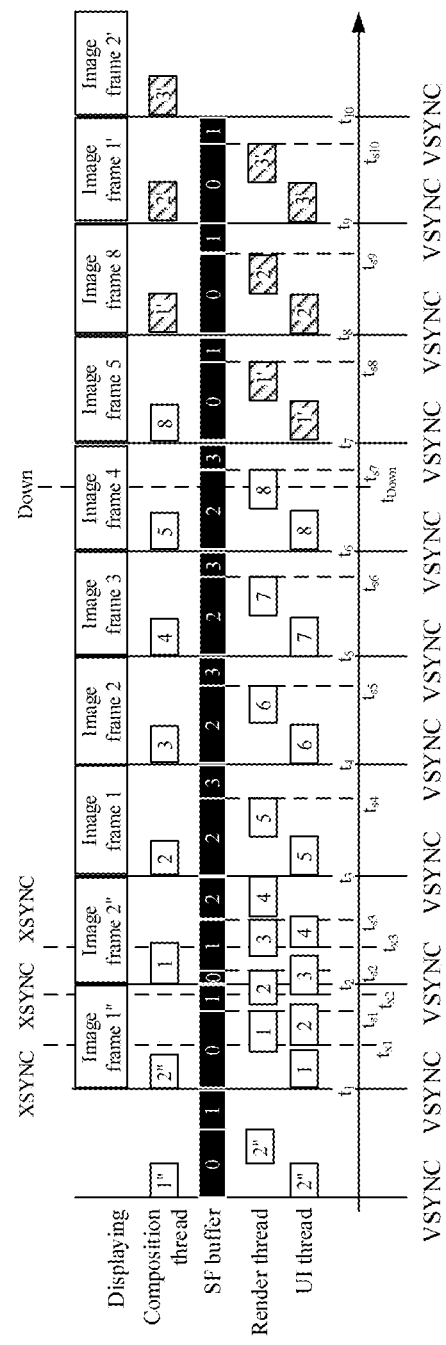
FIG. 17 is another schematic principle diagram of layer drawing, rendering, composition, and image frame displaying by an electronic device according to an embodiment of this application.

For example, as shown in FIG. 15 or FIG. 17, the electronic device receives the down event (that is, the second UI event) at time $t_{Down}$. Before the electronic device receives the down event in FIG. 15 or FIG. 17, the process of performing layer drawing, layer rendering, layer composition, and image frame displaying is the same as the process shown in FIG. 12. The process of drawing and rendering the layer 1', the layer 2', and the layer 3' by the electronic device in FIG. 15 or FIG. 17 is the same as the process shown in FIG. 12, and details are not described herein in this embodiment of this application.

Figure 16A:
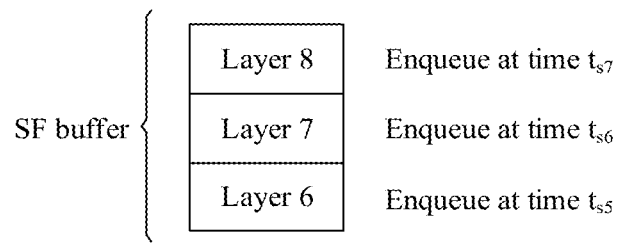
FIG. 16A is a schematic diagram of another method for buffering a layer in an SF buffer according to an embodiment of this application.

Starting from receiving the down event at time $t_{Down}$ shown in FIG. 15 or FIG. 17, the electronic device may determine, in response to VSYNC (including the vertical synchronization signal 2) at time $t_7$, whether the SF buffer queue includes the layer corresponding to the first UI event. At time $t_{s7}$ after $t_{Down}$ shown in FIG. 15 and before $t_7$, as shown in FIG. 16A, three frame layers are buffered in the SF buffer, and the three frame layers include the layer 6, the layer 7, and the layer 8, where the layer 6, the layer 7, and the layer 8 are layers corresponding to the first UI event. In other words, with reference to FIG. 15 or FIG. 17, the electronic device performs S1303, and may determine that the SF buffer queue includes the layers corresponding to the first UI event; and three frame layers corresponding to the first UI event are buffered in the SF buffer queue, that is, P=3.

In an implementation of this embodiment, the electronic device may perform S1304 to delete, at an interval of one frame, the layer corresponding to the first UI event that is buffered in the SF buffer. In this embodiment, Q=1.

Figure 16B:
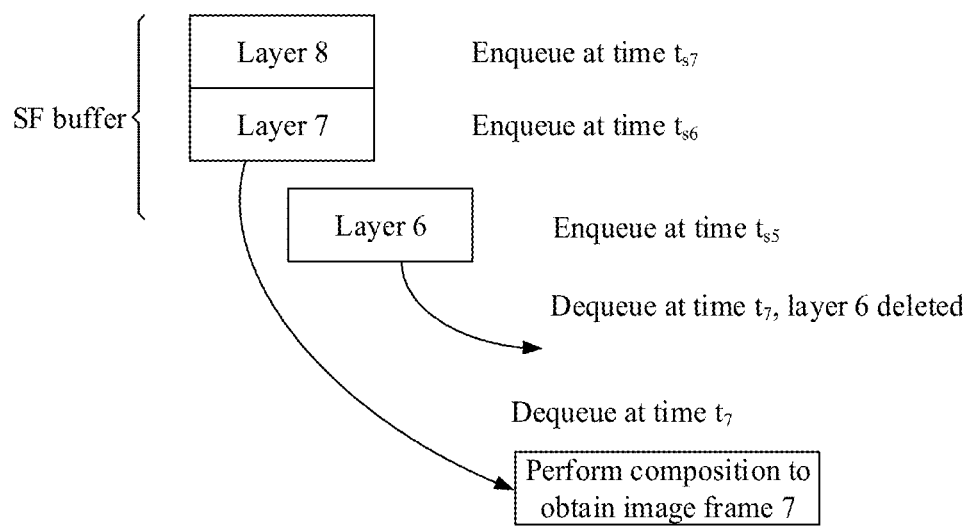
FIG. 16B is a schematic diagram of another method for buffering a layer in an SF buffer according to an embodiment of this application.

For example, at time $t_{s7}$ shown in FIG. 15, as shown in FIG. 16A, three frame layers (including the layer 6, the layer 7, and the layer 8) are buffered in the SF buffer queue. The layer 6, the layer 7, and the layer 8 are layers corresponding to the first UI event. Therefore, in response to the VSYNC at time $t_7$ shown in FIG. 15, the electronic device (such as the composition thread of the electronic device) can delete one frame layer among the three frame layers buffered in the SF buffer (that is, the layer 6 at the head of the SF buffer queue); and the electronic device (such as the composition thread of the electronic device) can perform layer composition on a frame layer (that is, the layer 7) at the head of the SF buffer queue after the layer 6 is deleted, to obtain the image frame 7, and buffer the composited image frame 7. For example, as shown in FIG. 16B, at time $t_7$, the layer 6 is dequeued from the SF buffer and deleted, and the layer 7 is dequeued from the SF buffer and used for composing the image frame 7, and only the layer 8 remains in the SF buffer. As shown in FIG. 15, at time $t_7$, the quantity of layers buffered in the SF buffer becomes 1.

Figure 16C:
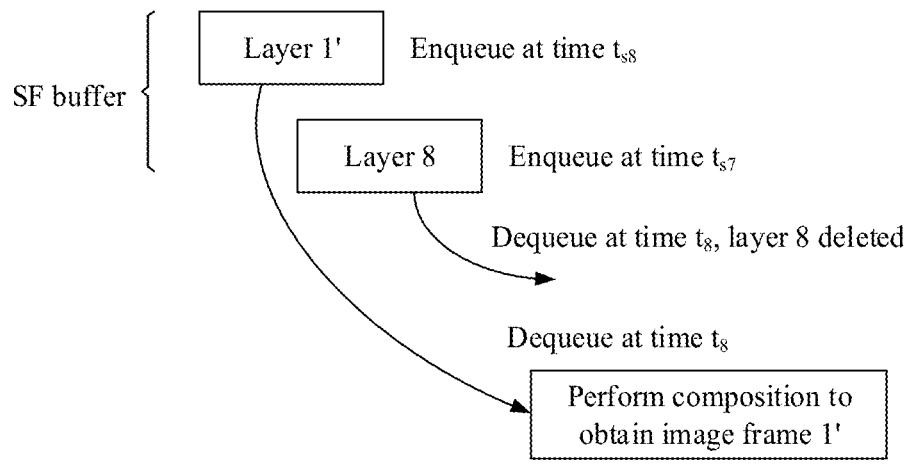
FIG. 16C is a schematic diagram of another method for buffering a layer in an SF buffer according to an embodiment of this application.

At time $t_{s8}$ shown in FIG. 15, after the render thread finishes rendering the layer 1', the layer 1' may be buffered in the SF buffer, and the quantity of layers buffered in the SF buffer becomes 2. In response to the VSYNC at time $t_8$ after $t_{s8}$, the electronic device performs S1303 and may determine that the layer 8 corresponding to the first UI event is buffered in the SF buffer. The electronic device (such as the composition thread of the electronic device) may perform S1304 to delete the layer 8 and perform layer composition on the layer 1'. As shown in FIG. 16C, at time $t_8$, the layer 8 is dequeued from the SF buffer and deleted, and the layer 1' is dequeued from the SF buffer and used for composing the image frame 1', and the quantity of layers buffered in the SF buffer becomes 0. As shown in FIG. 15, at time $t_9$, the quantity of layers buffered in the SF buffer becomes 0.

Figure 16D:
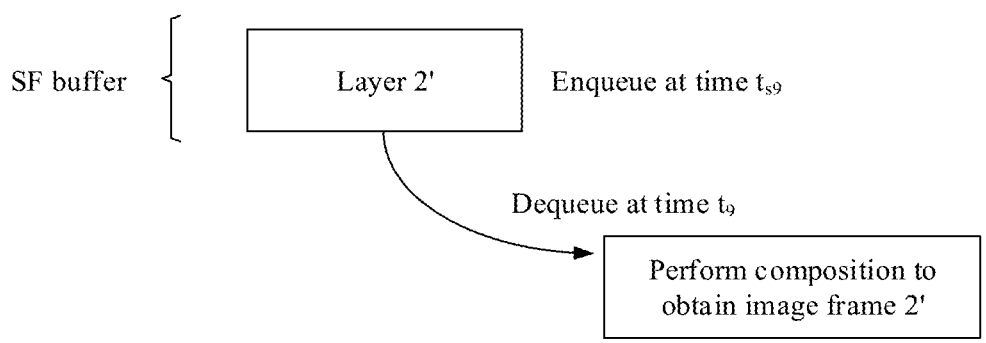
FIG. 16D is a schematic diagram of another method for buffering a layer in an SF buffer according to an embodiment of this application.

At time $t_{s9}$ shown in FIG. 15, after the render thread finishes rendering the layer 2', the layer 2' may be buffered in the SF buffer, and the quantity of layers buffered in the SF buffer becomes 1. In response to the VSYNC at time $t_9$ after $t_{s9}$, the electronic device performs S1303 and may determine that only the layer 2' corresponding to the second UI event is buffered in the SF buffer and the layer corresponding to the first UI event is not buffered. The electronic device (such as the composition thread of the electronic device) may perform S1305 to perform layer composition on the layer 2'. As shown in FIG. 16D, at time $t_9$, the layer 2' is dequeued from the SF buffer and used for composing an image frame 2', and the quantity of layers buffered in the SF buffer becomes 0. As shown in FIG. 15, at time $t_9$, the quantity of layers buffered in the SF buffer becomes 0.

At time $t_{s10}$ shown in FIG. 15, after the render thread finishes rendering the layer 3', the layer 3' may be buffered in the SF buffer, and the quantity of layers buffered in the SF buffer becomes 1. In response to the VSYNC at time $t_{10}$ after $t_{s10}$, the electronic device performs S1303 and may determine that only the layer 3' corresponding to the second UI event is buffered in the SF buffer and the layer corresponding to the first UI event is not buffered. The electronic device (such as the composition thread of the electronic device) may perform S1305 to perform layer composition on the layer 3'. At time $t_{10}$, the layer 3' is dequeued from the SF buffer and used for composing an image frame 3', and the quantity of layers buffered in the SF buffer becomes 0.

In another implementation of this embodiment, when P≥2, the electronic device performs S1304, and a plurality of frame layers corresponding to the first UI event that are buffered in the SF buffer may be deleted every time, that is, Q≥2. For example, in the following embodiment, P=3 and Q=2 are used as an example to describe the method of this embodiment.

Figure 18A:
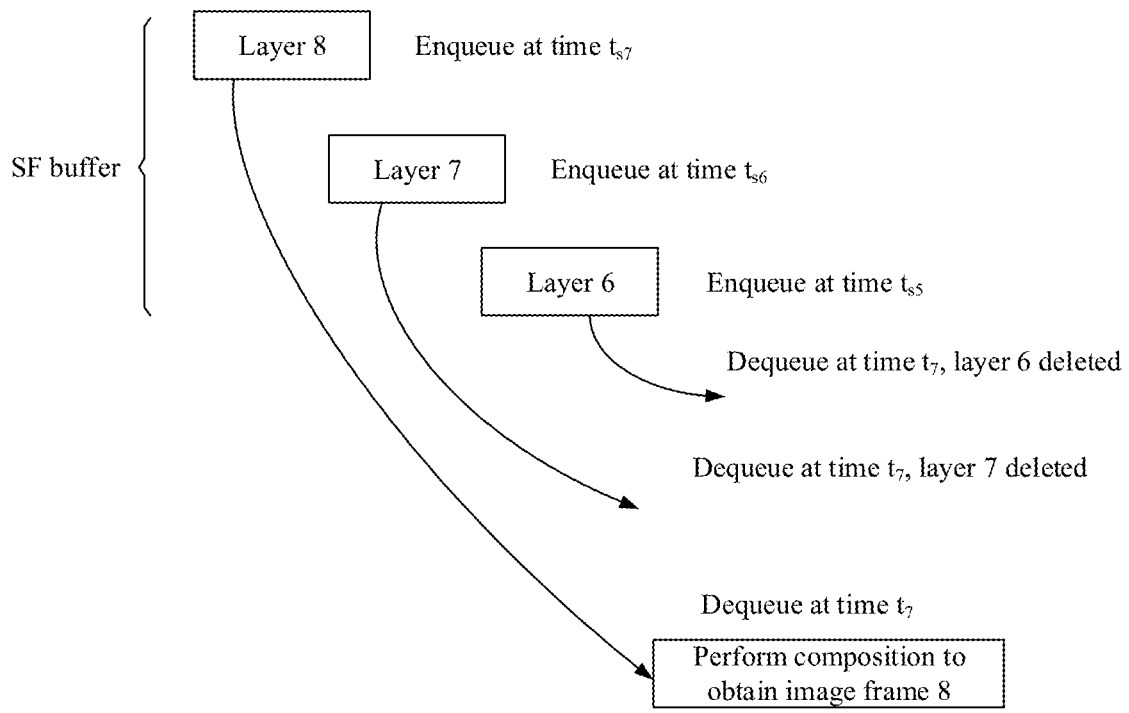
FIG. 18A is a schematic diagram of another method for buffering a layer in an SF buffer according to an embodiment of this application.

For example, at time $t_{s7}$ shown in FIG. 17, as shown in FIG. 16A, three frame layers (including the layer 6, the layer 7, and the layer 8) are buffered in the SF buffer queue. The layer 6, the layer 7, and the layer 8 are layers corresponding to the first UI event. Therefore, in response to the VSYNC at time $t_7$ shown in FIG. 17, the electronic device (such as the composition thread of the electronic device) can delete two frame layers among the three frame layers buffered in the SF buffer (that is, the layer 6 and the layer 7 at the head of the SF buffer queue); and perform layer composition on a frame layer (that is, the layer 8) at the head of the SF buffer queue after the layer 6 and the layer 7 are deleted, to obtain the image frame 8, and buffer the composited image frame 8. For example, as shown in FIG. 18A, at time $t_7$, the layer 6 is dequeued from the SF buffer and deleted, the layer 7 is dequeued from the SF buffer and deleted, the layer 8 is dequeued from the SF buffer and used for composing the image frame 8, and the quantity of layers buffered in the SF buffer becomes 0. As shown in FIG. 15, at time $t_7$, the quantity of layers buffered in the SF buffer becomes 0.

Figure 18B:
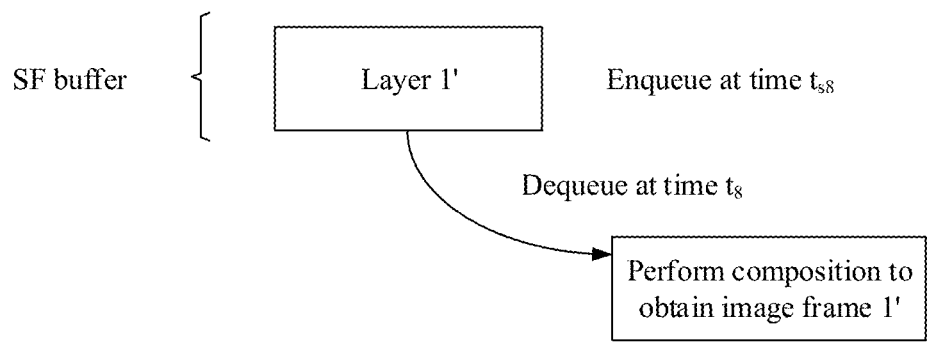
FIG. 18B is a schematic diagram of another method for buffering a layer in an SF buffer according to an embodiment of this application.

At time $t_{s8}$ shown in FIG. 17, after the render thread finishes rendering the layer 1', the layer 1' may be buffered in the SF buffer, and the quantity of layers buffered in the SF buffer becomes 1. In response to the VSYNC at time $t_8$ after $t_{s8}$, the electronic device performs S1303 and may determine that only the layer 1' corresponding to the second UI event is buffered in the SF buffer and the layer corresponding to the first UI event is not buffered. The electronic device may perform S1305 to perform layer composition on the layer 1'. As shown in FIG. 18B, at time $t_8$, the layer 1' is dequeued from the SF buffer and used for composing the image frame 1', and the quantity of layers buffered in the SF buffer becomes 0. As shown in FIG. 15, at time $t_8$, the quantity of layers buffered in the SF buffer becomes 0.

At time $t_{s9}$ shown in FIG. 17, after the render thread finishes rendering the layer 2', the layer 2' may be buffered in the SF buffer, and the quantity of layers buffered in the SF buffer becomes 1. In response to the VSYNC at time $t_9$ after $t_{s9}$, the electronic device performs S1303 and may determine that only the layer 2' corresponding to the second UI event is buffered in the SF buffer and the layer corresponding to the first UI event is not buffered. The electronic device may perform S1305 to perform layer composition on the layer 2'. At time $t_9$, the layer 2' is dequeued from the SF buffer and used for composing the image frame 2', and the quantity of layers buffered in the SF buffer becomes 0.

At time $t_{s10}$ shown in FIG. 17, after the render thread finishes rendering the layer 3', the layer 3' may be buffered in the SF buffer, and the quantity of layers buffered in the SF buffer becomes 1. In response to the VSYNC at time $t_{10}$ after $t_{s10}$, the electronic device performs S1303 and may determine that only the layer 3' corresponding to the second UI event is buffered in the SF buffer and the layer corresponding to the first UI event is not buffered. The electronic device may perform S1305 to perform layer composition on the layer 3'. At time $t_{10}$, the layer 3' is dequeued from the SF buffer and used for composing the image frame 3', and the quantity of layers buffered in the SF buffer becomes 0.

In this embodiment, the electronic device can process a plurality of frame layers corresponding to the first UI event at a time in response to a vertical synchronization signal 2 (such as the foregoing VSYNC). In this way, the touch response latency of the electronic device in response to the second UI event can be shortened, and the hand-following performance of the electronic device can be improved.

In other embodiments, to shorten the touch response latency of the electronic device and improve the hand-following performance of the electronic device, the electronic device may add a first marker bit to the layer corresponding to the first UI event (that is, the UI event corresponding to the "deterministic animation"), and then after receiving the interrupt event (that is, the second UI event), may delete the layer buffered in the SF buffer which has the first marker bit.

Specifically, the method in this embodiment of this application may further include S1901 and S1902, and S1301 and S1302. After S1902, the electronic device may perform S303 and S304.

S1901. The electronic device sets a first marker bit for each frame layer corresponding to the first UI event, where the first marker bit is used to indicate that the corresponding layer is a layer corresponding to the first UI event.

After drawing a frame layer corresponding to the first UI event, the UI thread of the electronic device may add a first marker bit to this frame layer. For example, the electronic device performs S301, and after the UI thread finishes drawing the first layer, the UI thread may add a first marker bit to the first layer. The electronic device performs S301, and after the UI thread finishes drawing the second layer, the UI thread may add a first marker bit to the second layer.

S1902. Starting from a time of reception of the second UI event, the electronic device deletes, in response to the vertical synchronization signal 2, the layer having the first marker bit in the SF buffer queue.

For example, a specific implementation method of S1902 is described herein in this embodiment of this application. The foregoing S1902 may include: in response to the second UI event, the electronic device triggers a preset query event; and in response to the preset query event, the electronic device sets a second marker bit, and deletes the second marker bit when the SF buffer queue does not include the layer having the first marker bit. The second marker bit is used to trigger the electronic device to delete, in response to the vertical synchronization signal 2, the layer having the first marker bit in the SF buffer queue. It may be understood that, after setting the second marker bit, the electronic device may delete, in response to the vertical synchronization signal 2, the layer having the first marker bit in the SF buffer queue; and after deleting the second marker bit, the electronic device may not perform, in response to the vertical synchronization signal 2, the operation of "deleting the layer having the first marker bit in the SF buffer queue", but continues to perform layer composition on the layer buffered in the SF buffer.

Specifically, after receiving the second UI event (that is, the interrupt event), the UI thread of the electronic device may trigger a preset query event to the composition thread. When receiving the vertical synchronization signal 2, the composition thread may delete, in response to the preset query event, the layer having the first marker bit in the SF buffer queue, and delete the second marker bit when the SF buffer queue does not include the layer having the first marker bit. The second marker bit may also be referred to as a delete marker bit.

Figure 19:
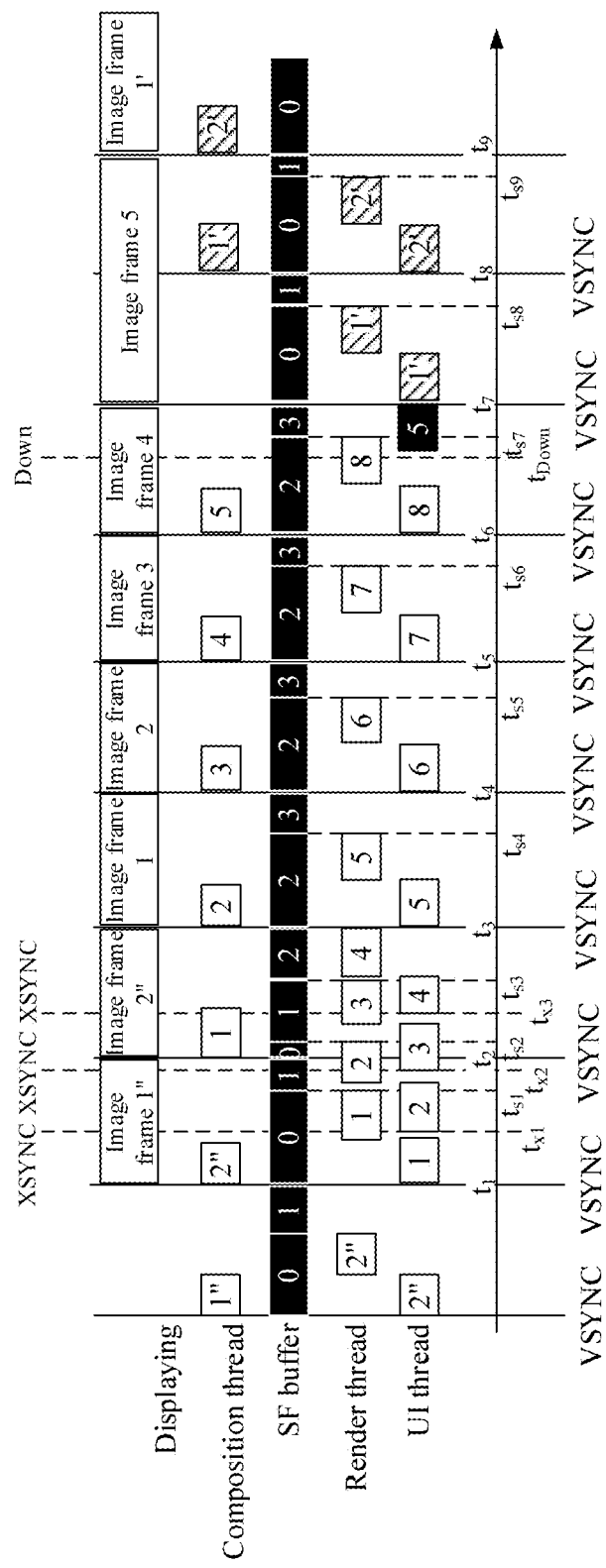
FIG. 19 is another schematic principle diagram of layer drawing, rendering, composition, and image frame displaying by an electronic device according to an embodiment of this application.

For example, as shown in FIG. 19, the electronic device receives the down event (that is, the second UI event) at time $t_{Down}$. Before the electronic device receives the down event in FIG. 19, the process of performing layer drawing, layer rendering, layer composition, and image frame displaying is the same as that shown in FIG. 12. Details are not described herein again in this embodiment of this application.

Starting from receiving the down event at time $t_{Down}$ shown in FIG. 19, the electronic device (such as the composition thread of the electronic device) may delete, in response to VSYNC (including the vertical synchronization signal 2) at time $t_7$, the layer having the first marker bit in the SF buffer queue. At time $t_{s7}$ after $t_{Down}$ shown in FIG. 19 and before $t_7$, as shown in FIG. 16A, three frame layers (including the layer 6, the layer 7, and the layer 8) are buffered in the SF buffer. The layer 6, the layer 7, and the layer 8 are layers corresponding to the first UI event, and a first marker bit is set for each of the layer 6, the layer 7, and the layer 8. Therefore, the electronic device (such as the composition thread of the electronic device) can delete the layer 6, the layer 7, and the layer 8. After the layer 6, the layer 7, and the layer 8 are deleted, the quantity of layers buffered in the SF buffer becomes 0. Therefore, in response to VSYNC (such as the vertical synchronization signal 2) at time $t_7$ shown in FIG. 19, the composition thread does not perform layer composition. In response to VSYNC (for example, the vertical synchronization signal 3) at time $t_7$ shown in FIG. 19, the LCD of the electronic device may refresh and display the image frame 5. The electronic device (such as the composition thread of the electronic device) does not perform layer composition in a period from $t_7$ to $t_8$, and does not buffer a new image frame in the SF buffer either. Therefore, in response to VSYNC (including the vertical synchronization signal 3) at time $t_8$ shown in FIG. 19, the LCD of the electronic device can only continue to display the image frame 5.

It should be noted that, in some embodiments, the electronic device may need to process a plurality of VSYNC signals (such as the vertical synchronization signal 2) before the layers buffered in the SF buffer which have the first marker bit are completely deleted.

Figure 20:
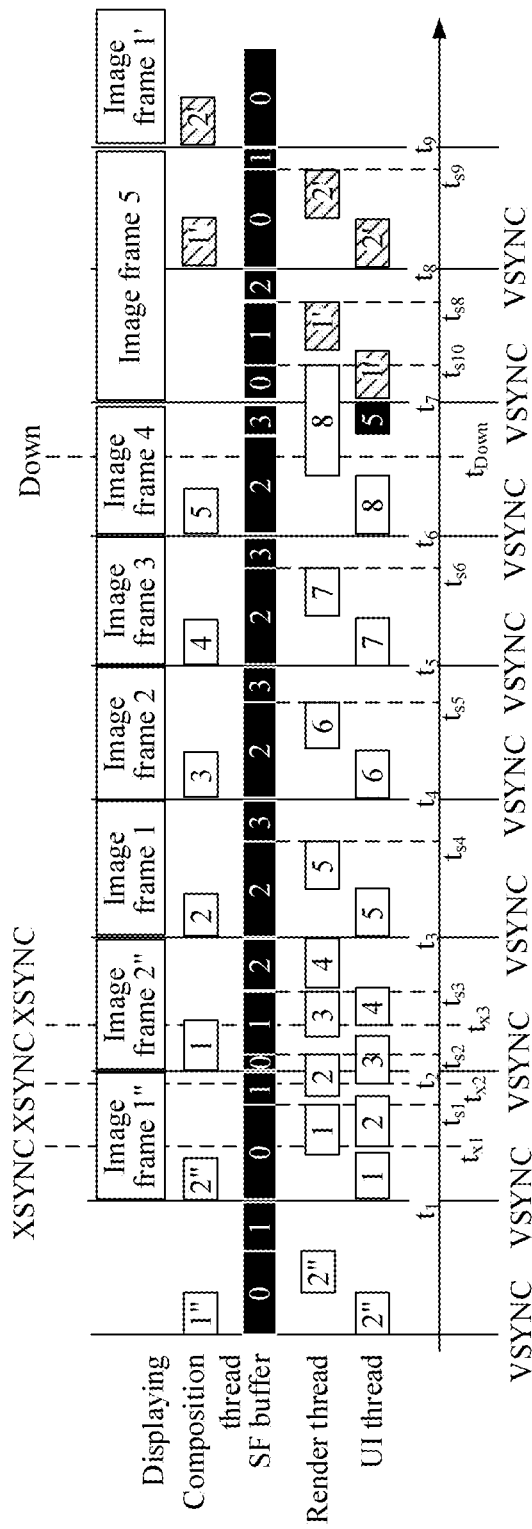
FIG. 20 is another schematic principle diagram of layer drawing, rendering, composition, and image frame displaying by an electronic device according to an embodiment of this application.

For example, as shown in FIG. 20, the electronic device receives the down event (that is, the second UI event) at time $t_{Down}$. Before the electronic device receives the down event in FIG. 20, the process of performing layer drawing, layer rendering, layer composition, and image frame displaying is the same as that shown in FIG. 12. Details are not described herein again in this embodiment of this application. When the VSYNC (such as the vertical synchronization signal 2) at time $t_7$ shown in FIG. 20 arrives, the render thread has not finished rendering the layer 8. Therefore, in response to the VSYNC (such as the vertical synchronization signal 2) at time $t_7$ shown in FIG. 20, the composition thread can only delete the layer 6 and the layer 7 buffered in the SF buffer. When the VSYNC (such as the vertical synchronization signal 2) at time $t_7$ shown in FIG. 20 arrives, the render thread has finished rendering the layer 8 and buffers the layer 8 in the SF buffer. Therefore, in response to the VSYNC (such as the vertical synchronization signal 2) at time $t_8$ shown in FIG. 20, the composition thread can delete the layer 8 buffered in the SF buffer. In addition, when the VSYNC (such as the vertical synchronization signal 2) at time $t_8$ shown in FIG. 20 arrives, the render thread has finished rendering the layer 1' and buffers the layer 1' in the SF buffer. Therefore, in response to the VSYNC (such as the vertical synchronization signal 2) at time $t_8$ shown in FIG. 20, the composition thread can perform layer composition on the layer 1' to obtain the image frame 1'.

It can be learned from the foregoing description that in FIG. 20, the electronic device processes two VSYNC signals (such as the VSYNC at time $t_7$ and the VSYNC at time $t_8$) before the layers buffered in the SF buffer which have the first marker bit are completely deleted.

In this embodiment, after receiving the interrupt event, the electronic device may delete, in response to a vertical synchronization signal 2, the layer corresponding to the first UI event that is buffered in the SF buffer. In this way, after a next vertical synchronization signal 2 arrives, the electronic device can directly compose the layer corresponding to the interrupt event. In this way, the touch response latency of the electronic device in response to the second UI event can be shortened, and the hand-following performance of the electronic device can be improved.

It can be learned from the foregoing embodiment that the electronic device calculates the motion distance of the corresponding layer based on the processing time of each layer. Moreover, the electronic device may buffer the processing time of each layer in the time buffer queue. After the electronic device performs the foregoing process, and deletes the layer corresponding to the first UI event that is buffered in the SF buffer, if the electronic device does not back off the layer drawn by the electronic device to the one (such as the layer 5) before the first frame layer (such as the layer 6) deleted by the electronic device, a large transition of image content displayed by the electronic device may be caused, and user experience is affected.

For example, with reference to the foregoing embodiment, as shown in FIG. 19 or FIG. 20, the electronic device deletes the layer 6, the layer 7, and the layer 8 buffered in the SF buffer. After the electronic device deletes the layer 6, the layer 7, and the layer 8, an image frame displayed by the electronic device is the image frame 6 corresponding to the layer 5. However, processing of the UI thread of the electronic device has reached the layer 8. In other words, processing logic of the UI thread has reached the layer 8. If the electronic device calculates the processing time of the next frame layer based on the processing time of the layer 8, and then calculates the motion distance based on the calculated processing time of the next frame layer, there is a direct transition from the motion distance corresponding to the layer 5 to the motion distance corresponding to the layer 8 in the picture displayed by the electronic device, and a large transition occurs in the image content displayed by the electronic device. Based on this, in the method in this embodiment of this application, the electronic device may further redraw the fourth layer, to back off the layer drawing logic of the electronic device to the fourth layer, and obtain a processing time of the fourth layer.

The fourth layer is a frame layer next to a layer corresponding to the image frame being displayed by the electronic device when the electronic device receives the second UI event. For example, as shown in FIG. 20, the UI thread of the electronic device receives the down event (that is, the second UI event) at time $t_{Down}$. At time $t_{Down}$, the electronic device displays the image frame 4. The fourth layer is a frame layer, that is, the layer 5, next to the layer 4 corresponding to the image frame 4. As shown in FIG. 20, the electronic device may redraw the layer 5 to back off the layer drawing logic of the electronic device to the layer 5.

Figure 22A:
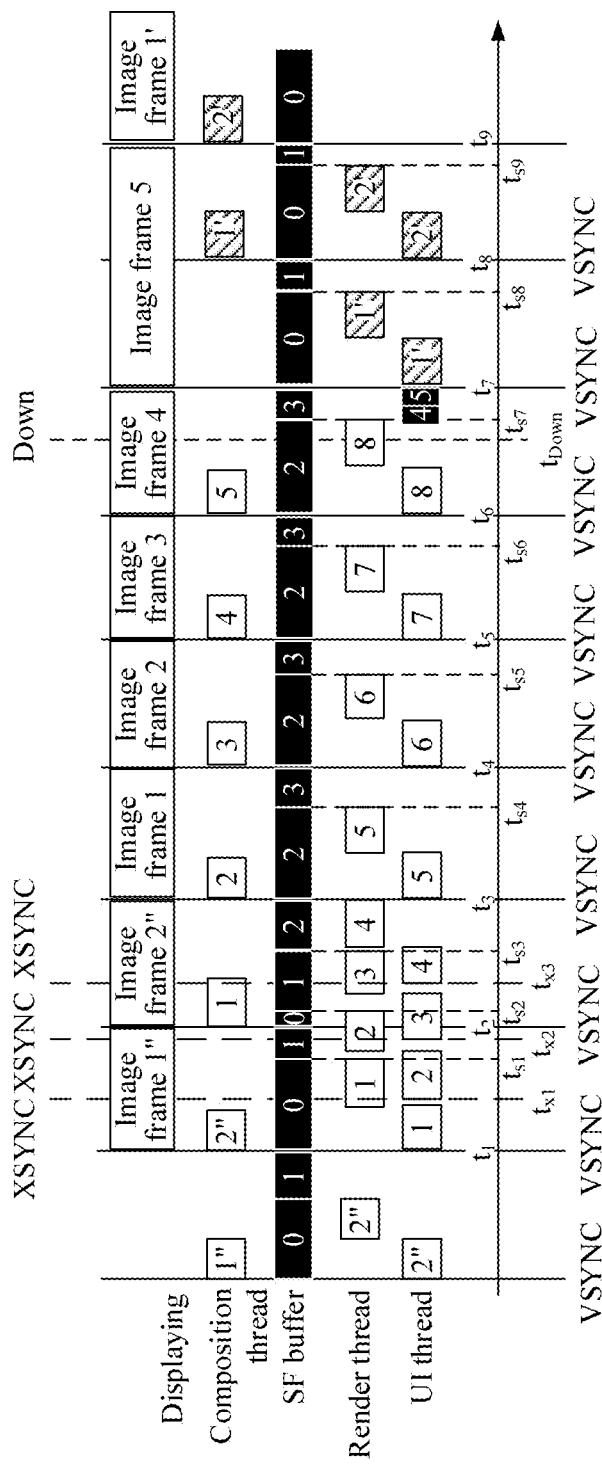
FIG. 22A is another schematic principle diagram of layer drawing, rendering, composition, and image frame displaying by an electronic device according to an embodiment of this application.

Alternatively, the fourth layer includes a layer corresponding to the image frame being displayed by the electronic device when the electronic device receives the second UI event, and a frame layer next to the layer corresponding to the image frame being displayed by the electronic device. For example, as shown in FIG. 22A, the UI thread of the electronic device receives the down event (that is, the second UI event) at time $t_{Down}$. At time $t_{Down}$, the electronic device displays the image frame 4. The fourth layer includes the layer 4 corresponding to the image frame 4 and the frame layer (that is, the layer 5) next to the layer 4 corresponding to the image frame 4. As shown in FIG. 22A, the electronic device may redraw the layer 4 and the layer 5 to back off the layer drawing logic of the electronic device to the layer 4 and the layer 5.

However, it should be noted that the electronic device no longer renders the fourth layer, and the processing time of the fourth layer is used by the electronic device to calculate the motion distance of the fifth layer. For example, as shown in FIG. 20, after $t_{Down}$, the electronic device no longer renders the layer 5. For another example, as shown in FIG. 22A, after $t_{Down}$, the electronic device no longer renders the layer 4 and the layer 5.

In other embodiments, with reference to the foregoing solution of "adding a first marker bit to the layer corresponding to the first UI event (that is, the UI event corresponding to the "deterministic animation"), and then in response to the interrupt event (that is, the second UI event), deleting the layer buffered in the SF buffer which has the first marker bit", the electronic device may query, in response to the foregoing preset query event, the quantity of layers buffered in the SF buffer which have the first marker bit and a quantity of layers to be buffered in the SF buffer queue when the electronic device receives the second UI event, and calculate a sum H of the found quantities. Then the electronic device may determine the fourth layer based on the calculated H.

For example, in response to the foregoing preset query event, the composition thread of the electronic device may query the quantity of layers buffered in the SF buffer which have the first marker bit, and the quantity of layers to be buffered in the SF buffer queue when the UI thread of the electronic device receives the second UI event, and calculate the sum H of the found quantities.

For example, as shown in FIG. 19, FIG. 20, or FIG. 22A, the UI thread of the electronic device receives the down event (that is, the second UI event) at time $t_{Down}$. The UI thread may trigger the preset query event to the composition thread, and the composition thread finds, at time $t_{Down}$, that the quantity of layers (such as the layer 6 and the layer 7) buffered in the SF buffer which have the first marker bit is 2; and the composition thread finds, at time $t_{Down}$, that the quantity of layers (such as the layer 8) to be buffered in the SF buffer queue when the UI thread receives the second UI event is 1. The electronic device may calculate the sum H=3 of the found quantities.

The fourth layer may be an $(H+h)^{th}$ frame layer counted from a frame layer at a tail of the SF buffer in a direction from the tail of the SF buffer to the head of the queue when the electronic device receives the second UI event, where h=0, or values in {0, 1} are assigned in sequence to h.

Figure 21:
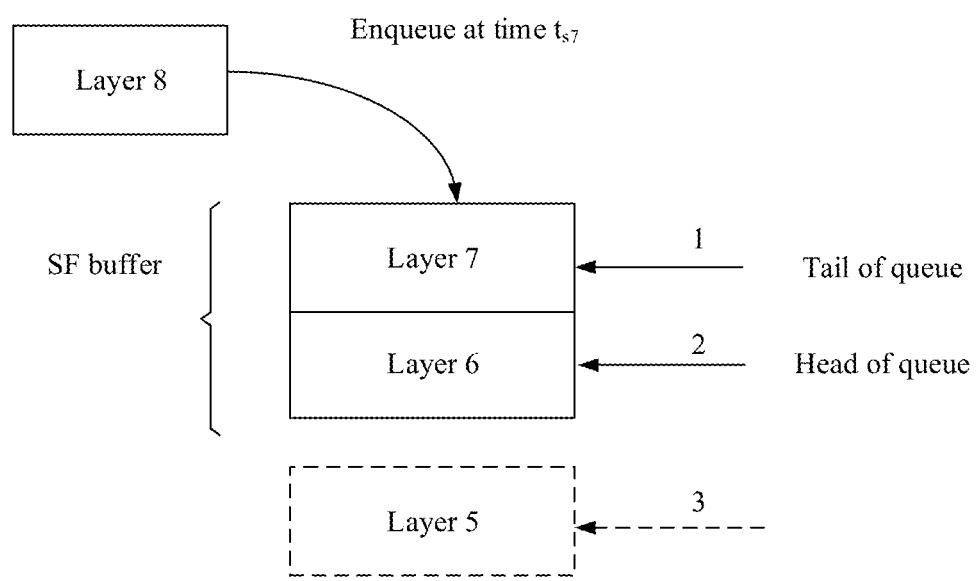
FIG. 21 is a schematic diagram of another method for buffering a layer in an SF buffer according to an embodiment of this application.
Figure 22B:
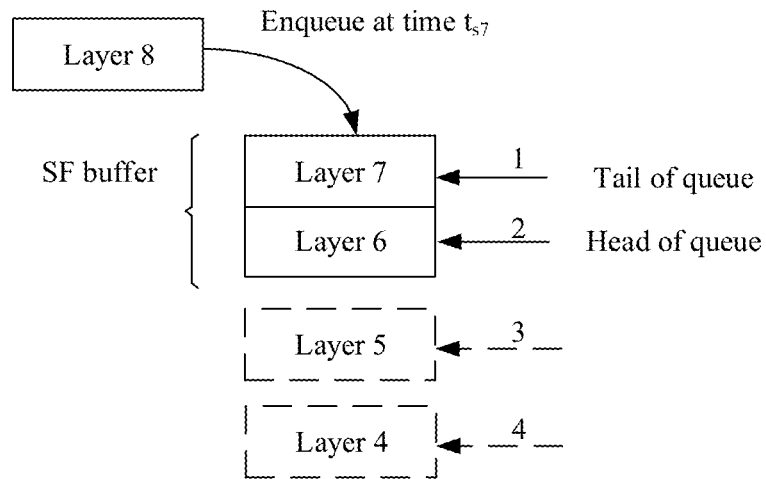
FIG. 22B is a schematic diagram of another method for buffering a layer in an SF buffer according to an embodiment of this application.

At time $t_{Down}$ shown in FIG. 19, FIG. 20, or FIG. 22A, the layers buffered in the SF buffer are shown in FIG. 21 or FIG. 22B. As shown in FIG. 21 or FIG. 22B, the layer 6 and the layer 7 are buffered in the SF buffer. The layer 6 is located at the head of the queue, and the layer 7 is located at the tail of the queue.

In an implementation (1), h=0. With reference to FIG. 19 or FIG. 20, H=3, and H+h=3. In this implementation, the fourth layer is the layer 5 shown in FIG. 19 or FIG. 20. For example, as shown in FIG. 21, the fourth layer is a third (that is, H+h=3) frame layer counted from the frame layer (that is, the layer 7) at the tail of the SF buffer in the direction from the tail of the SF buffer to the head of the queue when the electronic device receives the second UI event (that is, town), such as the layer 5 shown in FIG. 21. As shown in FIG. 19 or FIG. 20, the UI thread of the electronic device may redraw the layer 5 in a period from $t_{Down}$ to $t_7$.

In an implementation (2), values in {0, 1} are assigned in sequence to h. With reference to FIG. 22A, H=3, and H+h is 3 and 4 in sequence. In this implementation, the fourth layer is the layer 4 and the layer 5 shown in FIG. 22A. For example, as shown in FIG. 22B, the fourth layer includes the $(H+h)^{th}$ (such as 3 and 4) frame layer counted from the frame layer (that is, the layer 7) at the tail of the SF buffer in the direction from the tail of the SF buffer to the head of the queue when the electronic device receives the second UI event (that is, $t_{Down}$), such as the layer 4 and the layer 5 shown in FIG. 22B. As shown in FIG. 22A, the UI thread of the electronic device may redraw the layer 4 and the layer 5 in the period from $t_{Down}$ to $t_7$.

It should be noted that although the electronic device (such as the UI thread of the electronic device) redraws the fourth layer (the layer 4 and the layer 5 shown in FIG. 19 or FIG. 20), the electronic device (such as the render thread of the electronic device) no longer renders the fourth layer. For example, as shown in FIG. 19 or FIG. 20, after the UI thread finishes drawing the layer 5 at time $t_7$, the render thread does not render the layer 5. For another example, as shown in FIG. 22A, after the UI thread finishes drawing the layer 4 and the layer 5 at time $t_7$, the render thread does not render the layer 4 and the layer 5.

A purpose of redrawing the fourth layer by the electronic device is to back off the layer drawing logic of the electronic device (that is, the processing logic of the UI thread) to the fourth layer. The processing time of the fourth layer is used to calculate the motion distance. It may be understood that by backing off the layer drawing logic of the electronic device to the fourth layer, and calculating the motion distance based on the processing time of the fourth layer, a large transition of image content displayed by the electronic device can be avoided.

It should be noted that, in some cases, the animation displayed by the electronic device in response to the first UI event is a directional animation (for example, an animation of an object moving in one direction). In this case, after the UI thread of the electronic device draws the layer 8 and then redraws the layer 5, as shown in FIG. 20, a motion direction of the object is opposite to the motion direction of the object in the directional animation based on a motion direction from the layer 8 to the layer 5. In this case, by using the solution of the foregoing implementation (2) to first redraw the layer 4 and then redraw the layer 5, the problem that the motion direction of the object is opposite to the motion direction of the object in the directional animation can be resolved. As shown in FIG. 22A, although the motion direction of the object is opposite to the motion direction of the object in the foregoing directional animation based on the motion direction from the layer 8 to the layer 4, the motion direction of the object is the same as the motion direction of the object in the directional animation based on a motion direction from the layer 4 to the layer 5.

In this embodiment, after deleting the layer corresponding to the first UI event that is buffered in the SF buffer, the electronic device may redraw the fourth layer corresponding to the first UI event. In this way, it is possible to improve the continuity of the image content displayed by the electronic device and improve user experience.

Some embodiments of this application provide an electronic device. The electronic device may include a display (such as a touchscreen), a memory, and one or more processors. The display and the memory are coupled to the processor. The memory is configured to store computer program code, and the computer program code includes computer instructions. When the processor executes the computer instructions, the electronic device may perform each function or step performed by the electronic device in the foregoing method embodiments. For the structure of the electronic device, refer to the structure of the electronic device 100 shown in FIG. 1.

Figure 23:
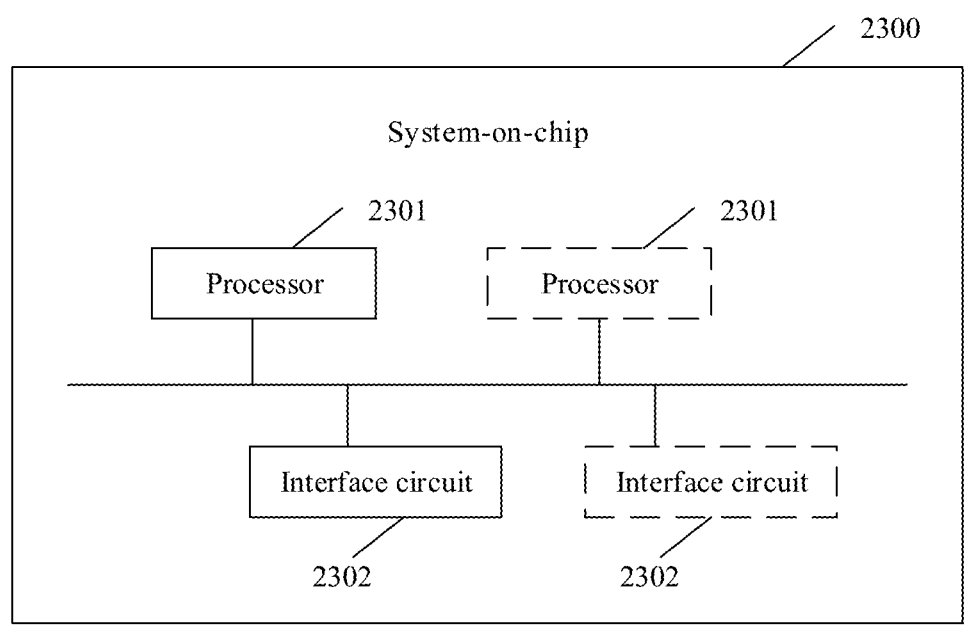
FIG. 23 is a schematic diagram of a structure of a system-on-chip according to an embodiment of this application.

An embodiment of this application further provides a system-on-chip. As shown in FIG. 23, the system-on-chip 2300 includes at least one processor 2301 and at least one interface circuit 2302. The processor 2301 and the interface circuit 2302 may be interconnected by a line. For example, the interface circuit 2302 may be configured to receive a signal from another apparatus (such as a memory of an electronic device). For another example, the interface circuit 2302 may be configured to send a signal to another apparatus (for example, the processor 2301 or a touchscreen of an electronic device). For example, the interface circuit 2302 may read instructions stored in the memory and send the instructions to the processor 2301. When the instructions are executed by the processor 2301, the electronic device may be enabled to perform the steps in the foregoing embodiments. Certainly, the system-on-chip may further include other discrete devices. This is not specifically limited in this embodiment of this application.

An embodiment of this application provides a computer storage medium. The computer storage medium includes computer instructions. When the computer instructions are run on an electronic device, the electronic device is enabled to perform the functions or steps performed by the electronic device in the foregoing method embodiments.

An embodiment of this application further provides a computer program product. When the computer program product is run on a computer, the computer is enabled to perform the functions or steps performed by the electronic device in the foregoing method embodiments. The computer may be the foregoing electronic device.

Based on the description of the foregoing implementations, a person skilled in the art may clearly understand that, for the purpose of convenient and brief description, division of the foregoing functional modules is used as an example for description. In an actual application, the foregoing functions may be allocated to different functional modules and implemented based on a requirement, that is, an internal structure of the apparatus is divided into different functional modules to implement all or a part of the functions described above.

In the several embodiments provided in this application, it should be understood that the disclosed apparatus and method may be implemented in other manners. For example, the described apparatus embodiments are merely examples. For example, the division of modules or units is merely logical function division and may be other division in actual implementation. For example, a plurality of units or components may be combined or integrated into another apparatus, or some features may be ignored or may not be performed. In addition, the displayed or discussed mutual couplings or direct couplings or communication connections may be indirect couplings or communications connections through some interfaces, apparatuses or units, and may be implemented in electrical, mechanical, or other forms.

The units described as separate parts may or may not be physically separate and parts displayed as units may be one physical unit or a plurality of physical units, that is, the parts may be located in one position or distributed in a plurality of different positions. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or a part of the technical solutions may be implemented in a form of a software product. The software product is stored in a storage medium and includes several instructions for instructing a device (which may be a single-chip microcomputer, a chip, or the like) or a processor to perform all or a part of the steps of the method described in each embodiment of this application. The foregoing storage medium includes any medium that can store program code, such as a USB flash drive, a removable hard disk, a read only memory (ROM), a random access memory (RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device, comprising:
   a display;
   a memory; and
   one or more processors, wherein the display and the memory are coupled to the one or more processors, the display is configured to display an image generated by the one or more processors, the memory is configured to store computer program code, and the computer program code comprises computer instructions that, when executed by the one or more processors, cause the electronic device to perform the following operations:
   drawing a first layer, rendering the first layer as a rendered first layer, and buffering the rendered first layer in a buffer queue;
   before a first time, finishing drawing the first layer and starting drawing a second layer; and
   rendering the second layer as a rendered second layer, and buffering the rendered second layer in the buffer queue;
   wherein the first time is a time of arrival of a first vertical synchronization signal for triggering the electronic device to draw the second layer.

2. The electronic device according to claim 1, wherein when the computer instructions are executed by the one or more processors, the electronic device is further enabled to perform the following operation:
   finishing drawing the first layer before the first time, and in response to finishing drawing the first layer, drawing the second layer, rendering the second layer as the rendered second layer, and buffering the rendered second layer in the buffer queue.

3. The electronic device according to claim 1, wherein when the computer instructions are executed by the one or more processors, the electronic device is further enabled to perform the following operation:
   finishing drawing the first layer before a second time, and starting to draw the second layer from the second time, rendering the second layer as the rendered second layer, and buffering the rendered second layer in the buffer queue,
   wherein
   the second time is a time in which a preset percentage of a signal period of the first vertical synchronization signal for triggering the electronic device to draw the first layer has been consumed, wherein the preset percentage is less than 1, and the second time precedes the first time.

4. The electronic device according to claim 3, wherein when the computer instructions are executed by the one or more processors, the electronic device is further enabled to perform the following operation:
finishing drawing the first layer before the first time and after the second time, and in response to finishing drawing the first layer, drawing the second layer, rendering the second layer as the rendered second layer, and buffering the rendered second layer in the buffer queue.

5. The electronic device according to claim 1, wherein when the computer instructions are executed by the one or more processors, the electronic device is further enabled to perform the following operations:
receiving a first user interface (UI) event, wherein the first UI event is used to trigger the display to display preset image content or display image content in a preset manner, and the first UI event comprises any one of the following: the electronic device receiving a fling operation input by a user, the electronic device receiving a tap operation performed by the user on a preset control in a foreground application, or the electronic device automatically triggering a UI event; and
in response to the first UI event, drawing the first layer, rendering the first layer as the rendered first layer, and buffering the rendered first layer in the buffer queue.

6. The electronic device according to claim 5, wherein when the computer instructions are executed by the one or more processors, the electronic device is further enabled to perform the following operations:
calculating a motion distance of the second layer based on the signal period of the first vertical synchronization signal; and
drawing the second layer based on the motion distance of the second layer, wherein the motion distance of the second layer is a motion distance of image content in the second layer with respect to image content in the first layer.

7. The electronic device according to claim 6, wherein when the computer instructions are executed by the one or more processors, the electronic device is further enabled to perform the following operations:
calculating a processing time of the second layer based on the signal period of the first vertical synchronization signal, wherein in response to the second layer being an ith layer drawn by the electronic device in response to the first UI event, the processing time of the second layer is $p_{i-1}+T_{i-1}$, wherein $i \geq 2$, i is a positive integer, $p_{i-1}$ is a processing time of an (i−1) th layer, and $T_{i-1}$ is the signal period of the first vertical synchronization signal for triggering the electronic device to draw the (i−1)th layer; and
calculating the motion distance of the second layer based on the processing time of the second layer, and drawing the second layer based on the motion distance of the second layer.

8. The electronic device according to claim 5, wherein when the computer instructions are executed by the one or more processors, the electronic device is further enabled to perform the following operations:
receiving a second UI event, wherein the second UI event is an interrupt event used to trigger the electronic device to stop displaying the image content corresponding to the first UI event, the first UI event is used to trigger the electronic device to display the preset image content or display the image content in the preset manner, and the first layer and the second layer are drawn by the electronic device triggered by the first UI event;
in response to the second UI event, stopping drawing a layer corresponding to the first UI event;
in response to a second vertical synchronization signal, deleting a layer corresponding to the first UI event that is buffered in the buffer queue, wherein the second vertical synchronization signal is used to trigger the electronic device to composite a rendered layer to obtain an image frame; and
in response to the first vertical synchronization signal, drawing a third layer corresponding to the second UI event, rendering the third layer as a rendered third layer, and buffering the rendered third layer in the buffer queue.

9. The electronic device according to claim 8, wherein when the computer instructions are executed by the one or more processors, the electronic device is further enabled to perform the following operations:
redrawing a fourth layer to back off layer drawing logic of the electronic device to the fourth layer, and obtaining a processing time of the fourth layer;
wherein
the electronic device no longer renders the fourth layer, and the processing time of the fourth layer is used by the electronic device to calculate a motion distance of the fourth layer; and
wherein the fourth layer is a frame layer next to a layer corresponding to an image frame being displayed by the display when the second UI event is received; or the fourth layer comprises a layer corresponding to an image frame being displayed by the display when the second UI event is received and a frame layer next to the layer corresponding to the image frame being displayed by the display.

10. The electronic device according to claim 1, wherein when the computer instructions are executed by the one or more processors, the electronic device is further enabled to perform the following operations:
determining a buffer space of the buffer queue and a quantity of buffered frames in the buffer queue, wherein the buffered frames are layers buffered in the buffer queue;
calculating a difference between the buffer space of the buffer queue and the quantity of buffered frames to obtain a remaining buffer space of the buffer queue; and
in response to the remaining buffer space of the buffer queue being greater than a first preset threshold and drawing the first layer is finished before the first time, drawing the second layer, rendering the second layer as the rendered second layer, and buffering the rendered second layer in the buffer queue, before the first time.

11. The electronic device according to claim 10, wherein the remaining buffer space of the buffer queue is less than a second preset threshold, and wherein when the computer instructions are executed by the one or more processors, the electronic device is further enabled to perform the following operations:
in response to the first vertical synchronization signal, drawing the second layer, rendering the second layer as the rendered second layer, and buffering the rendered second layer in the buffer queue.

12. The electronic device according to claim 10, wherein when the computer instructions are executed by the one or more processors, the electronic device is further enabled to perform the following operation:
  setting the buffer space of the buffer queue to M+p frames;
  wherein
  M is a size of the buffer space of the buffer queue before the setting; and
  wherein p is a quantity of frames lost by the electronic device within a preset time, or p is a preset positive integer.

13. The electronic device according to claim 12, wherein when the computer instructions are executed by the one or more processors, the electronic device is further enabled to perform the following operation:
  in response to M+p being greater than a preset upper limit N, setting the buffer space of the buffer queue to N frames.

14. A non-transitory computer-readable storage medium comprising computer instructions that, when run on an electronic device, cause the electronic device to perform the following operations:
  drawing a first layer, rendering the first layer as a rendered first layer, and buffering the rendered first layer in a buffer queue;
  before a first time, finishing drawing the first layer and starting drawing a second layer; and
  rendering the second layer as the rendered second layer, and buffering the rendered second layer in the buffer queue;
  wherein the first time is a time of arrival of a first vertical synchronization signal for triggering the electronic device to draw the second layer.

15. The non-transitory computer-readable storage medium according to claim 14, wherein when the computer instructions are run on the electronic device, the electronic device is further caused to perform the following operations:
  finishing drawing the first layer before the first time, and in response to finishing drawing the first layer, drawing the second layer, rendering the second layer as the rendered second layer, and buffering the rendered second layer in the buffer queue.

16. The non-transitory computer-readable storage medium according to claim 14, wherein when the computer instructions are run on the electronic device, the electronic device is further caused to perform the following operations:
  receiving a first user interface (UI) event, wherein the first UI event is used to trigger the display to display preset image content or display image content in a preset manner, and the first UI event comprises any one of the following: the electronic device receiving a fling operation input by a user, the electronic device receiving a tap operation performed by the user on a preset control in a foreground application, or the electronic device automatically triggering a UI event; and
  in response to the first UI event, drawing the first layer, rendering the first layer as the rendered first layer, and buffering the rendered first layer in the buffer queue.

17. The non-transitory computer-readable storage medium according to claim 16, wherein when the computer instructions are run on the electronic device, the electronic device is further caused to perform the following operations:
  calculating a motion distance of the second layer based on the signal period of the first vertical synchronization signal, and drawing the second layer based on the motion distance of the second layer, wherein the motion distance of the second layer is a motion distance of image content in the second layer with respect to image content in the first layer.

18. The non-transitory computer-readable storage medium according to claim 17, wherein when the computer instructions are run on the electronic device, the electronic device is further caused to perform the following operations:
  calculating a processing time of the second layer based on the signal period of the first vertical synchronization signal, wherein in response to the second layer being an ith layer drawn by the electronic device in response to the first UI event, the processing time of the second layer is $p_{i-1}+T_{i-1}$, wherein $i \geq 2$, i is a positive integer, $p_{i-1}$ is a processing time of an (i−1) th layer, and $T_{i-1}$ is the signal period of the first vertical synchronization signal for triggering the electronic device to draw the (i−1) th layer; and
  calculating the motion distance of the second layer based on the processing time of the second layer, and drawing the second layer based on the motion distance of the second layer.

19. The non-transitory computer-readable storage medium according to claim 14, wherein when the computer instructions are run on the electronic device, the electronic device is further caused to perform the following operations:
  determining a buffer space of the buffer queue and a quantity of buffered frames in the buffer queue, wherein the buffered frames are layers buffered in the buffer queue;
  calculating a difference between the buffer space of the buffer queue and the quantity of buffered frames to obtain a remaining buffer space of the buffer queue; and
  in response to the remaining buffer space of the buffer queue being greater than a first preset threshold and drawing the first layer is finished before the first time, drawing the second layer, rendering the second layer as the rendered second layer, and buffering the rendered second layer in the buffer queue, before the first time.

20. The non-transitory computer-readable storage medium according to claim 19, wherein the remaining buffer space of the buffer queue is less than a second preset threshold, and wherein when the computer instructions are run on the electronic device, the electronic device is further caused to perform the following operations:
  in response to the first vertical synchronization signal, drawing the second layer, rendering the second layer as the rendered second layer, and buffering the rendered second layer in the buffer queue.

* * * * *